US00RE50348E

(19) United States
(12) Reissued Patent
Osakabe

(10) Patent Number: US RE50,348 E
(45) Date of Reissued Patent: Mar. 25, 2025

(54) LIQUID CONSUMPTION DEVICE

(71) Applicant: Brother Kogyo Kabushiki Kaisha, Nagoya (JP)

(72) Inventor: Yoshinori Osakabe, Seto (JP)

(73) Assignee: Brother Kogyo Kabushiki Kaisha, Nagoya (JP)

(21) Appl. No.: 17/469,509

(22) Filed: Sep. 8, 2021

Related U.S. Patent Documents

Reissue of:

(64) Patent No.: 10,406,817
Issued: Sep. 10, 2019
Appl. No.: 15/939,730
Filed: Mar. 29, 2018

(30) Foreign Application Priority Data

Mar. 31, 2017 (JP) ..... 2017-073264

(51) Int. Cl.
*B41J 2/175* (2006.01)
*B65D 1/40* (2006.01)
*B65D 25/04* (2006.01)

(52) U.S. Cl.
CPC ..... *B41J 2/17513* (2013.01); *B41J 2/17509* (2013.01); *B65D 1/40* (2013.01); *B65D 25/04* (2013.01); *B65D 2203/04* (2013.01)

(58) Field of Classification Search
CPC ..... B41J 2/17513; B41J 2/17509; B41J 2002/17573; B65D 1/04; B65D 25/04; B65D 1/40; B65D 11/20; B65D 2213/00; B65D 2203/04
See application file for complete search history.

(56) References Cited

U.S. PATENT DOCUMENTS 352,195 A * 11/1886 Krag ..... B65D 5/16 222/457
2,233,996 A * 3/1941 Dent ..... G01F 11/262 222/456

(Continued)

FOREIGN PATENT DOCUMENTS

JP S58-053061 U 4/1983
JP H08-207304 A 8/1996

(Continued)

OTHER PUBLICATIONS

Feb. 24, 2021—(JP) Notice of Reasons for Refusal—App 2017-073264.

*Primary Examiner* — Peter C English
(74) *Attorney, Agent, or Firm* — Banner & Witcoff, Ltd.

(57) ABSTRACT

A liquid consumption device has a tank having an inner space partitioned by an outer wall. The tank has a first inner wall which extends from the outer wall on a one side in a first direction perpendicular to an up-down direction. Further, the first inner wall partitions the inner space into a first space and a second space, which communicate with each other through a first communication hole formed on the first inner wall. A third space, which is partitioned by the first inner wall and the outer wall, and is located below a lowermost position of a surface defining the first communication hole when the tank takes a first attitude is configured to store a particular amount of liquid, which is stored in a fourth space in a state where the tank takes the usage attitude, the fourth space being a part of the second space.

12 Claims, 26 Drawing Sheets

(56) References Cited

U.S. PATENT DOCUMENTS

| | | | | |
|---|---|---|---|---|
| 3,235,143 | A * | 2/1966 | Goodrich | B65D 5/76 222/457 |
| 3,584,771 | A * | 6/1971 | Wakamatsu | B65D 5/76 222/457 |
| 4,856,685 | A * | 8/1989 | Gaffney | B65D 83/00 220/772 |
| 5,123,575 | A * | 6/1992 | Li | B65D 25/52 215/385 |
| 5,742,312 | A | 4/1998 | Carlotta | |
| 6,029,861 | A * | 2/2000 | Gier | G01F 11/261 222/440 |
| 6,095,643 | A * | 8/2000 | Cook et al. | B41J 2/17506 347/87 |
| 6,247,807 | B1 | 6/2001 | Yang et al. | |
| 6,336,719 | B1 * | 1/2002 | Ishinaga et al. | B41J 2/17533 347/86 |
| 7,175,264 | B2 | 2/2007 | Qingguo et al. | |
| 7,185,977 | B2 * | 3/2007 | Kyogoku et al. | B41J 2/17513 347/86 |
| 7,293,679 | B2 * | 11/2007 | Lo | B65D 1/023 222/479 |
| 9,505,222 | B2 | 11/2016 | Igarashi et al. | |
| 9,764,556 | B2 | 9/2017 | Kudo et al. | |
| 9,868,290 | B2 * | 1/2018 | Matsuda et al. | B41J 2/17553 |
| 2005/0174408 | A1 | 8/2005 | Qingguo et al. | |
| 2010/0123756 | A1 | 5/2010 | Yamada et al. | |
| 2012/0038719 | A1 * | 2/2012 | Shimizu et al. | B41J 2/17513 347/86 |
| 2015/0284170 | A1 | 10/2015 | Igarashi et al. | |
| 2016/0279957 | A1 * | 9/2016 | Kudo | B41J 2/17523 |
| 2017/0120643 | A1 | 5/2017 | Igarashi et al. | |
| 2018/0244056 | A1 * | 8/2018 | Kudo et al. | B41J 2/17513 |

FOREIGN PATENT DOCUMENTS

| | | | | |
|---|---|---|---|---|
| JP | 2005-219483 | A | 8/2005 | |
| JP | 2010-030143 | A | 2/2010 | |
| JP | 2010-137550 | A | 6/2010 | |
| JP | 2015-199261 | A | 11/2015 | |
| JP | 2016-087848 | A | 5/2016 | |
| JP | 2016-168721 | A | 9/2016 | |
| JP | 2016-168728 | A | 9/2016 | |
| JP | 2016-182731 | A | 10/2016 | |
| WO | WO-2015145247 | A1 * | 10/2015 | B65D 5/76 |

* cited by examiner

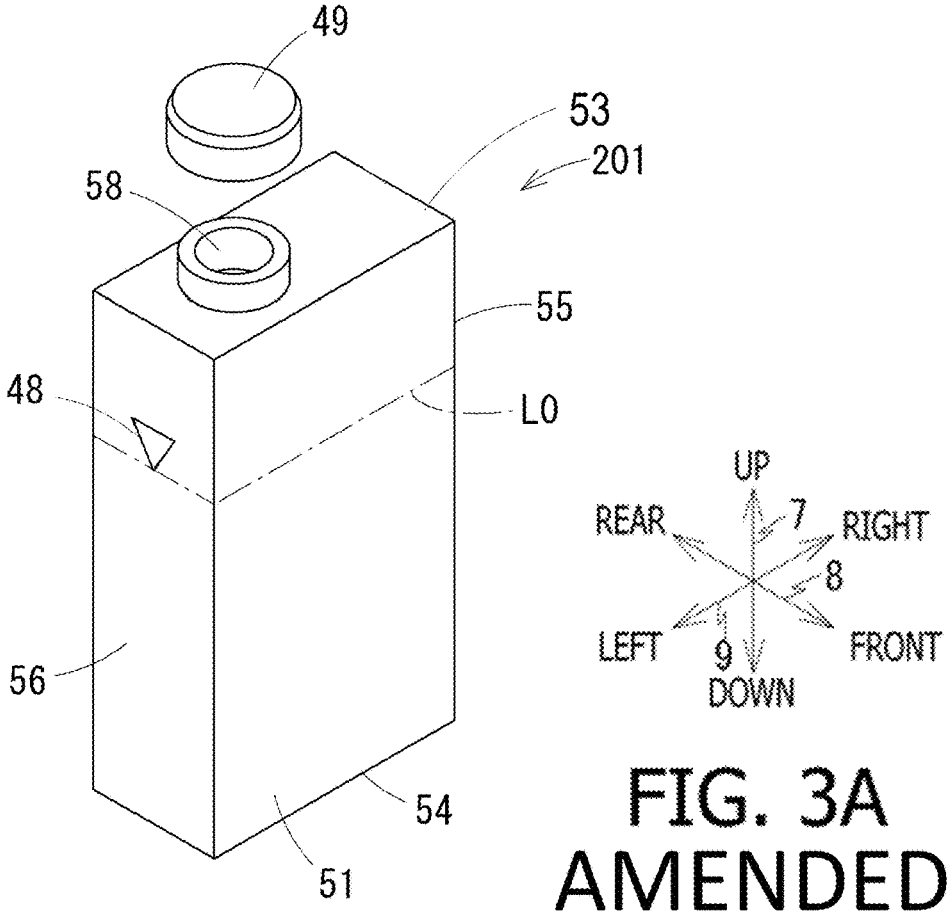
FIG. 3A
AMENDED

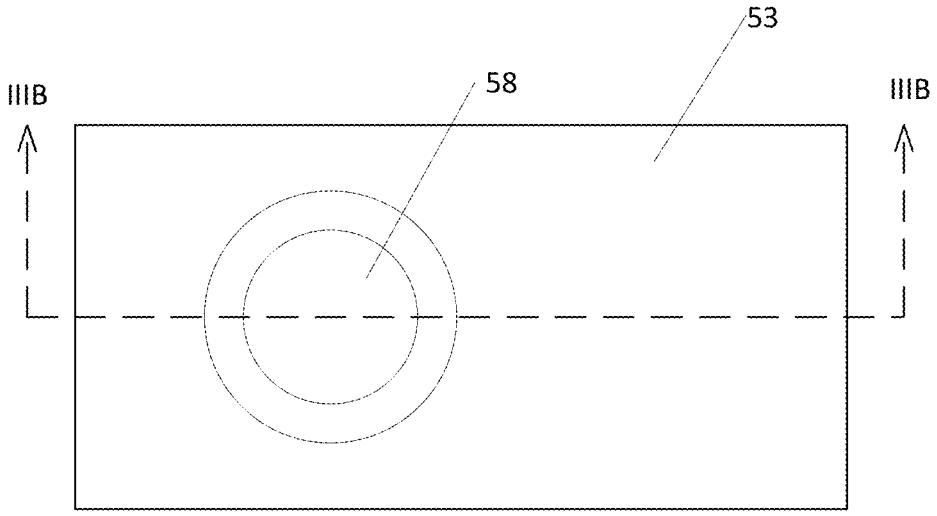
FIG. 3C
NEW
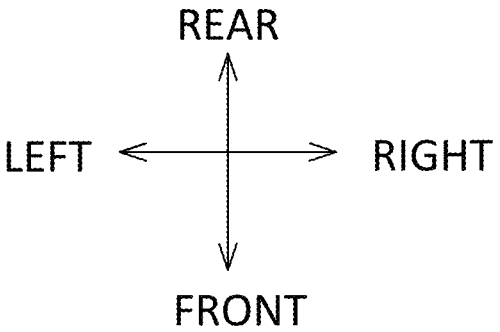

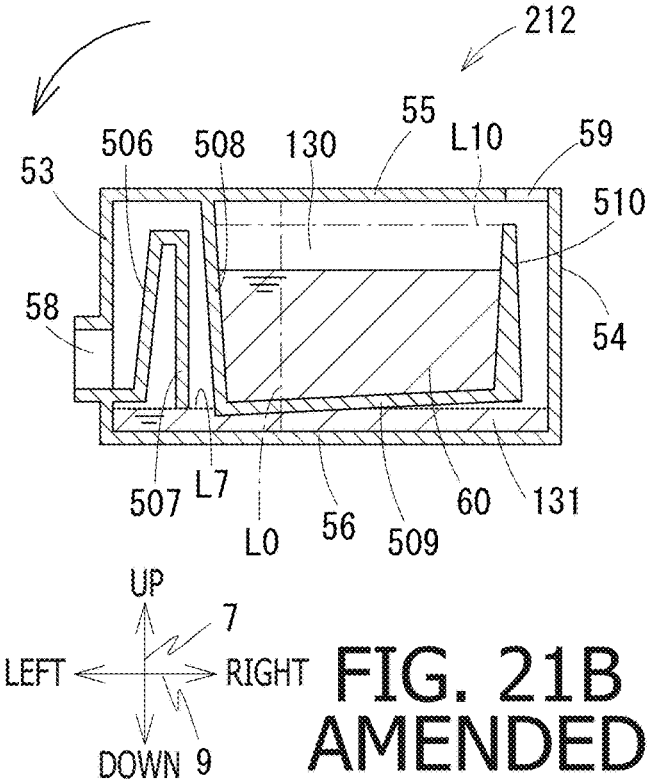
FIG. 21B
AMENDED

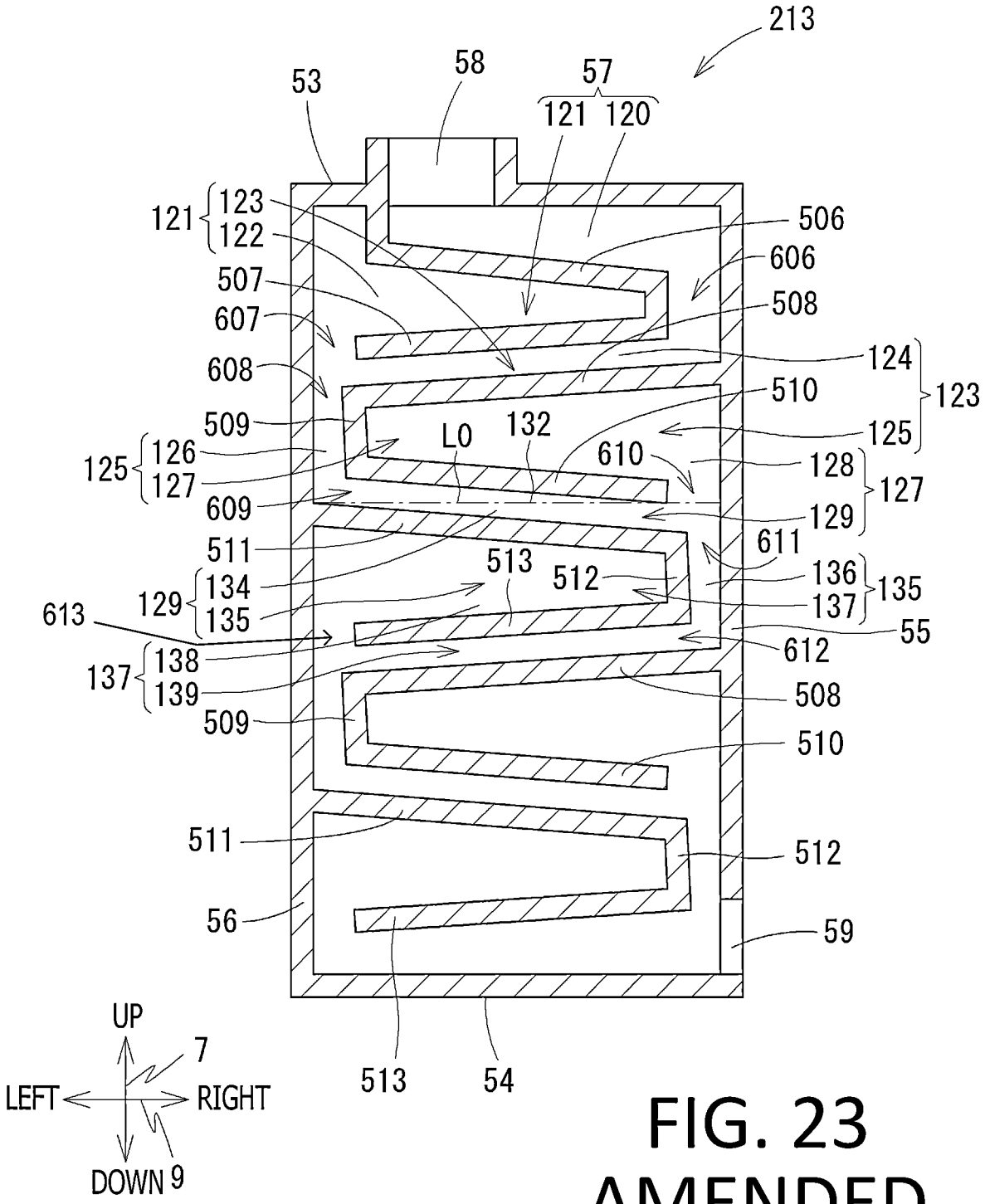
FIG. 23
AMENDED

LIQUID CONSUMPTION DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue application of U.S. Pat. No. 10,406,817 issued Sep. 10, 2019, which* claims priority under 35 U.S.C. § 119 from Japanese Patent Application No. 2017-073264 filed on Mar. 31, 2017. The entire subject matter of the *Japanese foreign priority* application is incorporated herein by reference.

BACKGROUND

Technical Field

The present disclosures relate to a liquid consumption device having a tank for storing liquid.

Related Art

Conventionally, there has been known an image recording apparatus, which is provided with a tank containing a large-capacity ink storage chamber. Such a tank has an ink inlet from which ink is injected in the storage chamber from outside, and an openable/closable cap member for the inlet. Such an image recording apparatus has an openable cover provided to a casing thereof such that, when the cover is opened, the cap member is exposed to outside. When the cap member is removed with the cover being opened, a user can inject the ink into the storage chamber of the tank through the inlet.

SUMMARY

According to the above-described image recording apparatus, it is possible for a user to close the cover with the cap member being removed. Once the cover is closed, the user cannot visually recognize whether or not the cap member is attached to the inlet. Therefore, it may occur that the image recording apparatus is moved with the cap member being removed. In such a case, if the image recording apparatus is inclined, the ink inside the tank may be spilled out through the inlet of the image recording apparatus. As a result, the [cloths] *clothes* of the user and/or a floor may be soiled by the ink. When the image recording apparatus is being carried in such a state with other baggage, the baggage may also be soiled by the ink.

According to aspects of the present disclosures, there is provided a liquid consumption device, having a tank having an inner space partitioned, by an outer wall, from outside, an inlet through which the inner space communicates with the outside of the tank, and an outlet through which the inner space communicates with the outside of the tank, and a liquid consumption part connected to the outlet. The tank has a first inner wall which extends, in a state where the tank takes a usage attitude, from the outer wall on a one side in a first direction perpendicular to an up-down direction. Further, the first inner wall partitions the inner space into a first space in which the inlet is located and a second space in which the outlet is located, the first inner wall having a first communication hole through which the first space and second space communicate with each other. Furthermore, a third space, which is partitioned by the first inner wall and the outer wall and is located below a lowermost position of a surface partitioning the first communication hole when the tank takes a first *non-usage* attitude which is defined as an attitude when the tank taking the usage attitude is rotated on another side in the first direction by an angle ranging from 0 degree to 90 degrees about a rotation axis extending in a second direction which is perpendicular to both the up-down direction and the first direction, is configured to store a particular amount of liquid, which is stored in a fourth space in a state where the tank takes the usage attitude, the fourth space being a part of the second space.

BRIEF DESCRIPTION OF THE ACCOMPANYING DRAWINGS

FIG. 3A is a perspective view of an ink tank according to the first embodiment viewed from upper left side thereof.

FIG. 3C is a plan view of the top of the ink tank and showing the section line IIIB-IIIB from which the cross-sectional view of FIG. 3B is taken.*

FIG. 21B is a vertical cross-sectional view of the ink tank according to the twelfth embodiment when the ink tank takes the first *non-usage* attitude.

FIG. 23 is a vertical cross-sectional view of the ink tank according to a thirteenth embodiment when the ink tank takes the usage attitude.

DETAILED DESCRIPTION OF THE EMBODIMENTS

Figure 1:
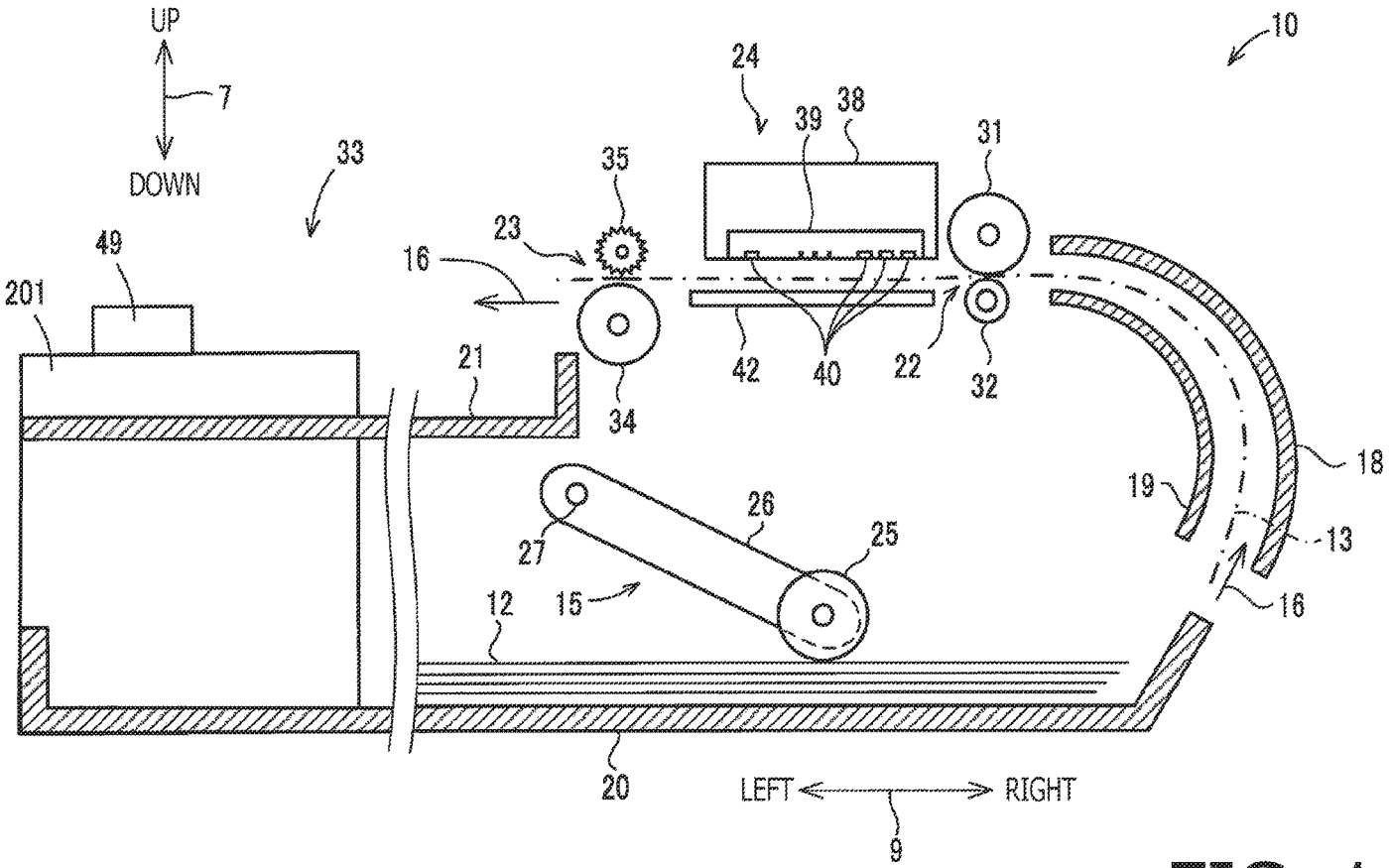
FIG. 1 is a cross-sectional view schematically illustrating an internal structure of a printer according to a first embodiment of the present disclosures.

Hereinafter, referring to the accompanying drawings, embodiments according to the present disclosures will be described. It should be noted that embodiments described below are only examples according to aspects of the present disclosures, and configurations thereof can be modified in various ways without departing from the aspects of the present disclosures.

In the following description, an up-down direction 7 is defined based on an attitude of a printer 10 and [an] ink [tank] *tanks* 201 placed for use on a horizontal plane (i.e., the attitude shown in FIG. 1: which will occasionally be referred to as a usage attitude). Further, a direction in which a carriage 38 reciprocally moves is referred to as a main scanning direction, which is also defined as a front-rear direction 8. A direction perpendicular to the front-rear direction 8 and the up-down direction is defined as a right-left direction [8] *9*. In particular, according to the embodiments described hereinafter, when the printer 10 and the ink [tank] *tanks* 201 are in use (i.e., they are in the usage attitude), the up-down direction 7 corresponds to the vertical direction, and the front-rear direction 8 and the right-left direction 9 [correspond to] *are in* the horizontal [direction] *plane*.

[Printer According to First Embodiment]

Firstly, the printer 10 according to a first embodiment of the present disclosures will be described.

[Entire Configuration of Printer]

As shown in FIG. 1, the printer 10 (which is an example of a liquid consumption device) is an image recording apparatus configured to form an image on a sheet 12 in accordance with a so-called inkjet printing method. The printer 10 has a sheet supplier 15, a sheet feed tray 20, a discharge tray 21, a first conveyer 22, a second conveyer 23, a recording assembly 24, a platen 42 and an ink supplier 33. The printer 10 may be configured to have various functions, in addition to a printing function, such as a facsimile function, a scanner function and the like.

[Sheet Feed Tray and Discharge Tray]

The sheet feed tray 20 is arranged at a lower part of the printer 10, and detachably attached to a housing of the printer 10. The sheet feed tray 20 can be detached from or inserted into the housing by sliding the same in the right-left direction [8] *9*. The sheet feed tray 20 is configured to support a plurality of sheets 12 in a stacked manner. The discharge tray 21 is formed integrally with the sheet feed tray 20 and is arranged on an upper side with respect to the sheet feed tray 20. Thus, the discharge tray 21 is detached from or attached to the housing of the printer together with (i.e., integrally with) the sheet feed tray 20. The discharge tray 21 receives and supports the sheets 12 conveyed by the second conveyer 23 and discharged from between the recording assembly 24 and the platen 42.

[Sheet Supplier]

As shown in FIG. 1, the sheet supplier 15 includes a feeding roller 25, a feeding arm 26 and a shaft 27. The sheet supplier 15 feeds the sheets 12 supported by the sheet feed tray 20 toward a conveying passage 13. The feeding roller 25 is rotatably supported at a tip end part of the feeding arm 26. The feeding roller 25 is driven to rotate in a forward direction (i.e., counterclockwise in FIG. 1) by a not-shown motor when the sheets 12 [is] *are* fed. The feeding arm 26 is rotatably supported by the shaft 27 which is supported by a frame of the printer 10. The feeding arm 26 is rotationally urged toward the sheet feed tray 20 (i.e., urged clockwise) by its deadweight or an elastic force generated, for example, by a spring.

It is noted that, when the feeding roller 25 is rotated forwardly, the feeding roller 25 is rotated to feed the sheets 12 in a conveying direction 16. According to the present disclosure, therefore, the forward rotation of the feeding roller 25 is the counterclockwise rotation in FIG. 1. In the following description, regarding not only the feeding roller 25, but the other rollers, the term "forward rotation" means the rotation for feeding the sheets 12 in the conveying direction 16.

[Conveying Passage]

As shown in FIG. 1, the conveying passage 13, which extends upward from the right end part of the sheet feed tray 20, is curved to make a U-turn frontward, and reaches the discharge tray [12] *21* passing through a space between the recording assembly 24 and the platen 42. The printer 10 includes an outer guide member 18 and an inner guide member 19. A curved portion (i.e., a portion making the U-turn) of the conveying passage 13 is formed by an inside space between the outer guide member 18 and the inner guide member 19. A portion of the conveying passage 13 between the first conveyer 22 and the second conveyer 23 is located at a substantially central part, in the front-rear direction 8, of the printer 10 and extends in the right-left direction 9. Conveying directions of the sheet 12 [is] *are* indicated by arrows 16 depicted in FIG. 1.

[First Conveyer and Second Conveyer]

As shown in FIG. 1, the first conveyer 22 is arranged on an upstream side, in the conveying direction 16, with respect to the recording assembly 24. The first conveyer 22 has a conveying roller 31 and a pinch roller 32 which face each other. The conveying roller 31 is arranged above the pinch roller 32. The sheet 12 conveyed through the curved portion of the conveying passage 13 is nipped by the conveying roller 31 and the pinch roller 32. The conveying roller 31 is driven to rotate by a not-shown motor. The pinch roller 32 is rotated in association with rotation of the conveying roller 31. The sheet 12 nipped by the conveying roller 31 and the pinch roller 32 is conveyed in the conveying direction 16 as the conveying roller 31 and the pinch roller 32 rotate forwardly.

The second conveyer 23 is arranged on a downstream side, in the conveying direction 16, with respect to the recording assembly 24. The second conveyer 23 has a discharging roller 34 and a spur roller 35 *that* face each other. The spur roller 35 is arranged above the discharging roller 34. The sheet 12 conveyed from between the recording assembly 24 and the platen 42 is nipped by the discharging roller 34 and the spur roller 35. The discharging roller 34 is driven to rotate by a not-shown motor. The spur roller 35 is rotated in association with rotation of the discharging roller 34. The sheet 12 nipped by the discharging roller 34 and the spur roller 35 is conveyed in the conveying direction 16 as the discharging roller 34 and the spur roller 35 rotate forwardly.

[Platen]

As shown in FIG. 1, the platen 42 is arranged between, in the conveying direction 16, the first conveyer 22 and the [scone] *second* conveyer 23. The recording assembly 24 and the platen 42 are arranged at opposed positions, in the up-down direction, with the conveying passage 13 sandwiched therebetween. The recording assembly 24 is arranged at a higher position than the platen 42 is. The platen 42 is arranged below the recording assembly 24 and defines a lower surface of the conveying passage 13.

[Recording Assembly]

As shown in FIG. 1, the recording assembly 24 (which is an example of a liquid consumption part) is arranged between, in the conveying direction 16, the first conveyer 22 and the second conveyer 23. The recording assembly 24 has a carriage 38 and a recording head 39.

Figure 2:
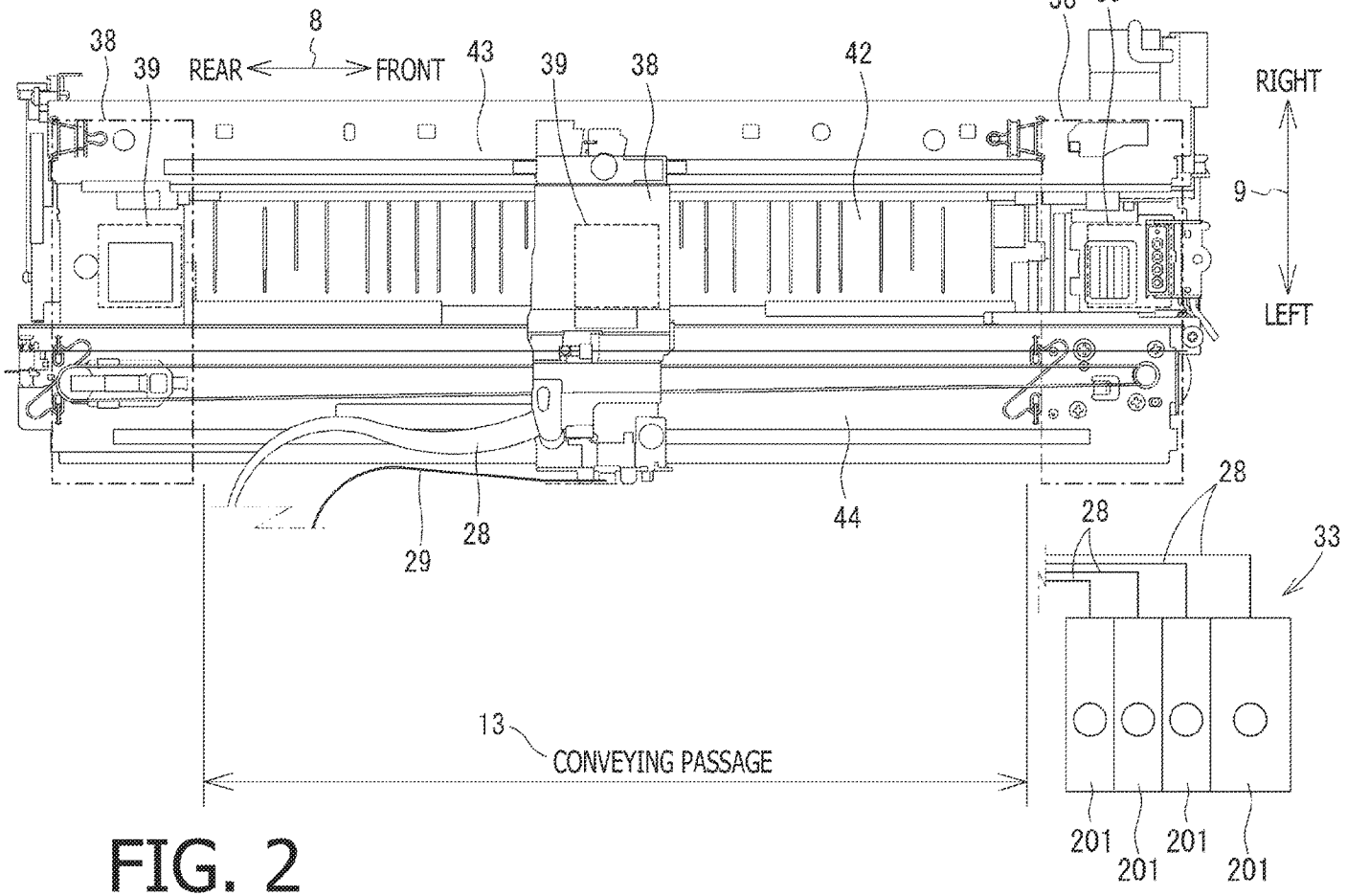
FIG. 2 is a plan view showing an arrangement of a carriage and an ink supplying device of the printer.

As shown in FIG. 2, the carriage 38 is supported by guide rails 43 and 44 which extend in the front-rear direction 8 and spaced from each other in the right-left direction 9. The guide rails 43 and 44 are supported by the frame of the printer 10. The carriage 38 is connected to a well-known belt mechanism provided to the guide rail 44. When the belt mechanism [44] is driven by a not-shown motor, the carriage 38 connected to the belt mechanism is driven to reciprocally move in the front-rear direction 8.

As shown in FIG. 1, the carriage 38 mounts the recording head 39. On a lower surface of the recording head 39, a plurality of nozzles 40 is arranged. Tip ends of the plurality of nozzles 40 are exposed to outside from the lower surface of the recording head 39. The plurality of nozzles 40 is arranged on the downstream side, in the conveying direction, with respect to the conveying roller 31 and the pinch roller 32. The recording head 39 ejects the ink through the plurality nozzles 40 as minute ink droplets. During movement of the carriage 38, the recording head 39 ejects the ink droplets toward the sheet 12 supported on the platen 42, thereby an image being formed on the sheet 12.

[Ink Supplier]

As shown in FIG. 2, the ink supplier 33 has four ink tanks 201. The four ink tanks 201 store four different color ink, respectively. According to the illustrative embodiments, the four ink tanks 201 store black ink, yellow ink, cyan ink and magenta ink, respectively. The ink supplier 33 is configured to supply the ink to the recording assembly 24.

As shown in FIG. 2, the printer 10 has four ink tubes 28 which connect the ink supplier 33 with the recording head 39, and a flexible flat cable 29 which electrically connects a control substrate with the recording head 39. The four ink tubes 28 respectively supply the ink stored in the four ink tanks 201 of the ink supplier 33 to the recording head 39. The four ink tubes 28 are connected to the recoding head 39 with being bundled. The flexible flat cable 29 transmits control signals output by the control substrate to the recording head 39.

[Ink Tank According to First Embodiment]

FIG. 3A shows an appearance of the ink tank 201 (which is an example of a tank) according to the first embodiment. As shown in FIG. 3A, the ink tank 201 has a substantially rectangular parallelepiped shape. The ink tank 201 has, in a state where the tank 201 takes a usage attitude, a front outer wall 51, a rear outer wall 52, an upper outer wall 53, a lower outer wall 54, a right outer wall 55 and a left outer wall 56. Each of the front outer wall 51 and the rear outer wall 52 is plate-like part perpendicular to the front-rear direction 8. The rear outer wall [51] *52* is arranged on the rear side with respect to the front outer wall 51. Each of the upper outer wall 53 and the lower outer wall 54 is a plate-like part perpendicular to the up-down direction 7. The lower outer wall 54 is arranged below the upper outer wall 53. Each of the right outer wall 55 and the left outer wall 56 is a plate-like part perpendicular to the right-left direction 9. The left outer wall 56 is arranged on the left side with respect to the right outer wall 55.

The outer walls 51-56 are connected next to each other to form the substantially rectangular parallelepiped shape. When viewed along the up-down direction 7, the upper end sides of the front outer wall 51, the rear outer wall 52, the right outer wall 54 and the left outer wall 55 are connected to outer sides of the upper outer wall 53, and the lower end sides of the front outer wall 51, the rear outer wall 52, the right outer wall 54 and the left outer wall 55 are connected to outer sides of the lower outer wall 54. When viewed along the front-rear direction 8, the front end sides of the upper outer wall 53, the lower outer wall 54, the right outer wall 55 and the left outer wall 56 are connected to the outer sides of the front outer wall 51, and the rear sides of the upper outer wall 53, the lower outer wall 54, the right outer wall 55 and the left outer wall 56 are connected to the outer sides of the rear outer wall 52.

It is noted that the right-left direction 9 is an example of a first *bidirectional* direction, and the front-rear direction 8 is an example of the second *bidirectional* direction. The right direction is an example of one *unidirectional* direction along the first *bidirectional* direction, while the left direction is an example of the other *unidirectional* direction along the first *bidirectional* direction.

Figure 3B:
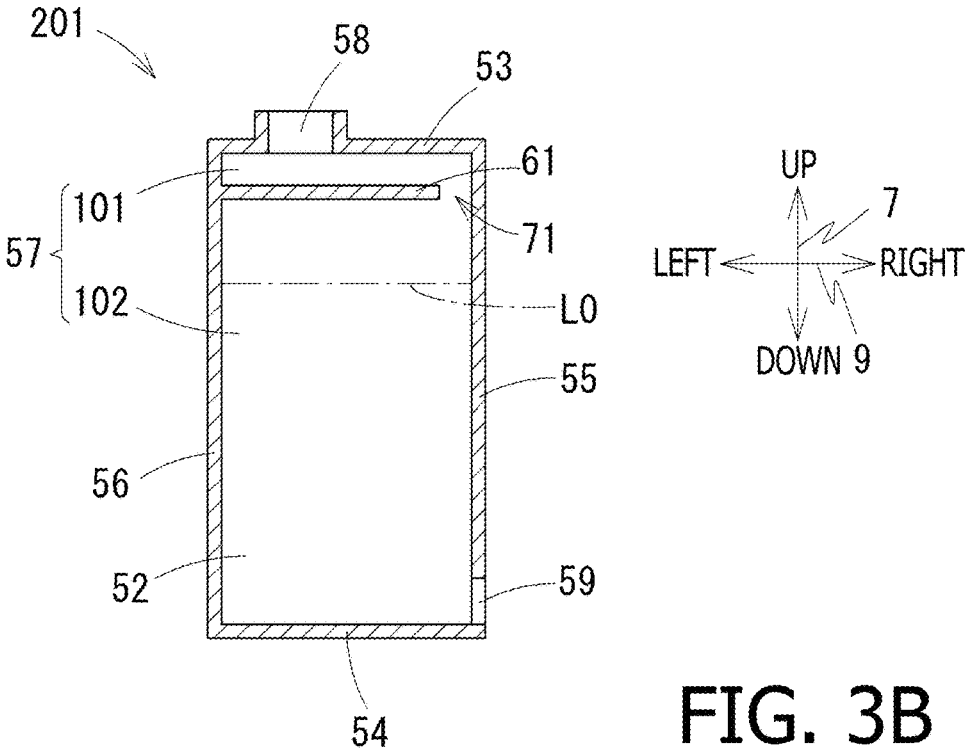
FIG. 3B is a cross-sectional view of the ink tank viewed along line [MA-MA] *IIIB-IIIB* in FIG. [3A] *3C.

As shown in FIG. 3B, the outer walls 51-56 [partitions] *define* an inner space 57 of the ink tank 201 from the outside. The ink tank 201 has an inlet [5] *58*, an outlet 59 and a not-shown air communicating port, through which the inner space 57 communicates with the outside. According to the present embodiment, the inlet 58 is a through hole piercing the upper outer wall 53 in the up-down direction 7. [the] *The* inlet 58 is arranged, in the right-left direction 9, on the left side with respect a center of the upper outer wall 53. The outlet 59 is a through hole piercing the right outer wall 55 in the right-left direction 9. The outlet 59 is arranged at a lower end part, in the up-down direction 7, of the right outer wall 55. The air communicating port is a through hole piercing the upper outer wall 53 in the up-down direction. *FIG. 3C is a plan view of the top of the ink tank 201. FIG. 3C includes a section line IIIB-IIIB from which the cross-sectional view of FIG. 3B is taken.*

As shown in FIG. 3A, the ink tank 201 has a cap 49 which is detachably attached to the inlet 58. When the user uses the printer 10, the inlet 58 of the ink tank 201 is normally sealed with the cap 49. When remaining ink 60 inside the ink tank 201 becomes reduced, the user removes the cap 49 from the inlet 58 and [inject] *injects* the ink 60 inside the ink tank 201 through the inlet 58. Thereafter, the user attaches the cap 49 to the inlet 58 to seal the same again. Incidentally, the outlet 59 is connected to the recording head 39 through the ink tubes (see FIG. 2). When the recording head 39 is not driven, the ink 60 inside the ink tank 201 does not [flows] *flow* toward the ink tubes 28 through the outlet 59.

According to the present embodiment, the outer walls 51-56 are molded from resin material and have substantially the same thicknesses. The ink tank 201 is configured such that at least one of the front outer wall 51 and the rear outer wall 52 is adhered to the other outer walls. At least one of the front outer wall 51 and the rear outer wall 52 may be a film formed from the resin material to have a thin-film shape.

As shown in FIG. 3B, the ink tank 201 has a first inner wall 61 which extends, in a state where the ink tank 201 takes the usage attitude, rightward from the left outer wall [61] *56*. The first inner wall 61 is a plate-like part substantially perpendicular to the up-down direction 7. The first inner wall 61 connects the front outer wall 51 and the rear outer wall 52. According to the present embodiment, the first inner wall 61 is molded, from the resin material, integrally with the outer walls [51-56] *51, 52, and 56*, and has substantially the same thickness with each of the outer walls 51-56.

The first inner wall 61 partitions the inner space 57 into two spaces aligned in the up-down direction 7, which are a first space 101 and a second space 102. The first space 101 is a space in which the inlet 58 is arranged. The second space 102 is a space where the outlet 59 is arranged. The first inner wall 61 is formed with a first communication hole 71 through which the first space 101 and the second space 102 communicate with each other. According to the first embodiment, the first [communicating] *communication* hole 71 is provided between the first inner wall 61 and the right outer wall 55. In a state where the ink tank 201 takes the usage attitude, the first inner wall 61 may be configured to extend, in the right-left direction 9, from the left outer wall 56 to the right outer wall 55. In such a case, the first communication hole 71 may be located at an intermediate position of the first inner wall 61 extending from the left outer wall 56 to the right outer wall 55.

As shown in FIG. 3A, on each of the outer walls 51, 52, 55 and 56, a full level line L0 is indicated. The full level line L0 is indicated at a lower position, in a state where the ink tank 201 takes the usage attitude, with respect to the first inner wall 61, and indicates the maximum amount (an example of a maximum liquid amount) of the ink 60 (an example of liquid) storable in the second space 102. If the ink 60 exceeding the maximum amount is stored in the ink tank 201, the printer 10 may not normally operate when the user uses the printer 10, or other defects such as leakage of the ink, overflow of the ink or the like may tend *to* occur easily. Therefore, a manufacturer of the printer 10 determines, in advance, the maximum amount of the ink 60 storable in the ink tank 201 in a state where the ink tank 201 takes the usage attitude. The full level line L0 is indicated at a position corresponding to an upper surface of the [link 60] *ink 60,* when the [stored amount of the ink 60] *tank 201* takes the usage attitude *and the stored amount of the ink 60* is the maximum amount. In the second space 102, a space below the full level line L0 is a fourth space 104. Further, on the left outer wall 56, a marking 48 corresponding to the full level line L0 is formed.

[Ink Leakage Preventing Structure]

The ink tank 201 has an ink leakage preventing structure. That is, the ink tank 201 has a particular structure with which, even if the ink tank 201 is inclined about an axis extending along the front-rear direction 8 with the inlet 58 being opened (i.e., the cap 49 being removed from the inlet 58), the ink 60 stored in the inner space 57 is prevented from [leaked] *leaking* outside. For example, in a case where the printer 10 is packed for [carriage] *transport* with the ink 60 being stored in the ink tank 201, there could be a chance that the printer 10 is inclined. The ink leakage preventing structure is for preventing the leakage of the ink 60 from the ink tank 201 in such a case. In the following description, as attitudes of the ink tank 201 which is inclined leftward (or rotated [counter-clockwise]*counterclockwise*) about the axis extending in the [right-left]*front-rear* direction 8, a first *non-usage* attitude (*e.g., a first counterclockwise orientation achieved by rotating the ink tank 201 counterclockwise*), a second *non-usage* attitude (*e.g., a second counterclockwise orientation achieved by further rotating the ink tank 201 counterclockwise*), and a third *non-usage* attitude (*e.g., a third counterclockwise orientation achieved by further rotating the ink tank 201 counterclockwise*) will be referred to. Further, as attitudes of the ink tank 201 inclined rightward (or rotated clockwise) about the axis extending in the [right-left] *front-rear* direction 8, a fourth *non-usage* attitude (*e.g., a first clockwise orientation achieved by rotating the ink tank 201 clockwise and positionally equivalent to the third counterclockwise orientation, but rotationally different*), a fifth *non-usage* attitude (*e.g., a second clockwise orientation achieved by further rotating the ink tank 201 clockwise and positionally equivalent to the second counterclockwise orientation, but rotationally different*), and a sixth *non-usage* attitude (*e.g., a third clockwise orientation achieved by further rotating the ink tank 201 clockwise and positionally equivalent to the first counterclockwise orientation, but rotationally different*) will be referred to.

[First *Non-usage* Attitude According to First Embodiment]

Figure 4A:
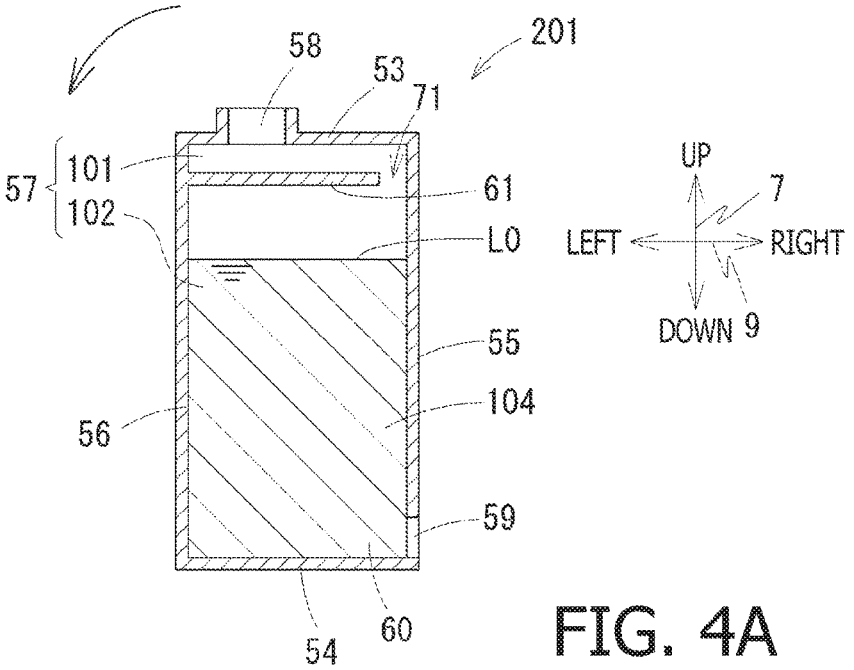
FIG. 4A is a vertical cross-sectional view of the ink tank according to the first embodiment when the ink tank takes a usage attitude.
Figure 4B:
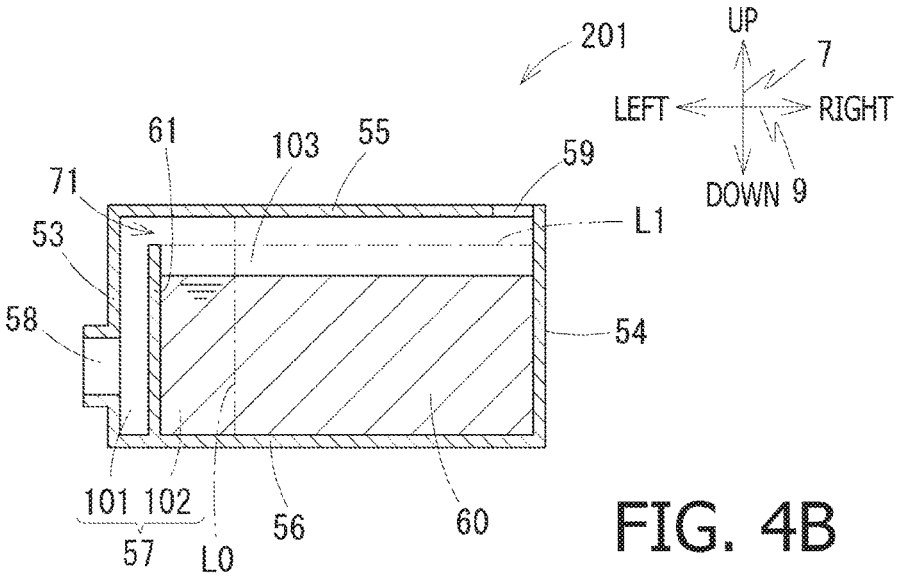
FIG. 4B is a vertical cross-sectional view of the ink tank according to the first embodiment when the ink tank takes a first *non-usage* attitude.

Referring to FIGS. 4A and 4B, the ink tank 201 [of which] *whose* attitude is changed from the usage attitude to the first *non-usage* attitude (*i.e., the first counterclockwise orientation*) will be described. In a state where the ink tank 201 takes the usage attitude, as shown in FIG. 4A, the ink 60 is stored to the full level line L0 in the inner space 57 of the [of the] ink tank 201.

FIG. 4B shows the ink tank 201 taking the first *non-usage* attitude (*i.e., the counterclockwise first orientation*). The first *non-usage* attitude is defined as an attitude when the ink tank 201 taking the usage attitude is rotated leftward (i.e., rotated counterclockwise [in] *from the usage attitude of* FIG. 4A) about the axis extending in the front-rear direction 8 such that a rotation angle is larger than 0 degree to 90 degrees or less. Hereinafter, a term "rotation angle" is used to indicate a rotated angle of the ink tank with respect to its usage attitude. That is, in the following description, the rotation angle of "0" degree corresponds to the usage attitude of the ink tank 201, and rotation angles referred to in the following description are angles measured with respect to the usage attitude of the ink tank 201. In the ink tank 201 taking the first *non-usage* attitude as shown in FIG. 4B, a part of the second space 102 serves also as a third space 103. As shown in FIG. 4B, the third space 103 is [partitioned] *defined* by the first inner wall 61, the lower outer wall 54, the left outer wall 56, the front outer wall 51 and the rear outer wall 52. The third space 103 is below a lowest position L1 of a surface of the first inner wall 61 defining the first communication hole 71. The third space 103 is capable of storing the ink 60, which is stored in the fourth space 104 (see FIG. 4A) in a state where the ink tank 201 takes the usage attitude. In other words, in a state where the ink tank 201 takes the first *non-usage* attitude, the first inner wall 61 extends upward such that a capacity of the third space 103 is equal to or larger than the capacity of the fourth space 104.

[Fourth *Non-usage* Attitude According to First Embodiment]

Figure 5A:
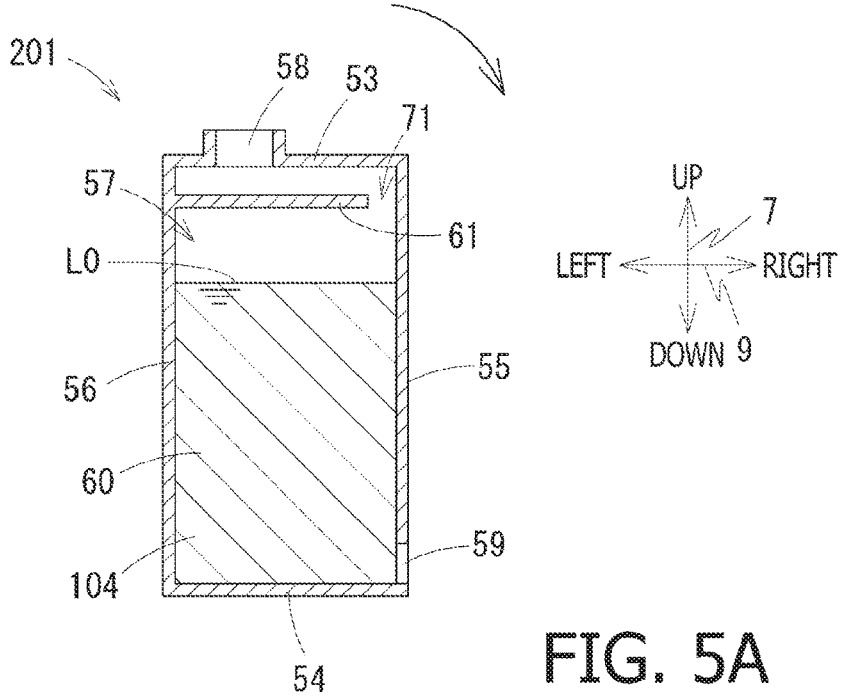
FIG. 5A is a vertical cross-sectional view of the ink tank according to the first embodiment when the ink tank takes the usage attitude.
Figure 5B:
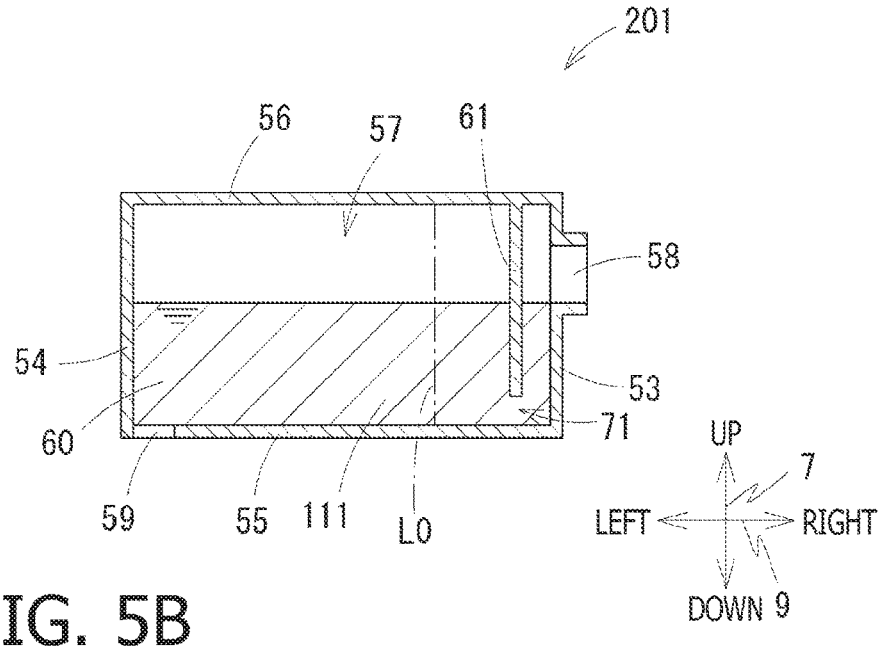
FIG. 5B is a vertical cross-sectional view of the ink tank according to the first embodiment when the ink tank takes a fourth *non-usage* attitude.

Referring to FIGS. 5A and 5B, the ink tank 201 [of which] *whose* attitude is changed from the usage attitude (i.e., the rotation angle is 0 degree) to the fourth *non-usage* attitude (*i.e., the first clockwise orientation*) will be described. In a state where the ink tank 201 takes the usage attitude, as shown in FIG. 5A, the ink 60 is stored to the full level line L0 in the inner space 57 of the [of the] ink tank 201.

FIG. 5B shows the ink tank 201 taking the fourth *non-usage* attitude (in particular, the rotation angle is 90 degrees). The fourth *non-usage* attitude (*e.g., the first clockwise orientation*) is defined as an attitude when the ink tank 201 taking the usage attitude (i.e., when the rotation angle is 0 degree) is rotated rightward (i.e., clockwise in FIG. 5A) about the axis extending in the front-rear direction 8 such that the rotation angle is larger than 0 degree to 90 degrees or less. In the ink tank 201 taking the fourth *non-usage* attitude, a part of the inner space 57 is [an eleventh] *a* space 111. The [eleventh] space 111 is [partitioned] *defined* by the upper outer wall 53, the lower outer wall 54, the right outer wall 55, the front outer wall 51 and the rear outer wall 52. The [eleventh] space 111 is defined below a level of the inlet 58. The [eleventh] space 111 is capable of storing the ink 60, which is stored in the fourth space 104 (see FIG. 5A) in a state where the ink tank 201 takes the usage attitude. In other words, the inlet [108] *58* is provided such that a capacity of the [eleventh] space 111, in a state where the ink tank 201 takes the fourth *non-usage* attitude, is equal to or larger than the capacity of the fourth space 104.

Effects of First Embodiment

With the printer 10 according to the first embodiment, even if the attitude of the ink tank 201 is changed from the usage attitude to the first *non-usage* attitude in which the ink tank 201 is rotated [leftward] *counterclockwise* such that the rotation angle is changed from 0 degree to 90 degrees about the axis extending in the front-rear direction 8, the ink 60 stored in the fourth space 104 below the full level line L0 in a state where the ink tank 201 takes the usage attitude can be reserved in the third space 103. Therefore, even if the ink tank 201 is rotated about the axis extending in the front-rear direction 8 with the cap 49 being removed (i.e., the inlet 58 being opened), the ink 60 inside the inner space 57 hardly flow out of the ink tank 201.

Further, even if the attitude of the ink tank 201 is changed from the usage attitude to the fourth *non-usage* attitude in which the ink tank 201 is rotated [rightward] *clockwise* such that the rotation angle is changed from 0 degree to 90 degrees about the axis extending in the front-rear direction 8, the ink 60 inside the inner space 57 hardly flow out of the ink tank 201 since the capacity of the [eleventh] space 111 is equal to or larger than the capacity of the fourth space 104.

[Ink Tank According to Second Embodiment]

Referring to FIGS. 6, 7A-7C and 8A-8C, an ink tank 202 according to a second embodiment of the present disclosures will be described. The ink tank 202 according to the second embodiment has a second inner wall 62 in addition to the structure of the ink tank 201 according to the first embodiment. Since the structure of the ink tank 202 other than the second inner wall 62 is the same as that of the ink tank 201 according to the first embodiment, detail description of the same structure will be omitted.

Figure 6:
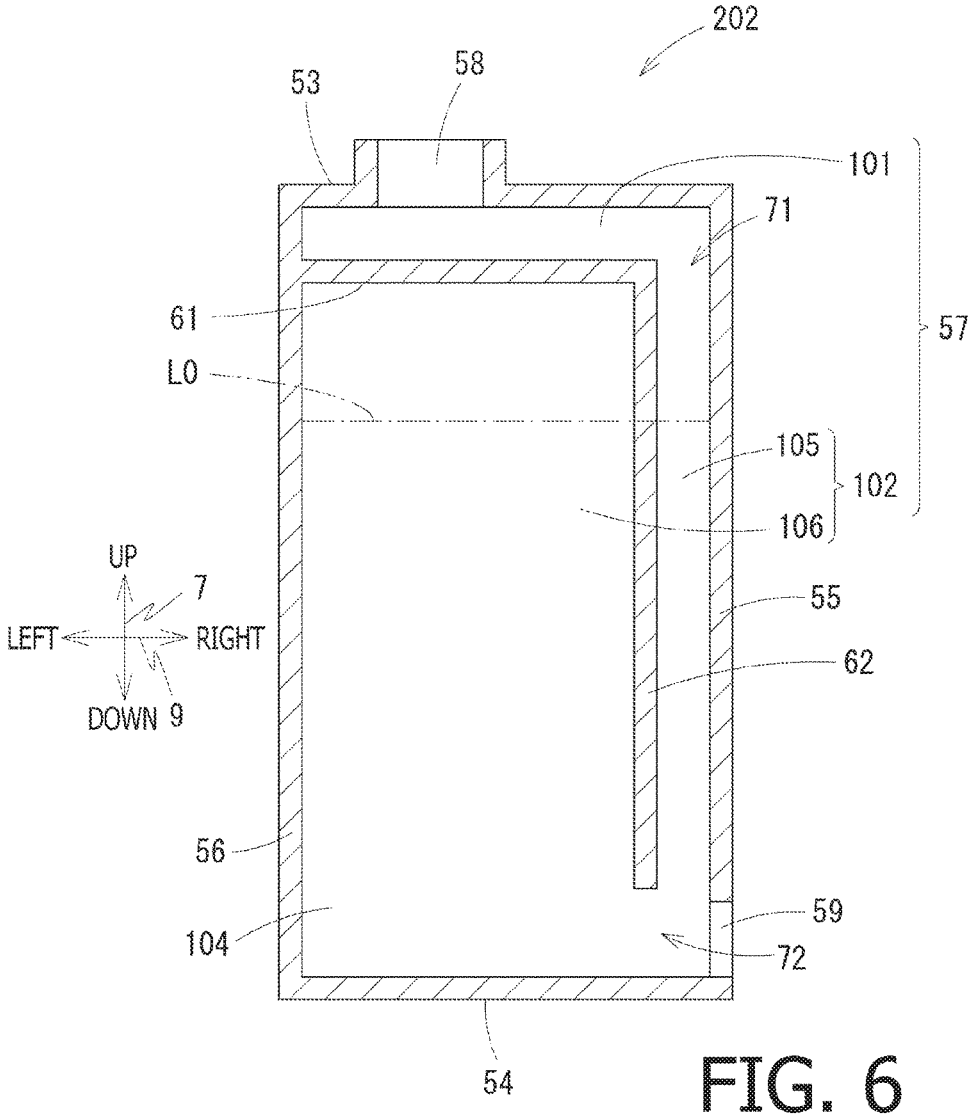
FIG. 6 is a vertical cross-sectional view of an ink tank according to a second embodiment when the ink tank takes the usage attitude.

As shown in FIG. 6, the ink tank 202 has the second inner wall 62 which extends, in a state where the ink tank 202 takes the usage attitude, downward from a part of the first inner wall 61, at a position *on the inner wall 61* on the left side [with respect to] *of* the first communication hole 71. The second inner wall 62 is plate-shaped part perpendicular to the right-left direction 9. The second inner wall 62 connects the front outer wall 51 and the rear outer wall 52. According to the present embodiment, the second inner wall 62 is formed integrally with the outer walls [51-56] *51 and 52* by molding from the resin, and the thickness of the second inner wall 62 is substantially the same as the thicknesses of the outer walls 51-56.

[First and Second *Non-usage* Attitudes According to Second Embodiment]

Figure 7B:
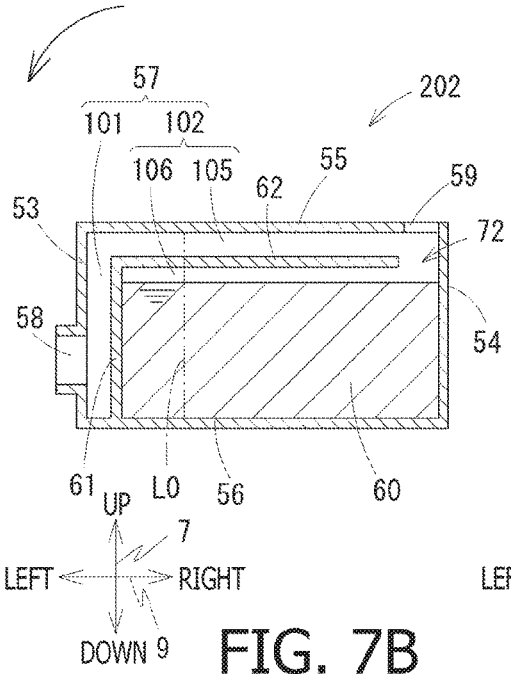
FIG. 7B is a vertical cross-sectional view of the ink tank according to the second embodiment when the ink tank takes the first *non-usage* attitude.
Figure 7A:
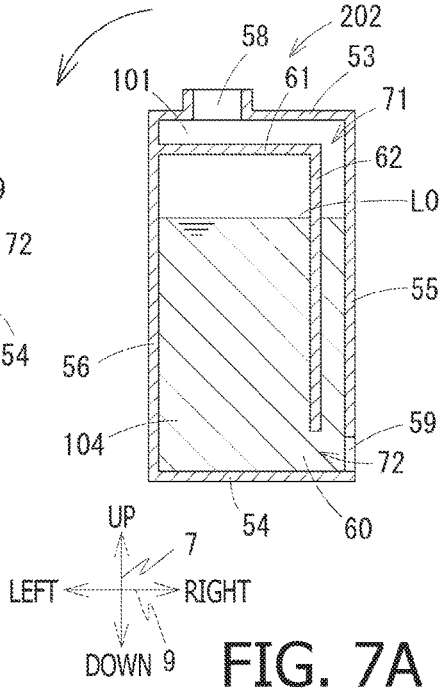
FIG. 7A is a vertical cross-sectional view of the ink tank according to the second embodiment when the ink tank takes the usage attitude.
Figure 7C:
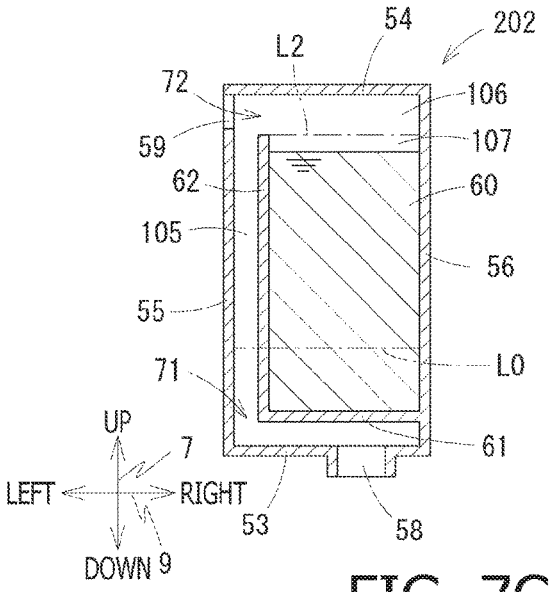
FIG. 7C is a vertical cross-sectional view of the ink tank according to the second embodiment when the ink tank takes a second *non-usage* attitude.

Referring to FIGS. 7A-7C, the ink tank [200 of which] *202 whose* attitude is changed from the usage attitude to a second *non-usage* attitude (*i.e., the second counterclockwise orientation*) via a first *non-usage* attitude (*i.e., the first counterclockwise orientation*) (i.e., when the rotation angle is changed from 0 degree to 180 degrees) will be described. As shown in FIG. 7A, in a state where the ink tank 202 takes the usage attitude, the ink 60 is stored in the inner space 57 to the full level line L0. That is, the ink 60 is fully stored, in a state where the ink tank 202 takes the *usage attitude, in the* fourth space 104.

FIG. 7B [show] *shows* a state where the ink tank 202 takes the first *non-usage* attitude. The first *non-usage* attitude is an attitude when the ink tank 202 taking the usage attitude is rotated leftward (i.e., rotated counterclockwise) from *larger than* 0 degree to 90 degrees or less about the axis extending in the front-rear direction. In a state where the ink tank 202 takes the first *non-usage* attitude, the second space 102 is partitioned to a fifth space 105 above the second inner wall 62, and a sixth space 106 below the second inner wall 62. In a state where ink tank 202 takes the usage attitude, according to the second embodiment, since the second inner wall 62 extends immediately downward, the sixth space 106 [is] coincides with the third space 103 of the ink tank 201 according to the first embodiment.

The second inner wall 62 has a second communication hole 72 through which the fifth space 105 and the sixth space 106 communicate with each other. According to the second embodiment, the second communication hole 72 is located between the second inner wall 62 and the lower outer wall 54. In a state where the ink tank 202 takes the usage attitude, the second inner wall 62 may be configured to extend, in the up-down direction, from the first inner wall 61 to the lower outer wall 54. In such a case, the second communication [will] *hole* 72 may be formed at an intermediate position of the second inner wall 62 extending from the first inner wall 61 to the lower outer wall 54.

The ink 60 stored in the fourth space 104 in a state where the ink tank takes the usage attitude (i.e., when the rotation angle is 0 degree) as shown in FIG. 7A is reserved in the sixth space 106 in a state where the ink tank 202 takes the first *non-usage* attitude as shown in FIG. 7B. It is noted that the capacity of the sixth space 106 is larger than the capacity of the fourth space 104.

FIG. 7C shows the ink tank 202 taking the second *non-usage* attitude. The second *non-usage* attitude is defined as an attitude in a state where the ink tank 202 taking the usage attitude is rotated leftward (i.e., when rotated counterclockwise) about the axis extending in the front-rear direction such that the rotation angle is larger than 90 degrees to 180 degrees or less. In a state where the ink tank 202 takes the second *non-usage* attitude, a part of the sixth space 106 serves also as a seventh space 107. The seventh space 107 is [partitioned] *defined* by the first inner wall 61, the second inner wall 62, the left outer wall 56, the front outer wall 51 and the rear outer wall 52. The seventh space 107 is a space below the lowest position L2 of a surface of the second inner wall 62 defining *the* second communication hole 72. The seventh space 107 is capable of reserving the ink 60 which is stored in the fourth space 104 (see FIG. 4A) in a state where the ink tank 202 takes the usage attitude. In a state where the ink tank 202 takes the second *non-usage* attitude, the second inner wall 62 extends upward such that the capacity of the seventh space 107 is equal to or larger than the capacity of the fourth space 104.

As shown in FIG. 7C, the ink 60 stored in the sixth space 106 in a state where the ink tank 202 takes the first *non-usage* attitude (see FIG. 7B: when the rotation angle is 0-90 degrees) is reserved in a seventh space 107 in a state where the ink tank takes the second *non-usage* attitude. The capacity of the seventh space 107 is larger than the capacity of the fourth space 104. Therefore, the ink 60 stored in the fourth space 104 in a state where the ink tank takes the usage attitude (see FIG. 7A) is reserved in the [seven the] *seventh* space 107 in a state where the ink tank 202 takes the second *non-usage* attitude as shown in FIG. 7C.

[Fourth and Fifth *Non-usage* Attitudes According to Second Embodiment]

Figure 8A:
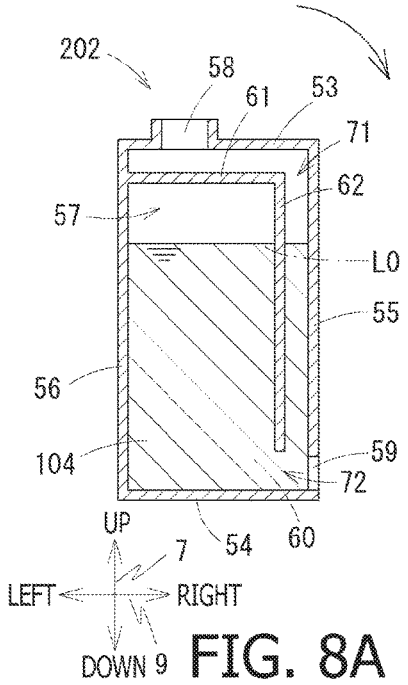
FIG. 8A is a vertical cross-sectional view of the ink tank according to the second embodiment when the ink tank takes the usage attitude.
Figure 8B:
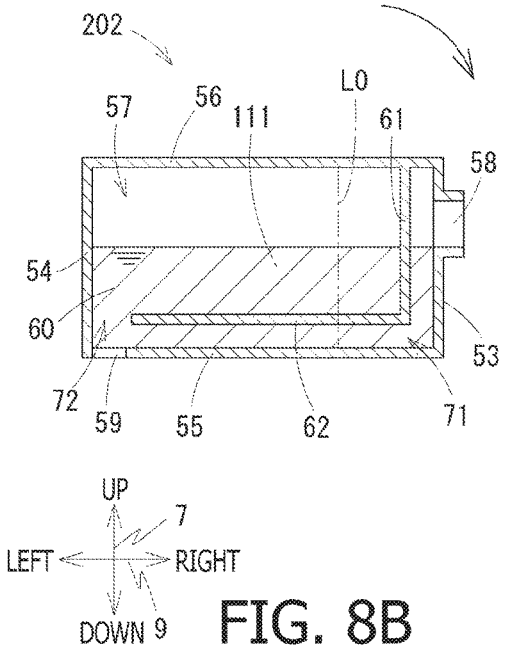
FIG. 8B is a vertical cross-sectional view of the ink tank according to the second embodiment when the ink tank takes the fourth *non-usage* attitude.
Figure 8C:
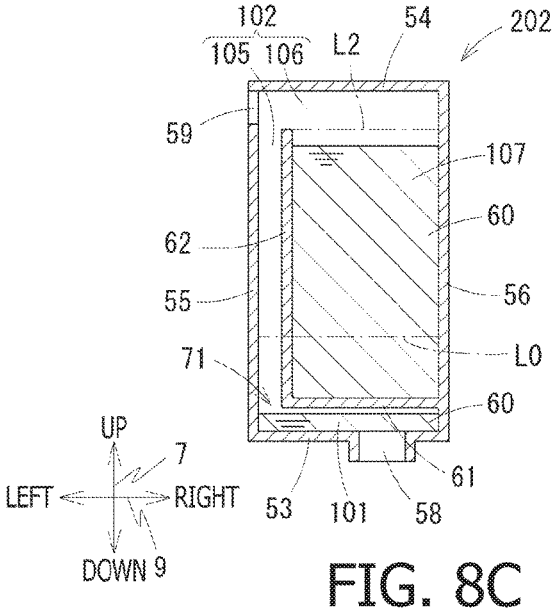
FIG. 8C is a vertical cross-sectional view of the ink tank according to the second embodiment when the ink tank takes a fifth *non-usage* attitude.

Referring to FIGS. 8A-8C, the ink tank 202 [of which] *whose* attitude is changed from the usage attitude to the fifth *non-usage* attitude via the fourth *non-usage* attitude will be described. As shown in FIG. 8A, in the inner space 57 of the ink tank 202 taking the usage attitude, the ink 60 is stored up to the full level line L0. That is, the fourth space is filled with the ink 60.

FIG. 8B shows a state where the ink tank 202 takes the fourth *non-usage* attitude. The fourth *non-usage* attitude is defined as an attitude in a state where the ink tank 202 taking the usage attitude is rotated rightward (i.e., clockwise) about the axis extending in the front-rear direction 8 such that the rotation angle is larger than 0 degree to 90 degrees or less. In a state where the ink tank 202 takes the fourth *non-usage* attitude, a part of the inner space 57 is the [eleventh] space 111 which is described above referring to FIG. 5B. When the attitude of the ink tank 202 is changed from the usage attitude (FIG. 8A) to the fourth *non-usage* attitude (FIG. 8B), the ink 60 stored in the fourth space 104 is reserved in the [eleventh] space 111.

FIG. 8C shows the ink tank 202 taking the fifth *non-usage* attitude. The fifth *non-usage* attitude is defined as an attitude when the ink tank taking the usage attitude is rotated rightward (i.e., clockwise) about the axis extending in the front-rear direction such that the rotation angle is larger than 90 degrees to 180 degrees or less. It is noted that the fifth *non-usage* attitude [is the same as] *coincides with* the second *non-usage* attitude described above referring to FIG. 7C.

When the attitude of the ink tank 202 is changed from the fourth *non-usage* attitude shown in FIG. 8B to the fifth *non-usage* attitude shown in FIG. 8C, a part of the ink 60 stored in the [eleventh] space 111 is reserved in the seventh space 107, and the remainder is stored in the first space 101. The ink stored in the first space 101 could flow outside in a state where the cap 49 is removed from the ink tank 202.

Effects of Second Embodiment

With the printer 10 according to the second embodiment, even when the attitude of the ink tank 202 is changed from the usage attitude to the second *non-usage* attitude which is the attitude when the ink tank 202 is rotated [leftward] *counterclockwise* by *larger than* 90 degrees to 180 degrees about the axis extending in the front-rear direction, the ink 60 stored in the fourth space 104, below the full level line L0 in a state where the ink tank 202 takes the usage attitude is reserved in the seventh space 107. Therefore, even if the ink tank 202 is rotated about the axis extending in the front-rear direction 8 with the inlet 58 being opened, the ink 60 stored in the inner space 57 hardly flows outside.

Further, even when the attitude of the ink tank 202 is changed from the usage attitude to the fifth *non-usage* attitude, which is the attitude when the ink tank 202 is rotated [rightward] *clockwise* by *larger than* 90 degrees to 180 degrees about the axis extending in the front-rear direction 8, [a part] *most* of the ink 60 stored in the [eleventh] space 111 is reserved in the seventh space 107, [and] *thereby preventing most of* the ink 60 stored in the inner space 57 [hardly flows] *from flowing* outside.

[Ink Tank According to Third Embodiment]

Figure 9A:
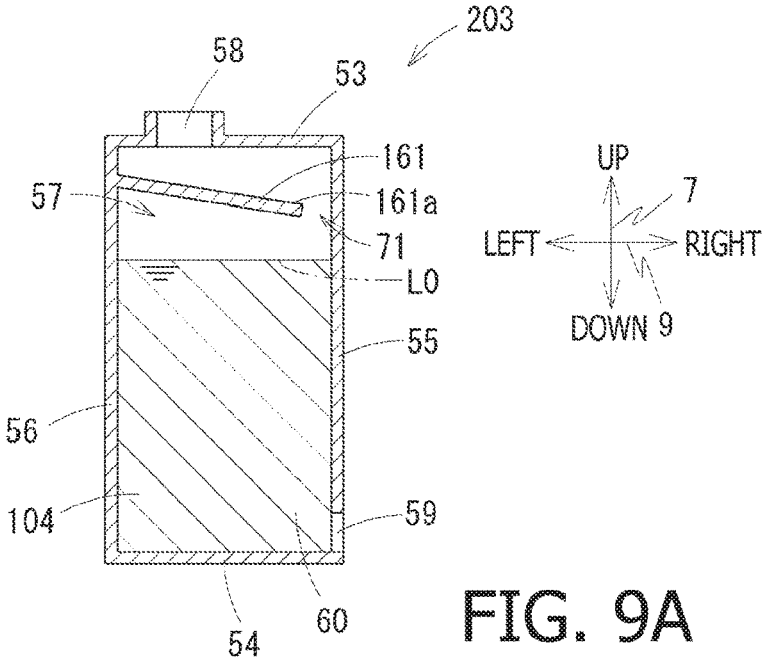
FIG. 9A is a vertical cross-sectional view of the ink tank according to a third embodiment when the ink tank takes the usage attitude.

Referring to FIG. 9A, an ink tank 203 according to a third embodiment will be described. The ink tank 203 according to the third embodiment is provided with a first inner wall 161 which is different from the first inner wall 61 of the ink tank [101] *201* according to the first embodiment. Since the other structure of the ink tank 203 is the same as that of the ink tank 201, only the first inner wall 161 will be described.

As shown in FIG. 9A, the first inner wall 161 of the ink tank 203 extends in a lower right direction in a state where the ink tank 203 takes the usage attitude. In a state where the ink tank 203 takes the usage attitude, a distance [of a portion on] *between the upper outer wall 53 and* an upper surface 161a of the first inner wall 161 *increases as the first inner wall 161 extends* from the left outer wall 56 toward the right outer wall 55 [is longer, the]. *Also, a* portion [on the upper surface 161a] of the first inner wall 161 *nearer the right outer wall 55* is located at a lower position *relative to another portion of the first inner wall 161 nearer the left outer wall 56*.

Effect of Third Embodiment

With the printer 10 according to the third embodiment, since the distance [of a portion on an upper surface 161a of the first inner wall 161 from the left outer wall 56 toward the right outer wall 55 is longer, the portion on the upper surface 161a of the first inner wall 161 is located at a lower position] *between the upper outer wall 53 and an upper surface 161a of the first inner wall 161 increases as the first inner wall 161 extends from the left outer wall 56 and a portion of the first inner wall 161 nearer the right outer wall 55 is located at a lower position relative to the other portion of the first inner wall 161 nearer the left outer wall 56*, the ink 60 is prevented from [being kept collected] *collecting* on the first inner wall 161. Therefore, generation of unusable ink which cannot be used by the recording assembly in a state where the ink tank 203 takes the usage attitude can be prevented in addition with the effect provided by the first embodiment.

[Ink Tank According to Fourth Embodiment]

Figure 9B:
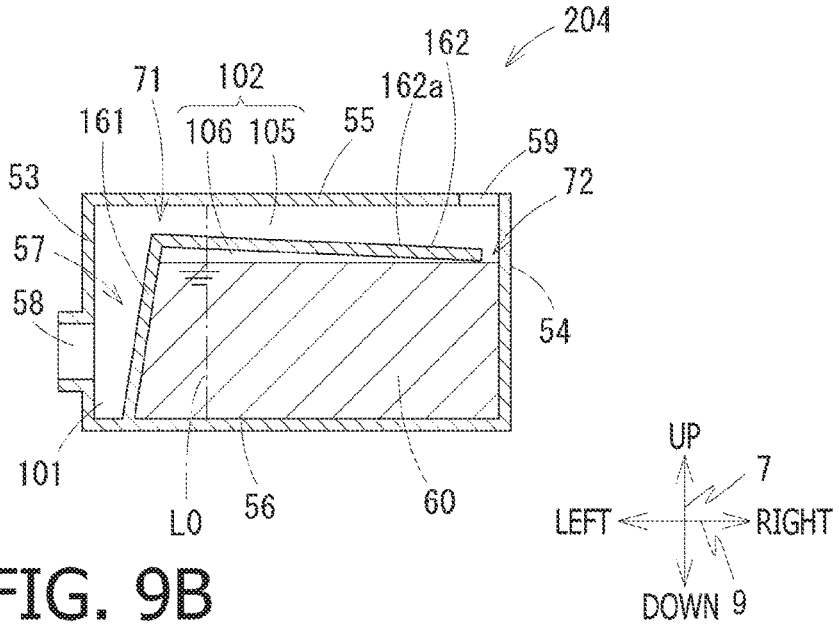
FIG. 9B is a vertical cross-sectional view of the ink tank according to [the third] *a fourth* embodiment when the ink tank takes the [fourth] *first non-usage* attitude.

Referring to FIG. 9B, an ink tank 204 according to a fourth embodiment will be described. The ink tank 204 according to the fourth embodiment is configured such that the first inner wall 161 according to the third embodiment is provided to the ink tank 202 according to the second embodiment, and further a second inner wall 162, which is different from the [first] *second* inner wall 62 of the second embodiment, is provided. The other configuration of the fourth embodiment is the same as that of the second embodiment and the detail description thereof will be omitted. *In FIG. 9B, the ink tank 204 takes the first non-usage attitude.*

As shown in FIG. 9B, [in a state where the ink tank 204 takes the first attitude,] the *second* inner wall 162 [provided to the ink tank 204] extends [in a lower right direction] *toward the lower outer wall 54 and slightly toward the left outer wall 56* (*e.g., away from the right outer wall 55*), such that a *distance between a* right side surface 162a (*which is closer to the right outer wall 55 than an opposite surface of the second inner wall 162*) of the second inner wall 162 [inclines downward] *and the right outer wall 55 increases as the second inner wall 162 extends away* from the first inner wall 161 [side] *and* toward the [right side in a state where the ink tank 204 takes the first attitude] *lower outer wall 54*. Accordingly, in a state where the ink tank 204 takes the usage attitude, the second inner wall 162 extends, *from the first inner wall 161,* in [the] *a* lower left direction [such that the right side surface 162a of the second inner wall 162 extends downward from the first inner wall side 161 toward the left side].

Effects of Fourth Embodiment

With the printer 10 according to the fourth embodiment, [since] the second inner wall 162 is shifted leftward as it extends downward in a state where the ink tank 204 takes the usage attitude. Therefore, in a state where the ink tank 204 takes the first *non-usage* attitude, the ink 60 is prevented from being collected on the second inner wall 62, and thus, from flowing toward the inlet 58.

[Ink Tank According to Fifth Embodiment]

Referring to FIGS. 10, 11A-11D and 12A-12D, an ink tank 205 according to a fifth embodiment will be described. The ink tank 205 according to the fifth embodiment is configured to have the structure of the ink tank 202 according to the second embodiment, and further a third inner wall 63. The other configuration of the ink tank 205 according to the fifth embodiment is the same as that of the second embodiment, and the detailed description therefor will be omitted.

Figure 10:
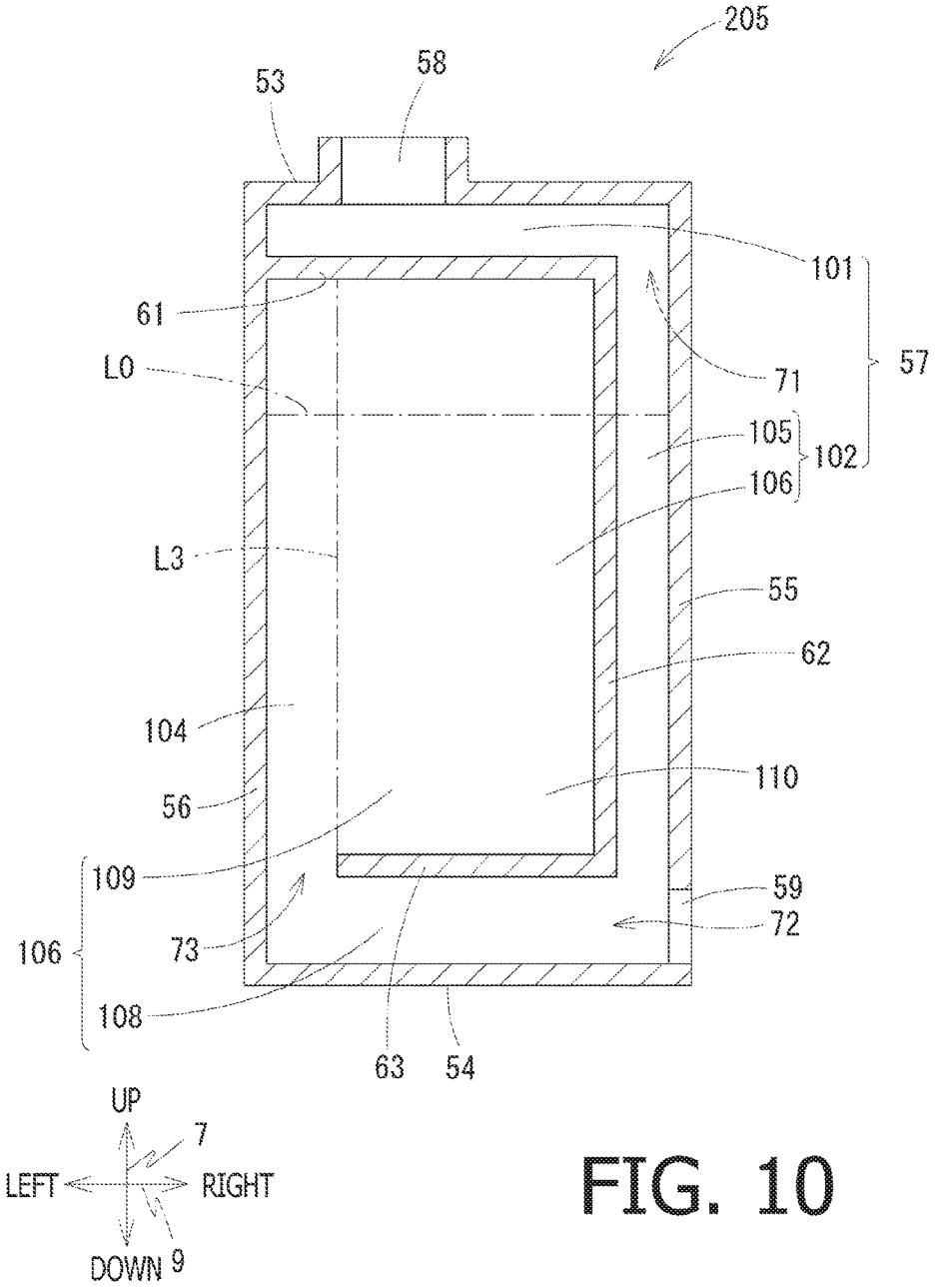
FIG. 10 is a vertical cross-sectional view of the ink tank according to a [fourth] *fifth* embodiment when the ink tank takes the usage attitude.

As shown in FIG. 10, the ink tank 205 has a third inner wall 63 which extends leftward from a position of the second inner wall 62 on an upper side with respect to the second communication hole 72 in a state where the ink tank 205 takes the usage attitude. The third inner wall 63 is a plate-shaped part extending in the [up-down] *left-right* direction [7] *9*. The third inner wall 63 connects the front outer wall 51 and the rear outer wall 52. The third inner wall 63 is formed by molding from the resin material integrally with the outer walls [51-56] *51-52*, and the thickness of the third *inner* wall [63f] *63* is substantially the same as the thicknesses of the outer walls 51-56.

[First, Second and Third *Non-usage* Attitude of Fifth Embodiment]

Figure 11B:
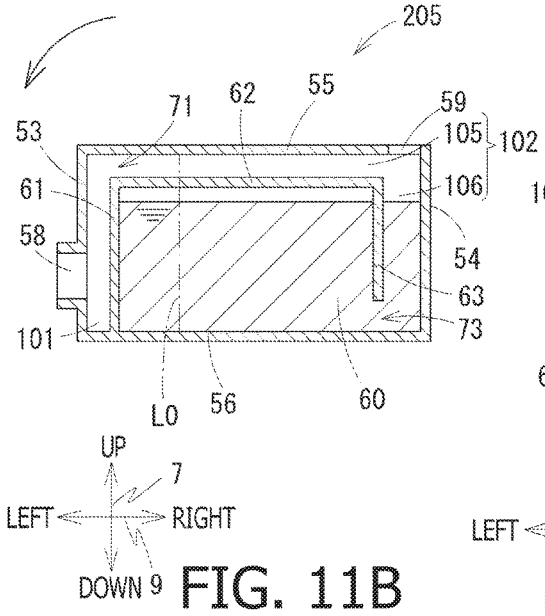
FIG. 11B is a vertical cross-sectional view of the ink tank according to the fifth embodiment when the ink tank takes the first *non-usage* attitude.
Figure 11A:
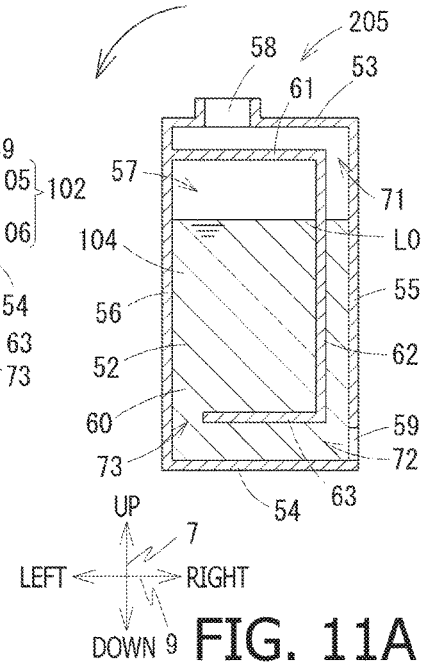
FIG. 11A is a vertical cross-sectional view of the ink tank according to [a] *the* fifth embodiment when the ink tank takes the usage attitude.

Referring to FIGS. 11A-11D, the ink tank 205 [of which attitudes] *whose attitude* is changed from the usage attitude to the first *non-usage* attitude (*i.e., the first counterclockwise orientation*), from the first *non-usage* attitude to the second *non-usage* attitude (*i.e., the second counterclockwise orientation*), *and* from the second *non-usage* attitude to the third *non-usage* attitude[, from the third attitude to the fourth attitude] (*i.e., the third counterclockwise orientation*) *will be described*. As shown in FIG. 11A, the ink 60 is stored in the inner space 57 of the ink tank 205, in a state where the ink tank 205 takes the usage attitude, up to the full level line L0. That is, the ink 60 is filled [with] *within* the fourth space 104.

FIG. 11B shows the ink tank 205 taking the first *non-usage* attitude. The first *non-usage* attitude is an attitude of the ink tank 205 when the ink tank 205 taking the usage attitude is rotated leftward (*counterclockwise*) by 90 degrees about the axis extending in the front-rear direction 8. In the ink tank 205 taking the first *non-usage* attitude, the second space 102 is partitioned to the fifth space 105, which is described above referring to FIG. 7B in the second embodiment, and a [six] *sixth* space 106. The ink 60 stored in the fourth space 104, in a state where the ink tank 205 takes the [fourth space 104] *usage attitude*, is reserved in the sixth space 106 in a state where the ink tank 205 takes the first *non-usage* attitude shown in FIG. 11B.

Figure 11C:
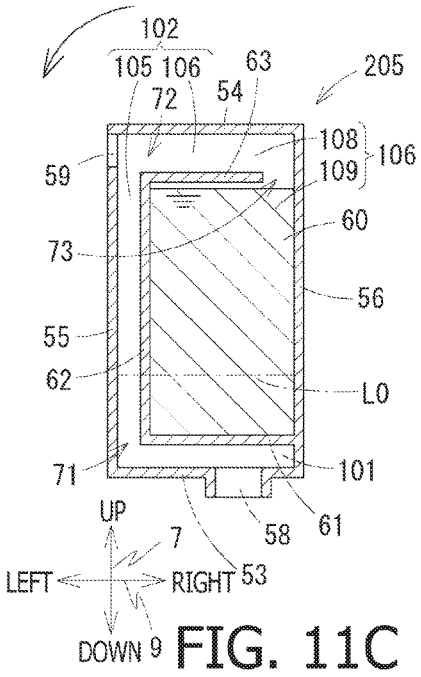
FIG. 11C is a vertical cross-sectional view of the ink tank according to the fifth embodiment when the ink tank takes the second *non-usage* attitude.

FIG. 11C shows the ink tank 205 taking the second *non-usage* attitude. The second *non-usage* attitude is defined as an attitude of the ink tank 205 when the ink tank 205 taking the usage attitude is rotated leftward (i.e., counterclockwise) about the axis extending in the front-rear direction 8 such that the rotation angle is larger than 90 degrees to 180 degrees or less. In the ink tank 205 taking the second *non-usage* attitude, the sixth space 106 is partitioned to [an eighth] *a* space 108 located on an upper side with respect to the third inner wall 63 and a [ninth] space 109 located on a lower side with respect to the third inner wall 63.

The third inner wall 63 has a third communication hole 73 through which the [eighth] space 108 and the [ninth] space 109 communicate with each other. According to the fifth embodiment, the third communication hole 73 is formed between the third inner wall 63 and the left outer wall 56. In a state where the ink tank 205 takes the usage attitude, the third inner wall 63 may extend, in the right-left direction, from the second inner wall 62 to the left outer wall 56. In this case, the third communication hole 73 is formed at an intermediate position of the third inner wall 63 extending from the second inner wall 62 to the left outer wall 56.

As shown in FIG. 11C, the ink 60 stored in the sixth space 106 in a state where the tank 205 takes the first *non-usage* attitude as shown in FIG. 11B is reserved in the [ninth] space 109 in a state where the ink tank 205 takes the second *non-usage* attitude. The capacity of the [ninth] space 109 is equal to or larger than the capacity of the fourth space 104. Therefore, the ink 60 reserved in the fourth space 104 in a state where the ink tank 205 takes the usage attitude as shown in FIG. 11A is reserved in the [ninth] space 109 in a state where the ink tank 205 takes the second *non-usage* attitude.

Figure 11D:
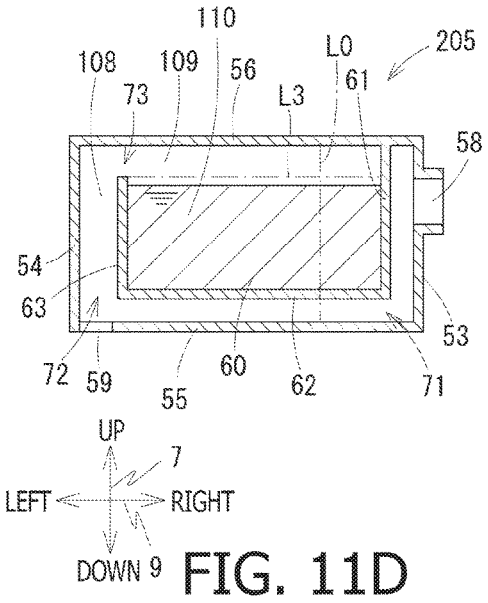
FIG. 11D is a vertical cross-sectional view of the ink tank according to the fifth embodiment when the ink tank takes a third *non-usage* attitude.

FIG. 11D shows the ink tank 205 taking the third *non-usage* attitude. The third *non-usage* attitude is an attitude of the ink tank 205 when the ink tank 205 taking the usage attitude is rotated leftward (*counterclockwise*) by 270 degrees about the axis extending in the front-rear direction 8. In the ink tank 205 taking the third *non-usage* attitude, a part of the [ninth] space 109 is a [tenth] space 110. The [tenth] space 110 is [partitioned] *defined* by the first inner wall 61, the second inner wall 62, the third inner wall 63, the front outer wall 51 and the rear outer wall 52. The [tenth] space 110 is defined on the lower side with respect to a lowermost position L3 of a surface of the third inner wall 63 defining the third communication hole 73. The [tenth] space 110 can store the ink 60 stored in the fourth space 104 (see FIG. 4A) of the ink tank 205 taking the usage attitude. In a state where the ink tank 205 takes the third *non-usage* attitude, the third inner wall 63 extends upward such that the capacity of the [tenth] space 110 is equal to or larger than the capacity of the fourth space 104.

As shown in FIG. 11D, the ink 60 stored in the [ninth] space 109 of the ink tank 205 taking the second *non-usage* attitude as shown in FIG. 11C is reserved in the [tenth] space 110 in a state where the ink tank 205 takes the third *non-usage* attitude. The capacity of the [tenth] space 110 is equal to or larger than the capacity of the fourth space 104. Therefore, the ink 60 stored in the fourth space 104 of the ink tank 205 taking the usage attitude as shown in FIG. 11A is reserved in the [tenth] space 110 in a state where the ink tank 205 takes the third *non-usage* attitude.

When the ink tank 205 is rotated [leftward] *counterclockwise* about the axis in the front-rear direction 8 to change the attitude of the ink tank 205 from the third *non-usage* attitude to the usage attitude, the ink 60 stored in the [tenth] space 110 is reserved in the fourth space 104.

[Fourth, Fifth and Sixth *Non-usage* Attitudes According to Fifth Embodiment]

Figure 12A:
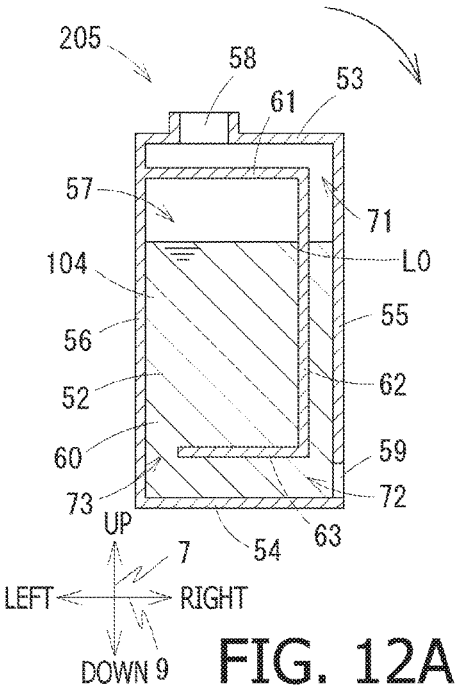
FIG. 12A is a vertical cross-sectional view of the ink tank according to the fifth embodiment when the ink tank takes the usage attitude.

Referring to FIGS. 12A-12D, the ink tank 205 [of which] *whose* attitude is changed from the usage attitude to the fourth *non-usage* attitude (*i.e., the first clockwise orientation*), from the fourth *non-usage* attitude to the fifth *non-usage* attitude (*i.e., the second clockwise orientation*), *and* from the fifth *non-usage* attitude to the sixth *non-usage* attitude (*i.e., the third clockwise orientation*) will be described. As shown in FIG. 12A, the ink 60 is stored in the inner space 57 of the ink tank 205 taking the usage attitude up to the full level line L0.

Figure 12B:
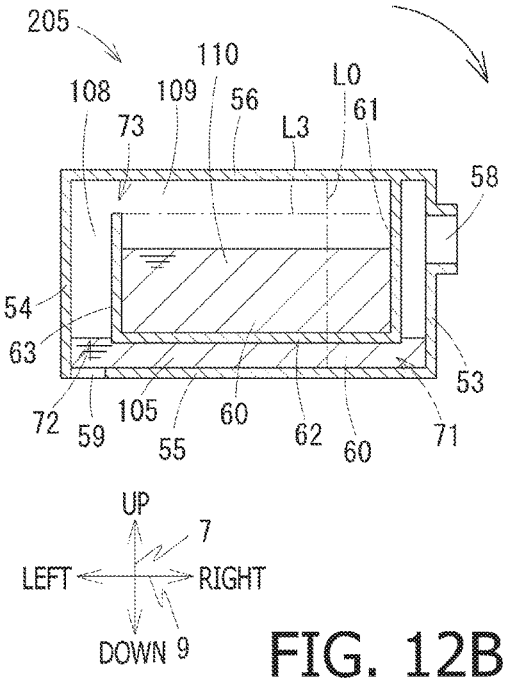
FIG. 12B is a vertical cross-sectional view of the ink tank according to the fifth embodiment when the ink tank takes the fourth *non-usage* attitude.

FIG. 12B shows the ink tank 205 taking the fourth *non-usage* attitude (*i.e., the first clockwise orientation*). The fourth *non-usage* attitude is defined as an attitude of the ink tank 205 when the ink tank 205 taking the usage attitude is rotated rightward (i.e., clockwise) about the axis extending in the front-rear direction 8 such that the rotation angle is larger than 0 degree to 90 degrees or less. The fourth *non-usage* attitude coincides with the third *non-usage* attitude which is described above referring to FIG. 11D.

When the attitude of the ink tank 205 is changed from the usage attitude shown in FIG. 12A to the fourth *non-usage* attitude shown in FIG. 12B, a part of the ink 60 stored in the fourth space 104 is reserved in the [tenth] space 110, while the remainder is reserved in the fifth space 105.

Figure 12D:
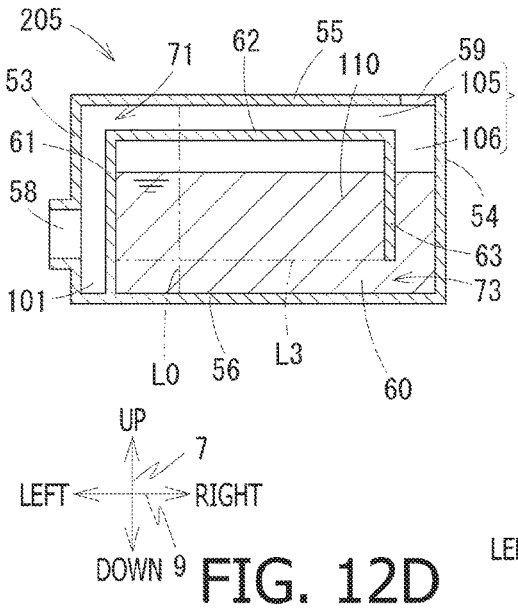
FIG. 12D is a vertical cross-sectional view of the ink tank according to the fifth embodiment when the ink tank takes a sixth *non-usage* attitude.
Figure 12C:
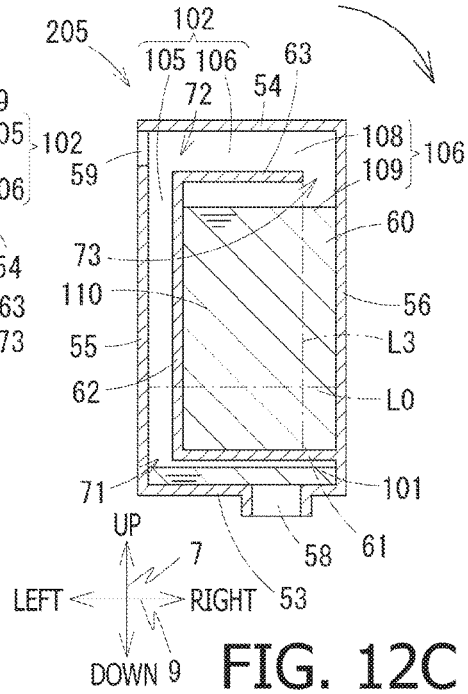
FIG. 12C is a vertical cross-sectional view of the ink tank according to the fifth embodiment when the ink tank takes the fifth *non-usage* attitude.

FIG. 12C shows the ink tank 205 taking fifth *non-usage* attitude (*i.e., the second clockwise orientation*). The fifth *non-usage* attitude is defined as an attitude of the ink tank 205 when the ink tank 205 taking the usage attitude is rotated rightward (i.e., clockwise) about the axis extending in the front-rear direction 8 such that the rotation angle is larger than 90 degrees to 180 degrees or less. The fifth *non-usage* attitude coincides with the second *non-usage* attitude which is described above referring to FIG. 11C.

When the attitude of the ink tank 205 is changed from the fourth *non-usage* attitude shown in FIG. 12B to the fifth *non-usage* attitude shown in FIG. 12C, the ink 60 stored in the [tenth] space 110 in FIG. 12B is reserved in the [ninth] space 109 in FIG. 12C, while the ink 60 stored in the fifth space 105 in FIG. 12B is moved to the first space 101 in FIG. 12C. The *portion of* ink 60 moved to the first space 101 flows outside when the cap 49 is removed from the ink tank 205.

FIG. 12D shows the ink tank 205 tanking the sixth *non-usage* attitude (*i.e., the third clockwise orientation*). The sixth *non-usage* attitude is defined as an attitude of the ink tank 205 when the ink tank 205 taking the usage attitude is rotated rightward (i.e., clockwise) abound the axis extending in the front-rear direction 8 such that the rotation angle is larger than 180 degrees to 270 degrees or less. The sixth *non-usage* attitude coincides with the first *non-usage* attitude described above referring to FIG. 11B.

When the attitude of the ink tank 205 is changed from the fifth *non-usage* attitude shown in FIG. 12C to the sixth *non-usage* attitude shown in FIG. 12D, the ink 60 stored in the [ninth] space 109 is reserved in the sixth space 106.

When the ink tank 205 taking the sixth *non-usage* attitude is rotated [rightward] *clockwise* about the axis extending in the front-rear direction 8 so that the attitude of the ink tank 205 is changed from the sixth *non-usage* attitude to the usage attitude, the ink 60 stored in the sixth space 106 is reserved in the fourth space 104.

Effects of Fifth Embodiment

With the printer 10 according to the fifth embodiment, even if the attitude of the ink tank 205 is changed from the usage attitude to the sixth *non-usage* attitude which is defined as an attitude when the ink tank 205 is rotated rightward (i.e., clockwise) about the axis extending in the front-rear direction 8 such that the rotation angle is larger than 180 degrees to 270 degrees or less, [a part] *most* of the ink 60 stored in the fourth space 104 (which is below the full level [ling] *line* L0 in a state where the ink tank 205 takes the usage attitude) is reserved in the sixth space 106 (in a state where the ink tank 205 takes the sixth *non-usage* attitude). Accordingly, even if the ink tank 205 is rotated about the axis extending in the front-rear direction 8 with the inlet 58 thereof being opened, [the ink 60 in the inner space 57 hardly flows] *only the portion of ink not stored in the sixth space 106 would flow* out of the ink tank 205.

[Ink Tank According to Sixth Embodiment]

Figure 13A:
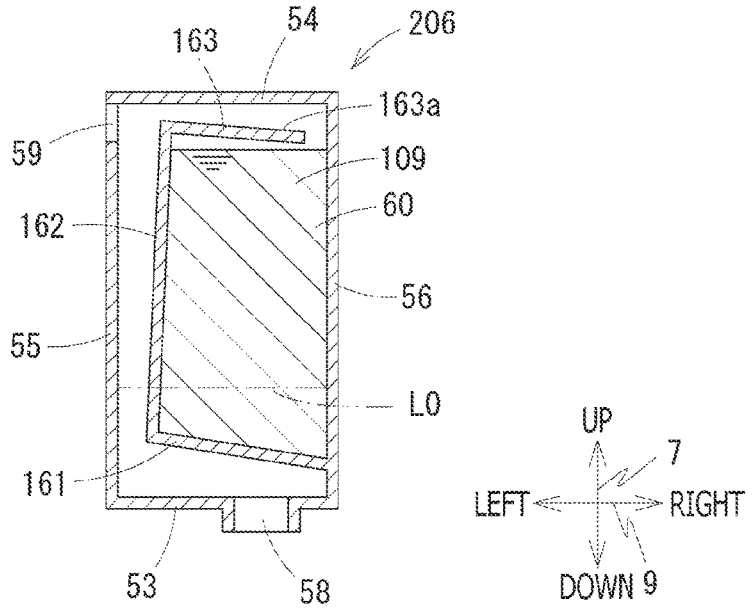
FIG. 13A is a vertical cross-sectional view of the ink tank according to a sixth embodiment when the ink tank takes the [usage] *second non-usage* attitude.

Referring to FIG. 13A, an ink tank 206 according to a sixth embodiment will be described. The ink tank 206 according to the sixth embodiment is configured such that the first inner wall 161 according to the third embodiment and the second inner wall 162 according to the fourth embodiment are provided in the ink tank 205 according to the fifth embodiment, and further a third inner wall 163 different from the third inner wall *63*. The other configuration of the sixth embodiment is the same as that for the fifth embodiment, detailed description thereon will be omitted.

As shown in FIG. 13A, [when the ink tank 206 takes the usage attitude,] the third inner wall 163 [provided to] *in* the ink tank 206 extends [in a lower right direction, and a] *from the second inner wall 162 toward the left outer wall 56 and slightly away from the lower outer wall 54. A distance between a* lower surface 163a (*e.g., on a lower side of the third inner wall 163 when the ink tank 206 is in the usage attitude*) of the third inner wall 163 [extends downward as it extends rightward from the second inner wall 162] *and the lower outer wall 54 increases as the third inner wall 163 extends toward the left outer wall 56*. Accordingly, the third inner wall 163 extends in the upper left direction in a state where the ink tank 206 takes the usage attitude[, and the lower surface of the third inner wall 163a extends upward as it extends leftward from the second inner wall 162].

Effects of Sixth Embodiment

With the printer 10 according to the sixth embodiment, since the lower surface 163a of the third inner wall 163 extends upward as the third *inner* wall 163 extends upward as it extends leftward, the ink 60 collected on the third inner wall 163 flows toward the [ninth] space 109 but not toward the inlet 58 in a state where the ink tank 206 takes the second *non-usage* attitude. Therefore, according to the sixth embodiment, it is possible to prevent the ink 60 from flowing out of the inlet 58.

[Ink Tank According to Seventh Embodiment]

Figure 13B:
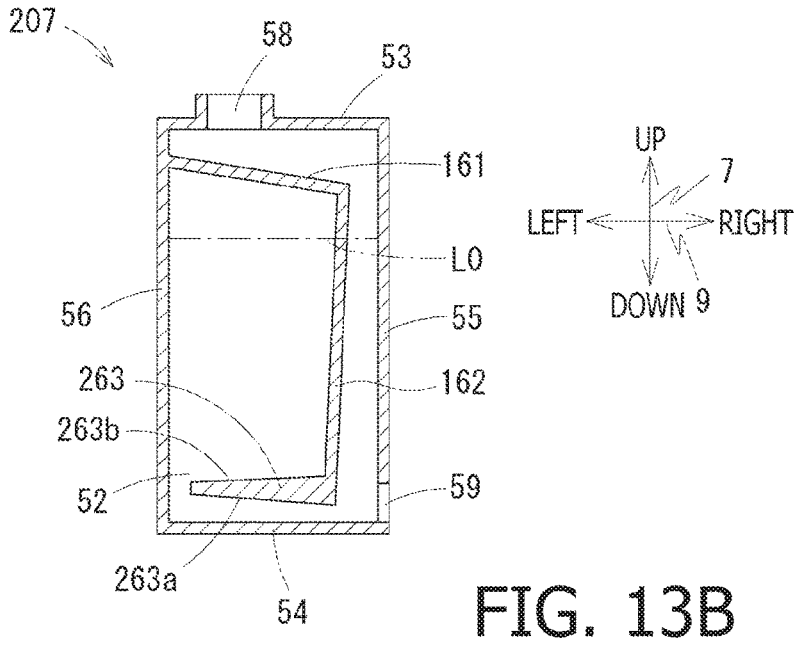
FIG. 13B is a vertical cross-sectional view of the ink tank according to a seventh embodiment when the ink tank takes the usage attitude.

Referring to FIG. 13B, an ink tank 207 according to a seventh embodiment will be described. The ink tank 207 according to the seventh embodiment is configured such that, in the ink tank 206 according to the sixth embodiment, the third inner wall 163 of the sixth embodiment is replaced with another third *inner* wall 263 which is different from the third *inner* wall 163. The other configuration of the seventh embodiment is the same as that of the sixth embodiment, the detailed description thereof will be omitted.

As shown in FIG. 13B, the third inner wall 263 provided to the ink tank 207 extends leftward from the second inner wall 162 in a state where the ink tank 207 takes the usage attitude. A lower surface 263a of the third inner wall 263 extends upward as it extends leftward from the second inner wall 162. Further, an upper surface [273b] *263b* of the third inner wall 263 extends downward as it extends leftward from the second inner wall 162.

Effects of Seventh Embodiment

With the printer 10 according to the seventh embodiment, in a state where the ink tank 207 takes the usage attitude, the upper surface [273b] *263b* of the third inner wall 263 extends downward as the third *inner* wall 263 extends leftward. Therefore, when the ink tank 207 takes the usage attitude, the ink 60 is prevented from being collected on the third inner wall 263. Accordingly, when the ink tank 207 takes the usage attitude, generation of the ink 60 which cannot be used in the recording assembly 24 can be prevented.

[Ink Tank According to Eighth Embodiment]

Referring to FIGS. 14 and 15A-15D, an ink tank 208 according to an [eights] *eighth embodiment* will be described. The ink tank 208 according to the eighth embodiment is configured such that fourth inner walls [54] *64* are provided in addition to the configuration of the ink tank [202] *205* according to the [second] *fifth* embodiment. The other configuration of the eighth embodiment is the same as that of the [second] *fifth* embodiment, the detailed description thereof will be omitted.

Figure 14:
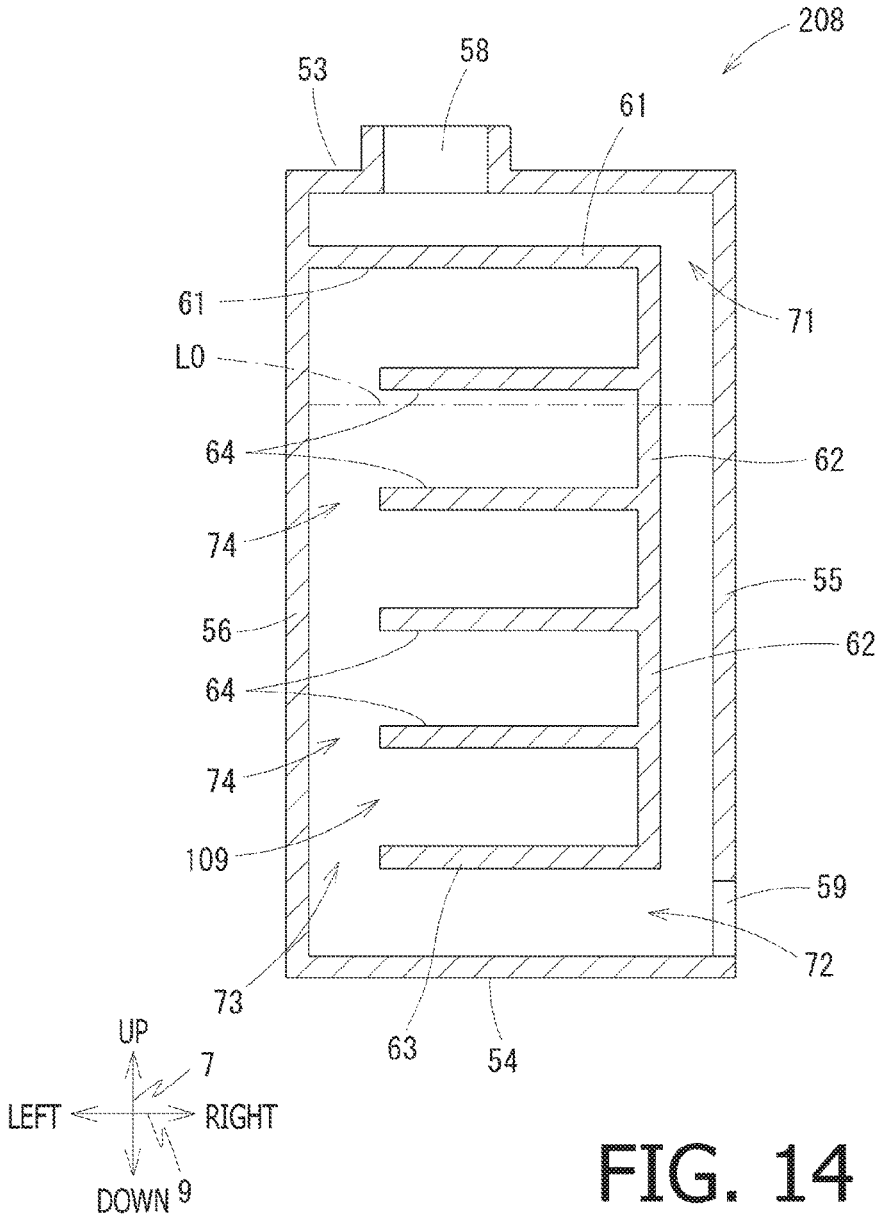
FIG. 14 is a vertical cross-sectional view of the ink tank according to an eighth embodiment when the ink tank takes the usage attitude.

As shown in FIG. 14, the ink tank 208 has four fourth inner walls 64 which extend leftward from the second inner wall 62 in a state where the ink tank *208* takes the usage attitude. The fourth inner walls 64 are located below the first inner wall 61 and above the third inner wall 63. Each of the fourth inner walls 64 is a plate-shaped part extending perpendicular to the up-down direction 7. The fourth inner walls 64 connect the front outer wall 51 and the rear outer wall 52. According to the present embodiment, the fourth inner walls 64 are formed integrally with the outer walls [51-56] *51 and 52* by molding from the resin material, and each of the fourth inner walls 64 has the thickness substantially same as the respective thicknesses of the outer walls [51-56] *51 and 52*.

The fourth inner walls 64 [partitions] *partition* the [ninth] space 109 into a space on the upside of each fourth inner wall 64 and a space on the downside of each fourth inner wall 64. The [ninth] space *109* is a space [partitioned] *defined* by the first inner wall 61, the second inner wall 62, the third inner wall 63, the front outer wall 51 and the rear outer wall 52, and is described above, referring to FIG. 11C, in relation to the ink tank 205 according to the fifth embodiment.

Each of the fourth inner walls 64 has a *fourth* communication hole 74 through which the upside space and the downside space partitioned by each of the fourth inner walls 64 communicate with each other. According to the eighth embodiment, each of the fourth communication holes 74 is formed at a position between each of the fourth inner walls 64 and the left outer wall 56. When the ink tank 208 takes the usage attitude, each of the fourth inner walls 64 may extend, in the right-left direction 9, from the second inner wall 62 to the left outer wall 56. In such a case, the fourth communication holes 74 may be formed at intermediate positions between the second inner wall 62 to the left outer wall 56 of the fourth inner walls 64, respectively.

[Fourth, Fifth and Sixth *Non-usage* Attitudes According to Eighth Embodiment]

Figure 15A:
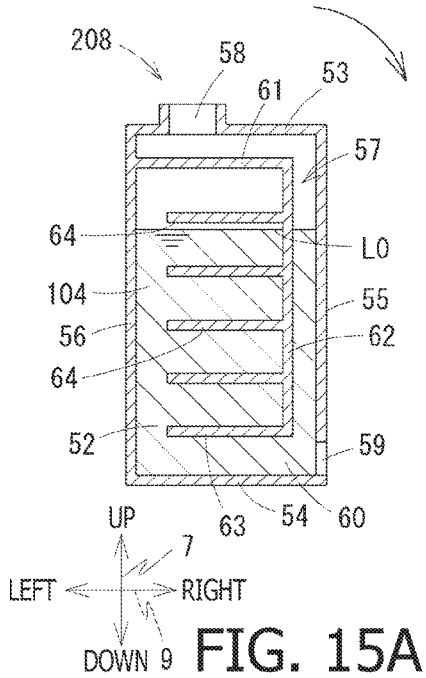
FIG. 15A is a vertical cross-sectional view of the ink tank according to the eighth embodiment when the ink tank takes the usage attitude.

Referring to FIGS. 15A-15D, the ink tank 208 [of which] *whose* attitude is changed from the usage attitude to a [sixth] *fifth non-usage* attitude through a fourth *non-usage* attitude [and a fifth attitude] will be described. As shown in FIG. 15A, in the inner space 57 of the ink tank 208 taking the usage attitude, the ink 60 is stored up to the full level line L0.

Figure 15B:
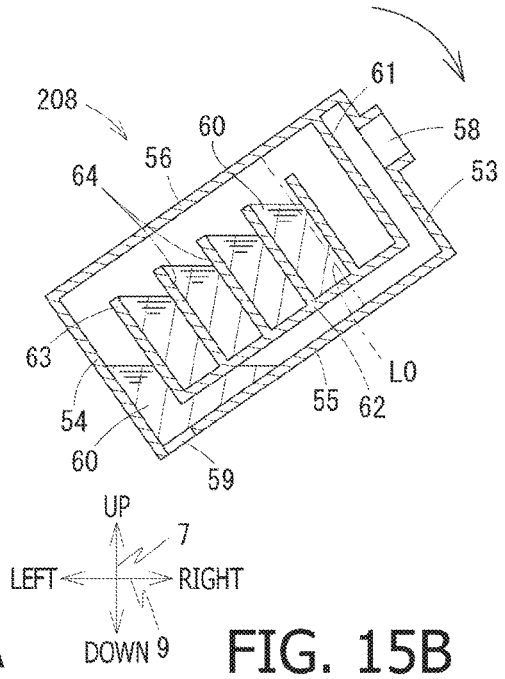
FIG. 15B is a vertical cross-sectional view of the ink tank according to the eighth embodiment when the ink tank [takes] *is being changed to* the fourth *non-usage* attitude.

FIG. 15B shows the ink tank 208 [of which] *whose* attitude [it] *is* being changed from the usage attitude to the fourth *non-usage* attitude. The fourth *non-usage* attitude is defined as an attitude of the ink tank 208 when the ink tank 208 taking the usage attitude is rotated rightward (i.e., clockwise) about the axis extending in the front-rear direction 8 such that the rotation angle is larger than 0 degree to 90 degrees or less. Since the ink tank 208 according to the eighth embodiment has the fourth inner walls 64 partitioning the [ninth] space 109, the ink 60 can be reserved well in the [ninth] space 109 when the attitude of the ink tank 208 is changed from the usage attitude to the fourth *non-usage* attitude in comparison with the ink tank 205 according to the fifth embodiment described above referring to FIGS. 11A-11D.

Figure 15D:
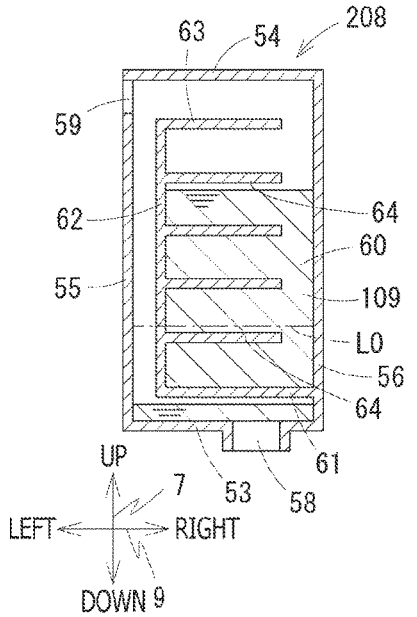
FIG. 15D is a vertical cross-sectional view of the ink tank according to the eighth embodiment when the ink tank takes the [sixth] *fifth non-usage* attitude.
Figure 15C:
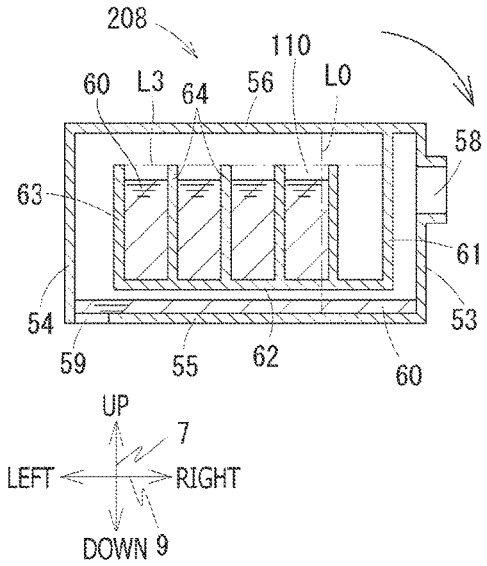
FIG. 15C is a vertical cross-sectional view of the ink tank according to the eighth embodiment when the ink tank takes the [fifth] *fourth non-usage* attitude.

A part of the ink 60 stored in the fourth space 104 in a state where the ink tank 208 takes the usage attitude shown in FIG. 15A is stored in the [tenth] space 110 in a state where the ink tank 208 takes the fourth *non-usage* attitude shown in FIG. 15C, and the remainder of the ink 60 is stored in a space below the second inner wall 62. Further, the ink 60 stored in the [tenth] space 110 of the ink tank 208 taking the fourth *non-usage* attitude as shown in FIG. 15C is reserved in the [ninth] space 109 of the ink tank 208 taking the fifth *non-usage* attitude as shown in FIG. 15D.

It is noted that, when the attitude of the ink tank 208 is changed from the usage attitude to the third *non-usage* attitude through the second *non-usage* attitude, the fourth inner walls 64 have little effect in regard with storage of the ink 60, and the ink tank 208 functions substantially the same as the ink tank 205 according to the fifth embodiment.

Effects of Eighth Embodiment

With the printer 10 according to the eighth embodiment, when the ink tank 208 takes the usage attitude, the fourth *inner* walls 64 [divides] *divide* the [ninth] space 109 in the up-down direction 7. Therefore, when the attitude of the ink tank 208 is changed from the usage attitude to the fourth *non-usage* attitude, the liquid is hardly spilled out from the [ninth] space 109, and the amount of the liquid flowing toward the inlet 58 can be reduced.

[Ink Tank According to Ninth Embodiment]

Referring to FIGS. 16 and 17A-17D, an ink tank 209 according to a ninth embodiment will be described. The ink tank 209 according to the ninth embodiment is configured such that a first inner wall 261, which is different from the first inner wall 61 according to the second embodiment, and [a fifth] *an* inner wall 65 are provided to the ink tank 202 according to the second embodiment. The other configuration of the [fifth] *ninth* embodiment is the same as that of the second embodiment, the detailed description thereof will be omitted.

Figure 16:
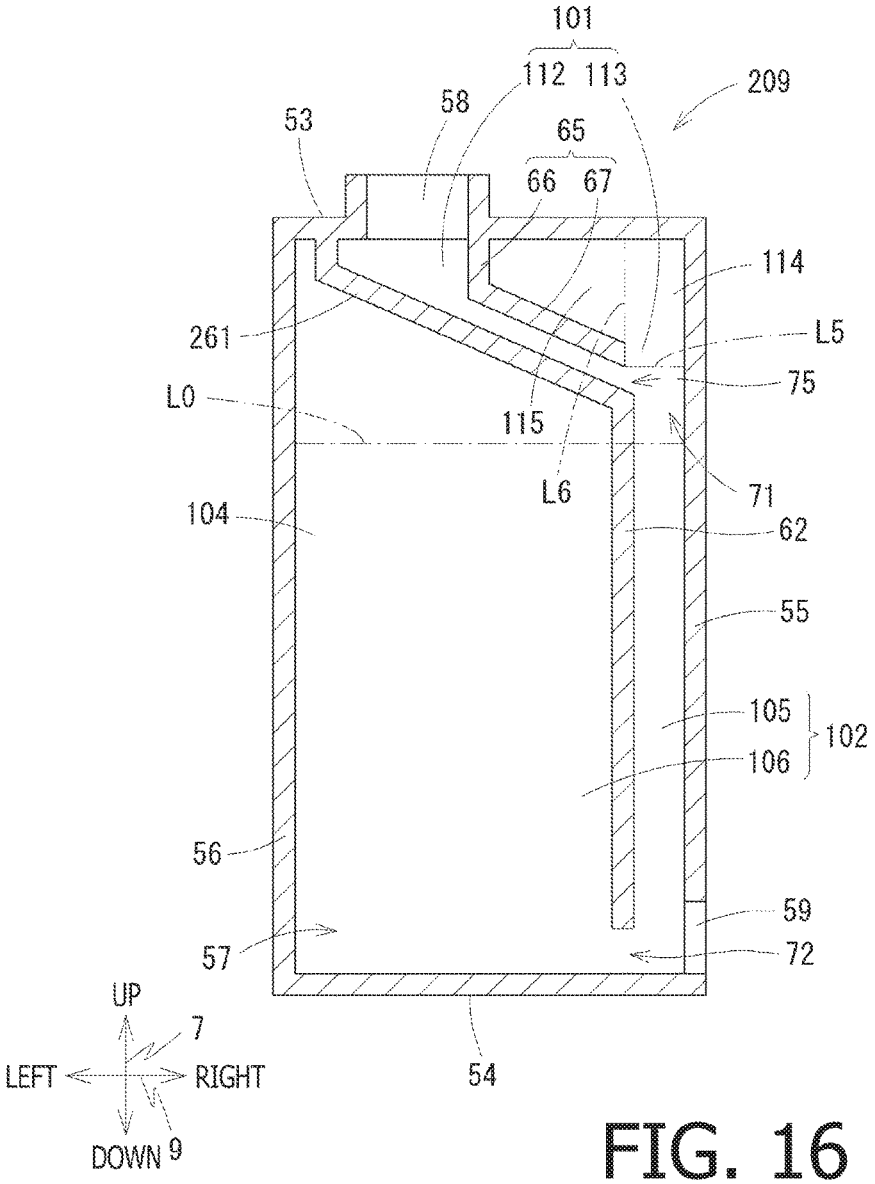
FIG. 16 is a vertical cross-sectional view of the ink tank according to a ninth embodiment when the ink tank takes the usage attitude.

As shown in FIG. 16, the first inner wall 261 provided to the ink tank 209 extends in the lower right direction from the upper *outer* wall 53 in a state where the ink tank 209 takes the usage attitude. An upper end of the first inner wall 261 is located on the left side with respect to the inlet 58.

When the ink tank 209 takes the usage attitude, the [fifth] inner wall 65 extends in the lower right direction from the upper outer wall 53. An upper end of the [fifth] inner wall 65 is located on the right side with respect to the inlet 58. The [fifth] inner wall 65 has an upper part 66 extending downward, and a lower part 67 extending in the lower right direction from the lower end of the upper part 66. Between the first inner wall 261 and the [fifth] inner wall 65, in the up-down direction 7, a clearance is formed. The clearance allows the ink 60 to flow from the inlet 58 to the fourth space 104.

The [fifth] inner wall 65 partitions the first space 101 into a [twelfth] space 112 in which the inlet 58 is located, and a [thirteenth] space 113 located on the right side with respect to the [twelfth] space 112 in a state where the ink tank 209 takes the usage attitude.

The [fifth] inner wall 65 has a [fifth] communication hole 75 through which the [twelfth] space 112 and the [thirteenth] space 113 communicate with each other. According to the ninth embodiment, the [fifth] communication hole 75 is located between the [fifth] inner wall 65 and the right outer wall 55. In a state where the ink tank 209 takes the usage attitude, the [fifth] inner wall 65 may extend in the lower right direction from the upper outer wall 53 to the right outer wall 55. In such a case, the [fifth] communication hole 75 may be formed at an intermediate position of the [fifth] inner wall 65 extending from the upper outer wall 53 to the right outer wall 55.

[Fourth and Fifth *Non-usage* Attitudes According to Ninth Embodiment]

Figure 17A:
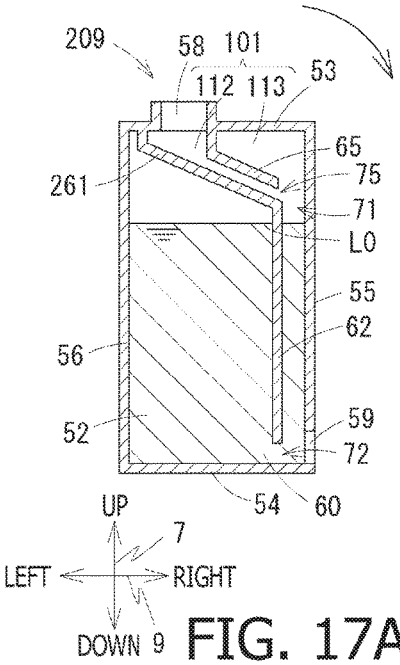
FIG. 17A is a vertical cross-sectional view of the ink tank according to the ninth embodiment when the ink tank takes the usage attitude.

Referring to FIGS. 17A-17D, the ink tank 209 [of which] *whose* attitude is changed from the usage attitude to the [fifth] *sixth non-usage* attitude through the fourth [attitude] *and fifth non-usage attitudes* will be described. As shown in FIG. 17A, in the inner space 57 of the ink tank 209 taking the usage attitude, the ink 60 is stored up to the full level line L0. That is, the fourth space 104 is filled with the ink 60.

Figure 17B:
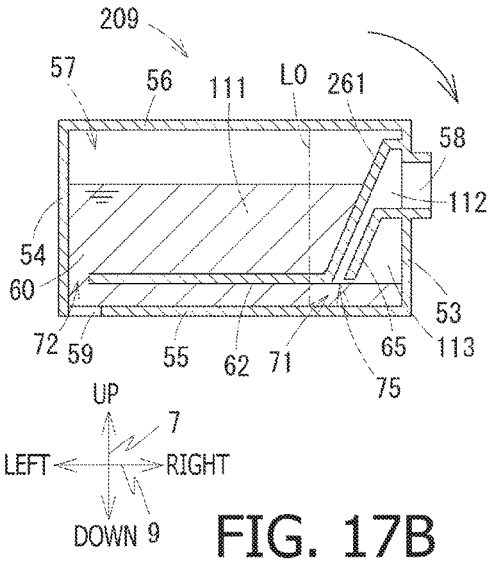
FIG. 17B is a vertical cross-sectional view of the ink tank according to the ninth embodiment when the ink tank takes the fourth *non-usage* attitude.

FIG. 17B shows the ink tank 209 taking the fourth *non-usage* attitude. The fourth *non-usage* attitude is defined as an attitude of the ink tank 209 when the ink tank 209 taking the usage attitude is rotated rightward (i.e., clockwise) about the axis extending in the front-rear direction 8 such that the rotation angle is larger than 0 degree to 90 degrees or less. When the attitude of the ink tank 209 is changed from the usage attitude to the fourth *non-usage* attitude, the ink 60 stored in the fourth space 104 is reserved in the [eleventh] space 111.

Figure 17D:
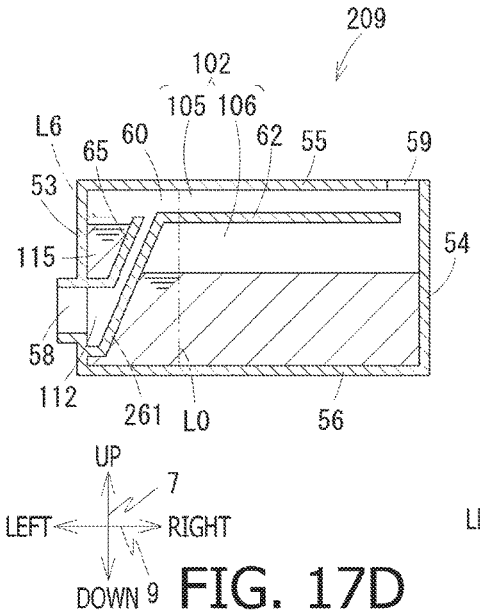
FIG. 17D is a vertical cross-sectional view of the ink tank according to the ninth embodiment when the ink tank takes the sixth *non-usage* attitude.
Figure 17C:
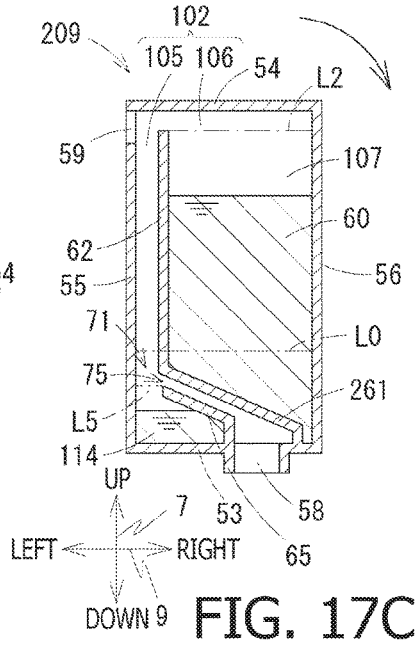
FIG. 17C is a vertical cross-sectional view of the ink tank according to the ninth embodiment when the ink tank takes the fifth *non-usage* attitude.

FIG. 17C shows the ink tank 209 taking the fifth *non-usage* attitude. The fifth *non-usage* attitude is defined as an attitude of the ink tank 209 when the ink tank 209 taking the usage attitude is rotated rightward (i.e., clockwise) about the axis extending in the front-rear direction 8 such that the rotation angle is larger than 90 degrees to 180 degrees or less. When the ink tank 209 takes the fifth *non-usage* attitude, a [fourteenth] space 114 is formed in a part of the [thirteenth] space 113. As shown in FIGS. 16 and 17C, the [fourteenth] space 114 is [partitioned] *defined* by the [fifth] inner wall 65, the upper outer wall 53, the right outer wall 55, the front outer wall 51 and the rear outer wall 52, and is defined as a space arranged below a lowermost position L5 of a surface of the [fifth] inner wall 65 defining the [fifth] communication hole 75.

When the attitude of the ink tank 209 is changed from the fourth *non-usage* attitude shown in FIG. 17B to the fifth *non-usage* attitude shown in FIG. 17C, a part of the ink 60 stored in the [eleventh] space 111 is reserved in the seventh space 107, and the remainder flows from the fourth space 104 into the [fourteenth] space 114 through the fifth space 105. The [fourteenth] space 114 is configured to reserve all the amount of the ink 60 *that* flows into the [fourteenth] space 114 when the attitude of the ink tank 209 is changed from the fourth *non-usage* attitude to the fifth *non-usage* attitude.

FIG. 17D shows the ink tank 209 taking the sixth *non-usage* attitude. The sixth *non-usage* attitude is the attitude of the ink tank 209 when the ink tank 209 taking the usage attitude is rotated [rightward] *clockwise* by 270 degrees about the axis extending in the front-rear direction 8. When the ink tank 209 takes the sixth *non-usage* attitude, a part of the [fourteenth] space *114* is a [fifteenth] space 115. As shown in FIGS. 16 and 17D, the [fifteenth] space 115 is a part of the [fourteenth] space 114, and is [partitioned] *defined* by the [fifth] inner wall 65, the upper outer wall 53, the front outer wall 51 and the rear outer wall 52. The [fifteenth] space 115 is a space defined below the lowermost position L6 of a surface of the [fifth] inner wall 65 defining the communication hole 75. When the attitude of the ink tank 209 is changed from the fifth *non-usage* attitude shown in FIG. 17C to the sixth *non-usage* attitude shown in FIG. 17D, the ink 60 stored in the [fourteenth] space 114 is reserved in the [fifteenth] space 115.

When the attitude of the ink tank 209 is changed from the usage attitude to the third *non-usage* attitude through the [second] *first* and the [third] *second non-usage* attitudes, the ink tank 209 functions the same as the ink tank 202 according to the second embodiment.

Effects of Ninth Embodiment

With the printer 10 according to the ninth embodiment, since the ink tank 209 has the [fifth] inner wall 65, even if the ink tank 209 is rotated [rightward] *clockwise* by degrees about the axis extending in the front-rear direction 8 so that the attitude of the ink tank 209 is changed from the usage attitude to the fifth *non-usage* attitude, part of the ink 60, among the ink stored in the fourth space 104 which is below the full level line L0 in a state where the ink tank 209 takes the usage attitude, spilt out of the sixth space 106 or the [seven] *seventh* space 107 is reserved in the [fourteenth] space 114. Therefore, even if the ink tank 209 is rotated about the axis extending in the front-rear direction 8 with the inlet 58 being opened, the ink 60 inside the inner space 57 hardly flows out from the ink tank 209.

Further, even if the ink tank 209 is rotated [rightward] *clockwise* from 180 to 270 degrees such that the attitude of the ink tank 209 is changed from the fifth *non-usage* attitude to the [six] *sixth non-usage* attitude, the ink 60 stored in the [fourteenth] space 114 is reserved in the [fifteenth] space 115. Therefore, even if the ink tank 209 is rotated about the axis extending in the front-rear direction 8 with the inlet 58 thereof being opened, the ink 60 inside the inner space 57 hardly flows out of the ink tank 209.

[Ink Tank According to Tenth Embodiment]

Figure 18:
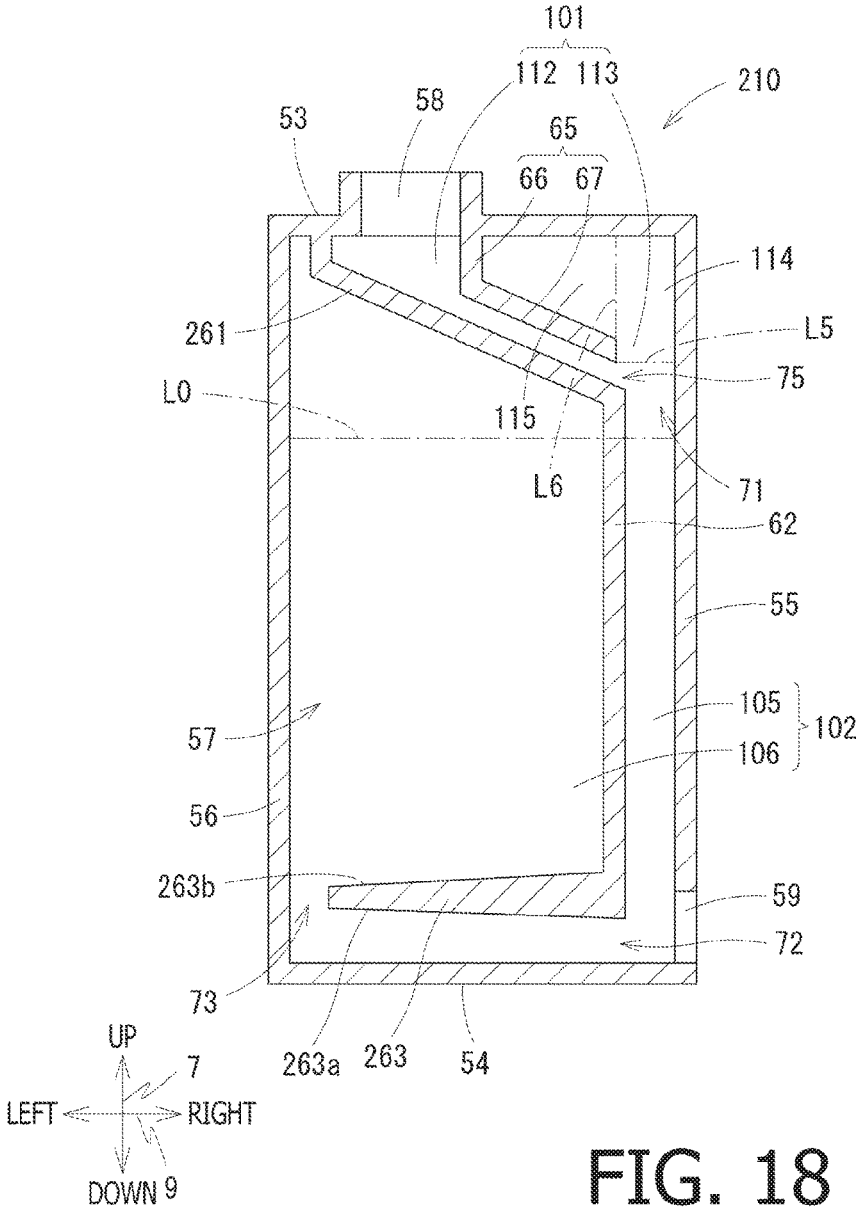
FIG. 18 is a vertical cross-sectional view of the ink tank according to a tenth embodiment when the ink tank takes the usage attitude.

Referring to FIG. 18, an ink tank 210 according to a tenth embodiment will be described. The ink tank 210 according to the tenth embodiment is configured such that the third inner wall 263 of the seventh embodiment is provided in the ink tank 209 according to the ninth embodiment. The other configuration of the tenth embodiment is the same as the ninth embodiment and the detailed description thereof will be omitted.

[Ink Tank According to Eleventh Embodiment]

Figure 19:
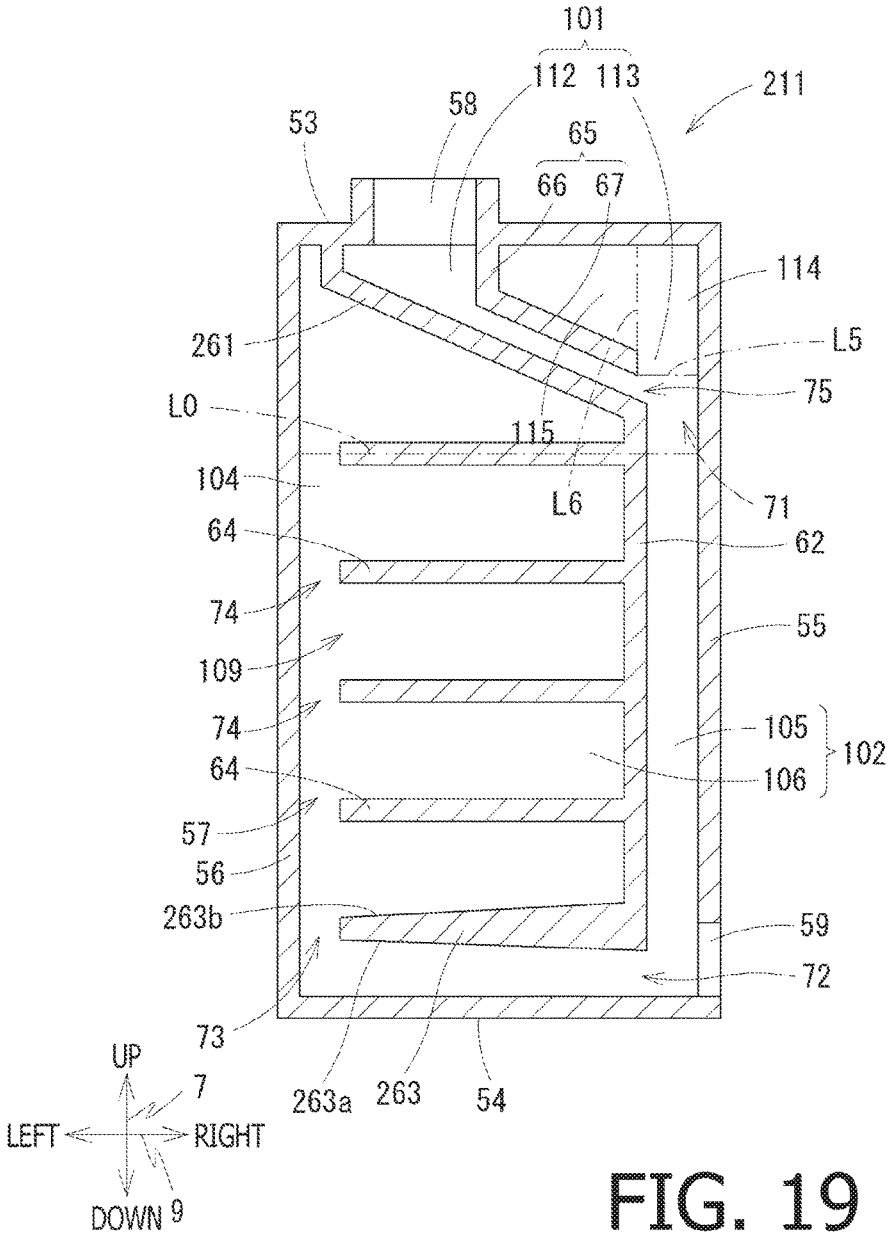
FIG. 19 is a vertical cross-sectional view of the ink tank according to an eleventh embodiment when the ink tank takes the usage attitude.

Referring to FIG. 19, an ink tank 211 according to an eleventh embodiment will be described. The ink tank 211 according to the eleventh embodiment is configured such that *each of* the fourth inner [wall] *walls* 64 of the eighth embodiment is provided in the ink tank 210 according to the tenth embodiment. The other configuration of the eleventh embodiment is the same as the tenth embodiment, and the detailed description thereof will be omitted.

[Ink Tank According to Twelfth Embodiment]

Figure 20:
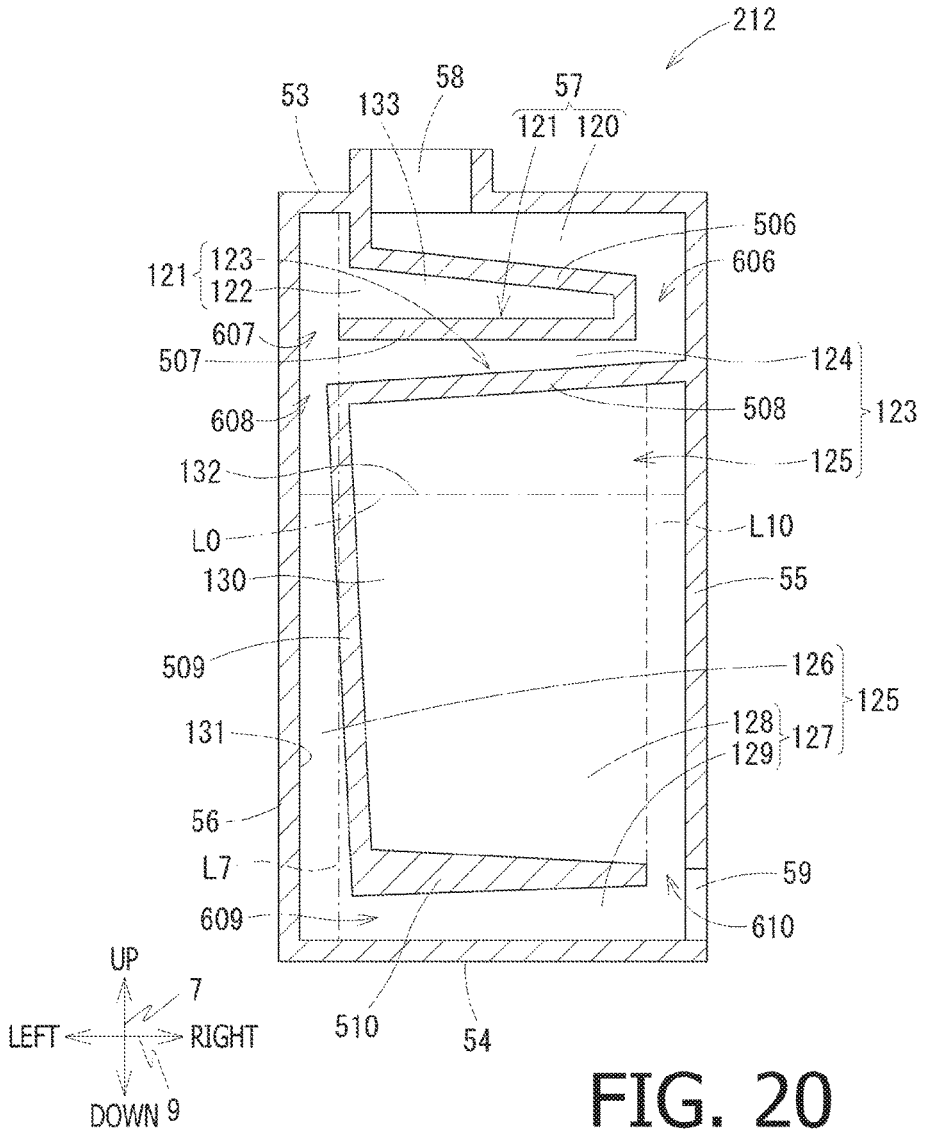
FIG. 20 is a vertical cross-sectional view of the ink tank according to a twelfth embodiment when the ink tank takes the usage attitude.

Referring to FIGS. 20 and [21A-21D] *21A-22D*, an ink tank 212 according to the twelfth embodiment will be described. The ink tank 212 according to the twelfth embodiment is configured such that inner walls 506-510, which are different from the first *inner* wall 61 according to the first embodiment, are provided in the ink tank 201 according to the first embodiment. The other configuration of the twelfth embodiment is the same as that of the first embodiment and the description thereof will be omitted.

As shown in FIG. 20, the ink tank 212 has [a sixth] *an* inner wall 506, [a seventh] *an* inner wall [508] *507*, an [eighth] inner wall 508, [a ninth] *an* inner wall 509 and [a tenth] *an* inner wall 510.

In a state where the ink tank 212 takes the usage attitude, the [sixth] *inner* wall 506 extends in a lower right direction from the upper outer wall 53, and partitions the inner space 57 into a [twentieth] space 120 in which the inlet 58 is located and a [twenty-first] space *121* in which the outlet 59 is located. The [sixth] inner wall 506 has a [sixth] communication hole 606 through which the [twentieth] space 120 and the [twenty-first] space 121 communicate with each other.

In a state where the ink tank 212 takes the usage attitude, the [seventh] inner wall 507 is arranged below the [sixth] inner wall 506. Further, the [seventh] inner wall 507 extends leftward from a portion of the [sixth] inner wall 506 at a position on the left side with respect to the [sixth] communication hole 606. The [seventh] inner wall 507 partitions the [twenty-first] space 121 into a [twenty-second] space 122 on the upper side of the [seventh] inner wall 507 and a [twenty-third] space 123 on the lower side of the [seventh] inner wall 507. The [seventh] inner wall 507 has a [seventh] communication hole 607 through which the [twenty-second] space 122 and the [twenty-third] space 123 communicate with each other.

In a state where the ink tank 212 takes the usage attitude, the [eighth] inner wall 508 is located on the lower side with respect to the [seventh] inner wall 507, and extends leftward from the right outer wall 55. The [eighth] inner wall 508 partitions the [twenty-third] space 123 into a [twenty-fourth] space 124 on the upper side of the [eighth] inner wall 508 and a [twenty-fifth] space 125 on the lower side of the [eighth] inner wall 508. The [eighth] inner wall 508 has an [eighth] communication hole 608 through which the [twenty-fourth] space 124 and the [twenty-fifth] space 125 communicate with each other.

In a state where the ink tank 212 takes the usage attitude, the [ninth]inner wall 509 extends downward from a portion of the [eighth] inner wall 508 at a position on the right side with respect to the communication hole 608. The [ninth] inner wall 509 partitions the [twenty-fifth] space 125 into a [twenty-sixth] space 126 on the left side of the [ninth] inner wall 509 and a [twenty-seventh inner wall] *space* 127 on the right side of the [ninth] inner wall 509. The [ninth] inner wall 509 has a [ninth] communication hole 609 through which the [twenty-sixth] space 126 and the [twenty-seventh] space 127 communicate with each other.

In a state where the ink tank 212 takes the usage attitude, the [tenth] inner wall 510 extends rightward from a portion of the [ninth] inner wall 509 at a position on the upper side of the [ninth] communication hole 609. The [tenth] inner wall 510 partitions the [twenty-seventh] space 127 into a [twenty-eighth] space 128 on the upper side of the [tenth] inner wall 510 and a [twenty-ninth] space 129. The [tenth] inner wall 510 has a [tenth] communication hole 610 through which the [twenty-eighth] space 128 and the [twenty-ninth] space 129 communicate with each other.

The full level line L0 formed to the ink tank 212 is located on the lower side with respect to the [eighth] inner wall 508, and indicates the maximum amount of the ink 60 storable in the [twenty-fifth] space 125. A part of the [twenty-fifth] space 125 below the full level line L0 is defined as a [thirty-second] space 132.

[First, Second and Third *Non-usage* Attitudes According to Twelfth Embodiment]

Figure 21A:
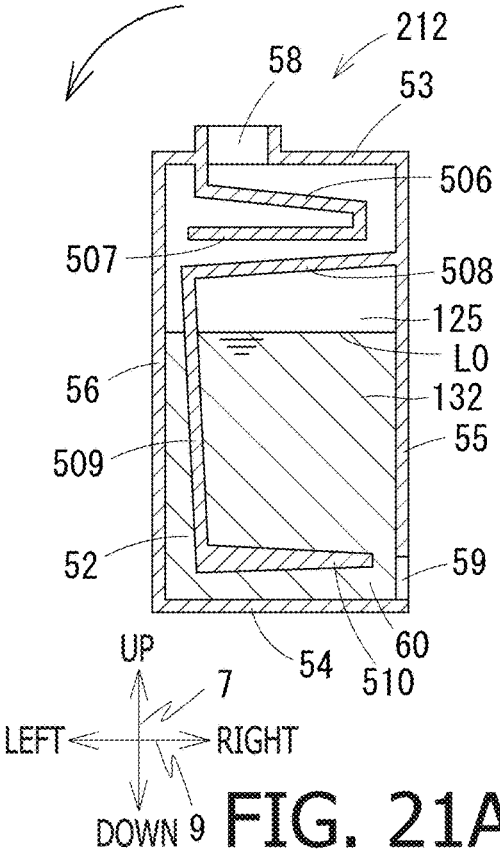
FIG. 21A is a vertical cross-sectional view of the ink tank according to the twelfth embodiment when the ink tank takes the usage attitude.

Referring to FIGS. 21A-21D, the ink tank 212 [of which attitudes] *whose attitude* is changed from the [usages] *usage* attitude to the third *non-usage* attitude through the first *non-usage* attitude and the second *non-usage* attitude will be described. As shown in FIG. 21A, in the [twenty-fifth] space 125 of the ink tank 212 taking the usage attitude, the ink 60 is stored up to the full level line L0. That is, the [thirty-second] space 132 is filled with the ink 60.

FIG. 21B shows the ink tank 212 taking the first *non-usage* attitude. The first *non-usage* attitude is defined as an attitude of the ink tank 212 when the ink tank 212 taking the usage attitude is rotated [leftward] *counterclockwise* by 90 degrees about the axis extending [tin] *in* the front-rear direction 8.

In the ink tank 212 taking the first *non-usage* attitude, a [thirtieth] space 130 and a [thirty-first] space 131 are included in the inner space 57 as parts thereof. The [thirtieth] space 130 is [partitioned] *defined* by the [eighth] inner wall 508, the [ninth] inner wall 509, the [tenth] inner wall 510, the front outer wall 51, and the rear outer wall 52. The [thirtieth] space 130 is located on the lower side (*with the ink tank 212 in the first non-usage attitude*) with respect to the lowermost position L10 of the surface of the [tenth] inner wall [51] *510* defining the [tenth] communication hole 610. The [thirty-first] space 131 is [portioned] *defined* by *a portion of* the [seventh] inner wall 507 *forming the communication hole 607*, the left outer wall 56, the lower outer wall 54, the front outer wall 51, and the rear outer wall 52[, and is located on the lower side with respect to the lowermost position of the surface partitioning the seventh communication hole 607 of the seventh inner wall 507].

The ink 60 stored in the [thirty-second] space 132 of the ink tank 212 taking the usage attitude as shown in FIG. 21A is reserved in the [thirtieth] space 130 and the [thirty-first] space 131 when the attitude of the ink tank 212 is changed to the first *non-usage* attitude as shown in FIG. 21B.

Figure 21C:
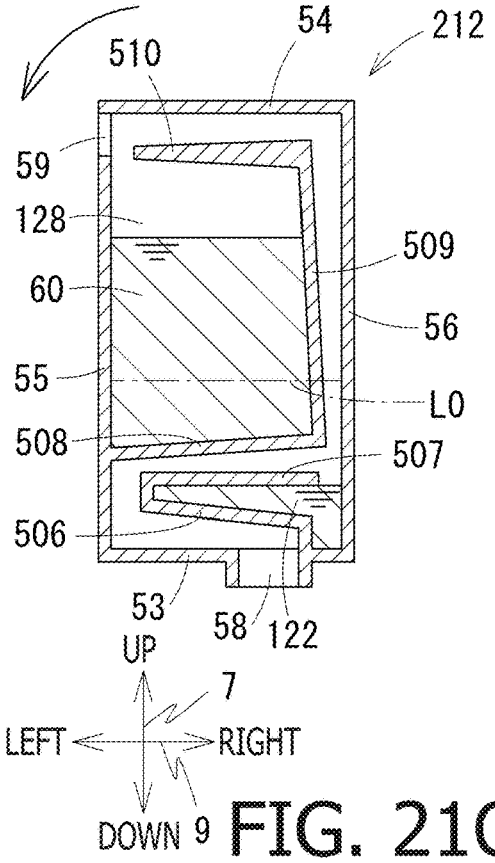
FIG. 21C is a vertical cross-sectional view of the ink tank according to the [ninth] *twelfth* embodiment when the ink tank takes the second *non-usage* attitude.

FIG. 21C shows the ink tank 212 taking the second *non-usage* attitude. The second *non-usage* attitude is defined as an attitude of the ink tank 212 when the ink tank 212 taking the usage attitude is rotated leftward (i.e., counter-clockwise) about the axis extending in the front-rear direction 8 such that the rotation angle is larger than 90 degrees to 180 degrees or less. The ink 60 stored in the [thirtieth] space 130 and the [thirty-first] space 131 of the ink tank 212 taking the first *non-usage* attitude as shown in FIG. 21B is reserved in the [twenty-eighth] space 128 and the [twenty-second] space 122 of the ink tank 212 taking the second *non-usage* attitude as shown in FIG. 21C.

Figure 21D:
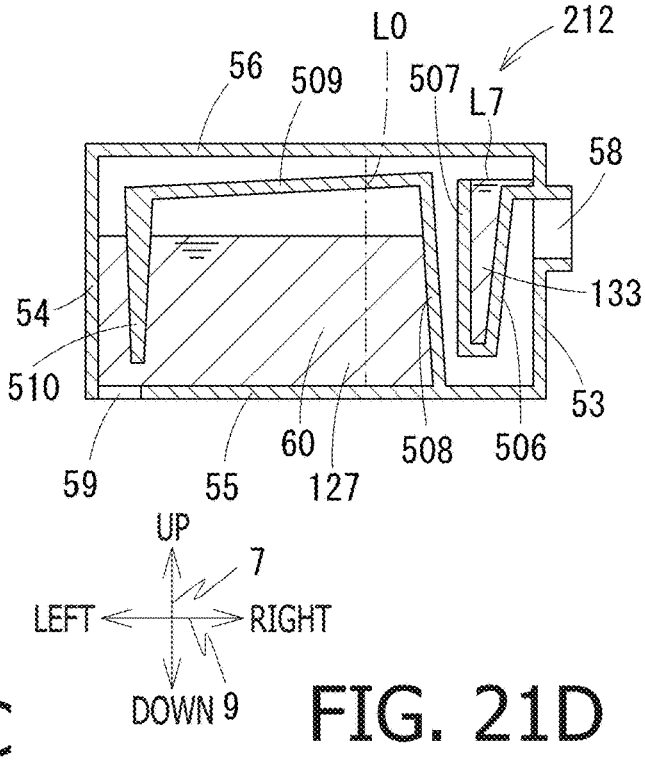
FIG. 21D is a vertical cross-sectional view of the ink tank according to the [ninth] *twelfth* embodiment when the ink tank takes the third *non-usage* attitude.

FIG. 21D shows the ink tank 212 taking the third *non-usage* attitude. The third *non-usage* attitude is defined as an attitude of the ink tank 212 when the ink tank 212 taking the usage attitude is rotated leftward (i.e., counter clockwise) about the axis extending in the front-rear direction 8 such that the rotation angle is larger than 180 degrees to 270 [degress] *degrees* or less.

In the ink tank 212 taking the third *non-usage* attitude, there is a [thirty-third] space 133 as a part of the inner space 57. The [thirty-third] space 133 is [partitioned] *defined* by the [sixth] inner wall 506, the [seventh] inner wall 507, [the upper outer wall 53,] the front outer wall 51 and the rear outer wall 52, and below the lowermost position L7 of the surface of the [seventh] inner wall 507 defining the [seventh] communication hole 607.

The ink 60 stored in the [twenty-eighth] space 128 and the [twenty-second] space 122 of the ink tank 212 taking the second *non-usage* attitude shown in FIG. 21C is reserved in the [twenty-seventh] space 127 and the [thirty-third] space 133 of the ink tank 212 taking the third *non-usage* attitude shown in FIG. 21D.

When the ink tank 212 is further rotated [leftward] *counterclockwise* about the axis extending in the front-rear direction 8 so that the attitude of the ink tank 212 is changed from the third *non-usage* attitude to the usage attitude, the ink stored in the [twenty-seventh] space 127 and the [thirty-third] space 133 is stored in the [thirty-second] space 132.

[Fourth, Fifth and Sixth *Non-usage* Attitudes According to Twelfth Embodiment]

Figure 22A:
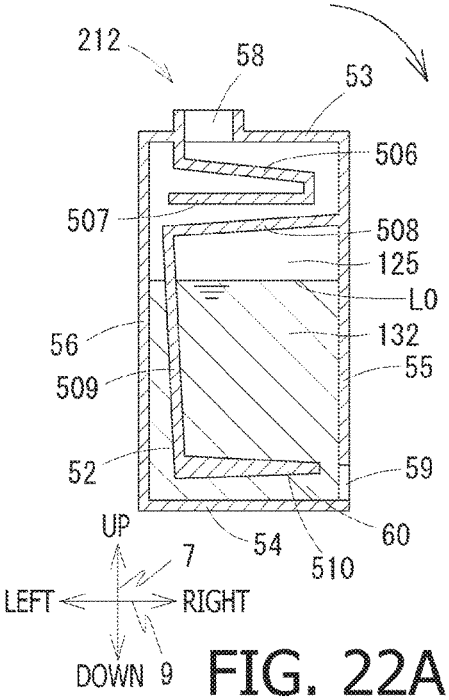
FIG. 22A is a vertical cross-sectional view of the ink tank according to the twelfth embodiment when the ink tank takes the usage attitude.

Referring to FIGS. 22A-22D, the ink tank 212 [of which] *whose* attitude is changed from the usage attitude to the sixth *non-usage* attitude through the fourth and fifth *non-usage* attitudes will be described. As shown in FIG. 22A, in a state where the ink tank 212 takes the usage attitude, the ink 60 is stored in the [thirty-second] space 132 of the ink tank 212 up to the full level line L0.

Figure 22B:
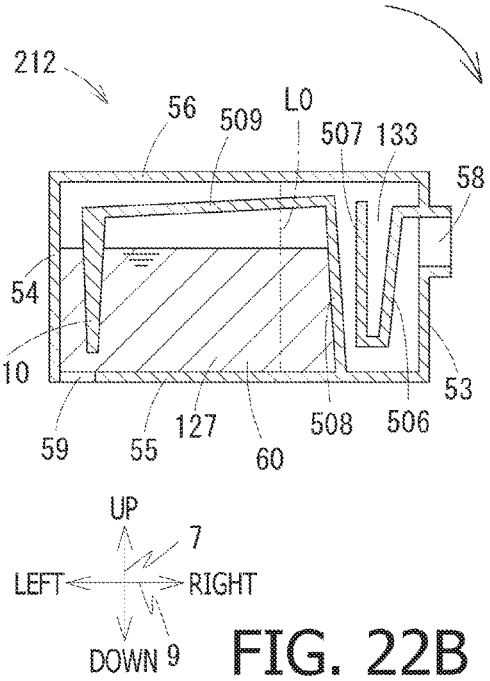
FIG. 22B is a vertical cross-sectional view of the ink tank according to the twelfth embodiment when the ink tank takes the fourth *non-usage* attitude.

FIG. 22B shows the ink tank 212 taking the fourth *non-usage* attitude. The fourth *non-usage* attitude is defined as an attitude of the ink tank 212 when the ink tank 212 taking the usage attitude is rotated rightward (i.e., clockwise) about the axis extending in the front-rear direction 8 such that the rotation angle is larger than 0 degree to 90 degrees or less. The fourth *non-usage* attitude [is the same as] *coincides with* the third *non-usage* attitude described above referring to FIG. 21D. [when] *When* the attitude of the ink tank 212 is changed from the usage attitude shown in FIG. 22A to the fourth *non-usage* attitude shown in FIG. 22B, the ink 60 stored in the [thirty-second] space 132 is reserved in the [thirtieth] space [130] *127*.

Figure 22D:
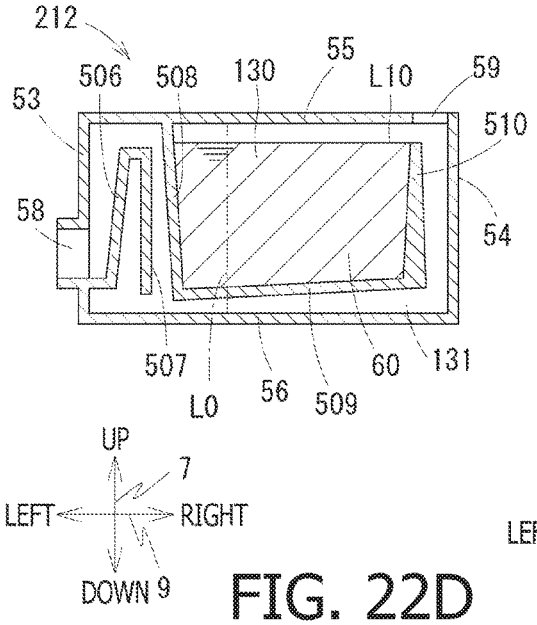
FIG. 22D is a vertical cross-sectional view of the ink tank according to the twelfth embodiment when the ink tank takes the sixth *non-usage* attitude.
Figure 22C:
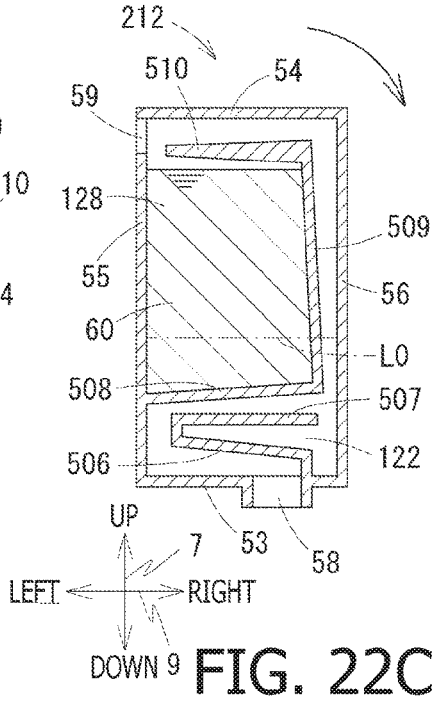
FIG. 22C is a vertical cross-sectional view of the ink tank according to the twelfth embodiment when the ink tank takes the fifth *non-usage* attitude.
Figure 24B:
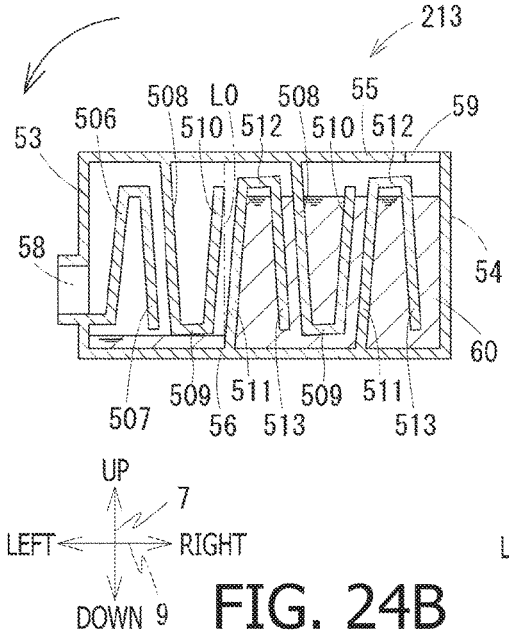
FIG. 24B is a vertical cross-sectional view of the ink tank according to the thirteenth embodiment when the ink tank takes the first *non-usage* attitude.
Figure 24A:
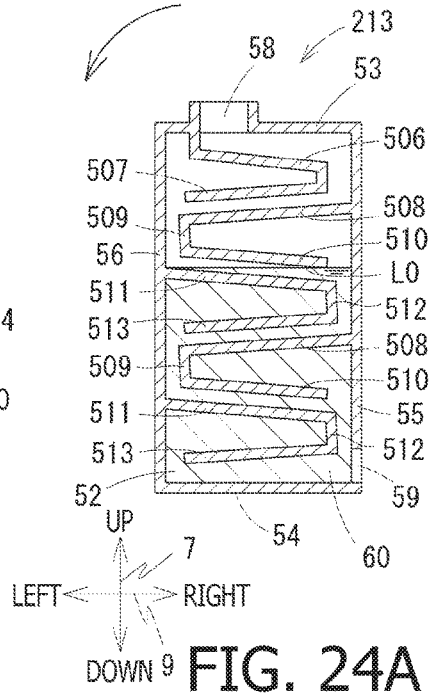
FIG. 24A is a vertical cross-sectional view of the ink tank according to the thirteenth embodiment when the ink tank takes the usage attitude.
Figure 24C:
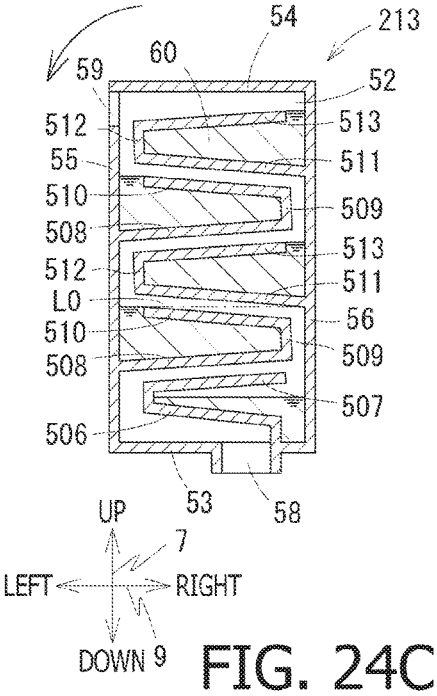
FIG. 24C is a vertical cross-sectional view of the ink tank according to the thirteenth embodiment when the ink tank takes the second *non-usage* attitude.
Figure 24D:
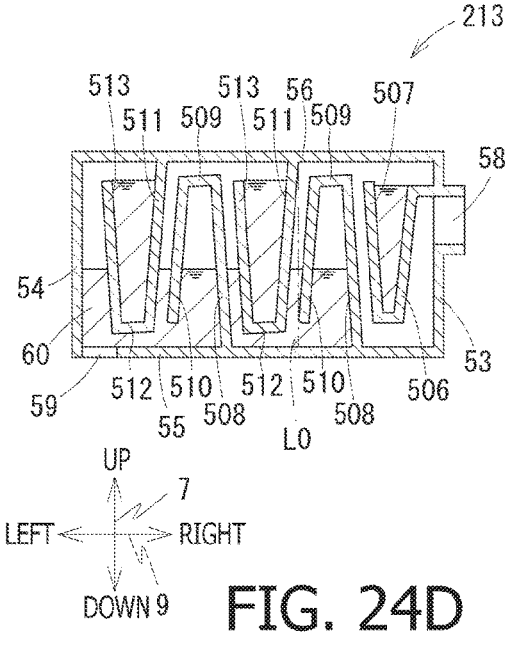
FIG. 24D is a vertical cross-sectional view of the ink tank according to the thirteenth embodiment when the ink tank takes the third *non-usage* attitude.
Figure 25A:
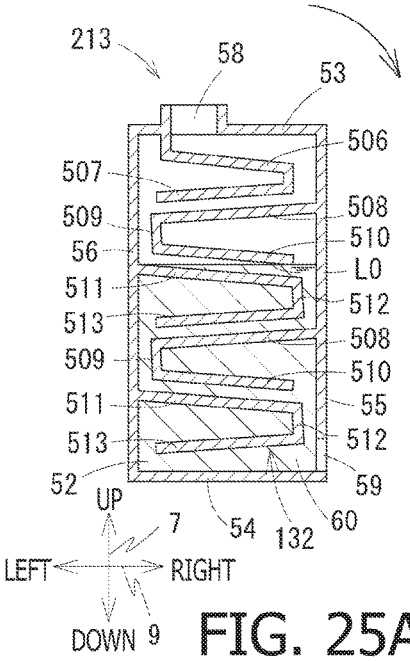
FIG. 25A is a vertical cross-sectional view of the ink tank according to the thirteenth embodiment when the ink tank takes the usage attitude.
Figure 25B:
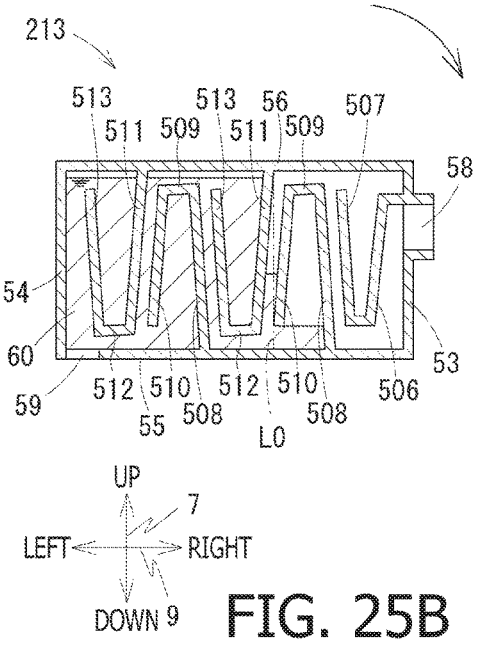
FIG. 25B is a vertical cross-sectional view of the ink tank according to the thirteenth embodiment when the ink tank takes the fourth *non-usage* attitude.
Figure 25D:
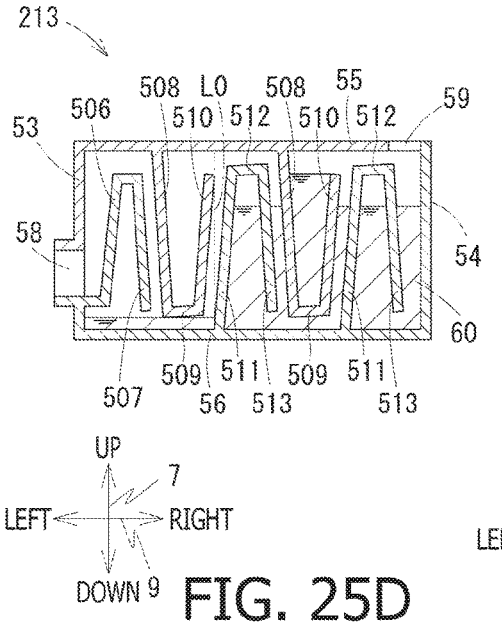
FIG. 25D is a vertical cross-sectional view of the ink tank according to the thirteenth embodiment when the ink tank takes the sixth *non-usage* attitude.
Figure 25C:
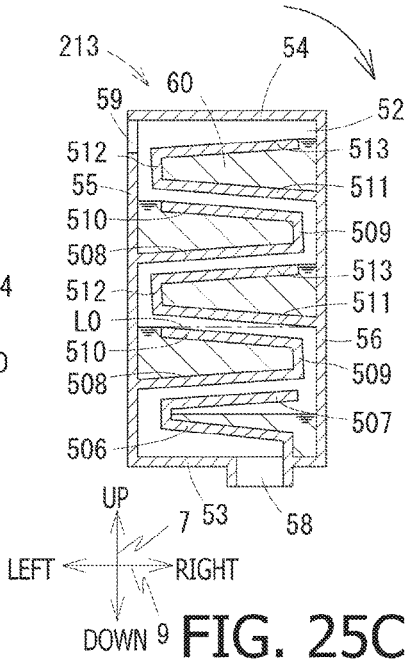
FIG. 25C is a vertical cross-sectional view of the ink tank according to the thirteenth embodiment when the ink tank takes the fifth *non-usage* attitude.

FIG. 22C shows the ink tank 212 taking the fifth *non-usage* attitude. The fifth *non-usage* attitude is defined as an attitude of the ink tank 212 when the ink tank 212 taking the usage attitude is rotated rightward (i.e., clockwise) about the axis extending in the front-rear direction 8 such that the rotation angle is larger than 90 degrees to 180 degrees or less. The fifth *non-usage* attitude coincides with the second *non-usage* attitude described above referring to FIG. 21C. When the attitude of the ink tank 212 is changed from the fourth *non-usage* attitude shown in FIG. 22B to the fifth *non-usage* attitude shown in FIG. 22C, the ink 60 stored in the [thirtieth] space [130] *127* is reserved in the [twenty-eighth] space 128.

FIG. 22D shows the ink tank 212 taking the sixth *non-usage* attitude. The sixth *non-usage* attitude is defined as an attitude of the ink tank 212 when the ink tank 212 taking the usage attitude is rotated rightward (i.e., clockwise) about the axis extending in the front-rear direction 8 such that the rotation angle is larger than 180 degrees to 270 degrees or less. The sixth *non-usage* attitude coincides with the first *non-usage* attitude described above referring to FIG. [22B] *21B*. When the attitude of the ink tank 212 is changed from the fifth *non-usage* attitude shown in FIG. 22C to the sixth *non-usage* attitude shown in FIG. 22D, the ink 60 stored in the [twenty-eighth] space 128 is reserved in the [thirtieth] space 130.

When the ink tank 212 is further rotated [rightward] *clockwise* about the axis extending in the front-rear direction 8 so that the attitude of the ink tank 212 is changed from the sixth *non-usage* attitude to the usage attitude, the ink 60 stored in the [thirtieth] space 130 is reserved in the [thirty-second] space 132.

Effects of Twelfth Embodiment

With the printer 10 according to the twelfth embodiment, when the ink tank 212 taking the usage attitude is rotated [leftward] *counterclockwise* about the axis extending in the front-rear direction 8 such that the rotation angle is larger than 0 degree to 90 degrees or less to take the first *non-usage* attitude, a part of the ink 60 stored in the [thirty-second] space *132* which is below the full level line L0 of the ink tank 212 taking the usage attitude is stored in the [thirtieth] space 130, while the remainder is stored in the [thirty-first] space 131. When the attitude of the ink tank *212* is changed from the first *non-usage* attitude to the second *non-usage* attitude as the ink tank [60] *212* is rotated [leftward] *counterclockwise* such that the rotation angle is larger than 90 degree to 180 degrees or less, the ink 60 stored in the [thirtieth] space 130 is reserved in the [twenty-eighth] space 128, and the ink 60 stored in the [thirty-first] space 131 is reserved in the [twenty-second] space 122. When the attitude of the ink tank 212 is further changed from the second *non-usage* attitude to the third *non-usage* attitude as the ink tank 212 is rotated [leftward] *counterclockwise* such that the rotation angle is larger than 180 degree to 270 degrees or less, the ink 60 stored in the [twenty-eighth] space 128 is reserved in the [twenty-seventh] space 127, and the ink 60 stored in the [twenty-second] space 122 is reserved in the [thirty-third] space 133.

When the ink tank 212 is rotated [rightward] *clockwise* about the axis extending in the front-rear direction 8 such that the attitude of the ink tank 212 is changed from the usage attitude to [anyone] *any one* of the fourth *non-usage* attitude, fifth *non-usage* attitude and sixth *non-usage* attitude, the ink 60 stored in the [thirty-second] space 132 below the full level [ling] *line* L0 (in a state where the ink tank 212 takes the usage attitude) is reserved in a space [partitioned] *defined* by the [eighth] inner wall 508, the [ninth] *front outer wall 51, and the rear outer wall 52, and, for the fourth non-usage attitude, the outer walls 54 and 55, for the fifth non-usage attitude, the outer wall 55 and the* inner wall 509, and, *for the sixth non-usage attitude, the inner wall 509 and* the [tenth] inner wall 510[and the outer walls 51-56].

Accordingly, even if the ink tank 212 is rotated about the axis extending in the front-rear direction 8 with the inlet being opened, the ink 60 stored in the inner space 57 hardly flows out *provided the ink 60 stored in the space 132 is below the full level line L0 in the state where the ink tank 212 takes the usage attitude*.

[Ink Tank According to Thirteenth Embodiment]

Referring to FIGS. 23, 24A-24D and 25A-25D, an ink tank 213 according to a thirteenth embodiment will be described. The ink tank 213 *of the thirteenth embodiment includes a modified configuration of the inner walls of the twelfth embodiment and additional groups of inner walls. An additional group of inner walls 508-510 (again having a modified configuration compared to the twelfth embodiment) are included in the thirteenth embodiment. Also, the ink tank 213* according to the thirteenth embodiment is configured such that [the eleventh] *two further groups of inner walls, with each further group comprising an* inner wall 511, [the twelfth] *an* inner wall 512 and [the thirteenth] *an* inner wall 513, are additionally provided to the *twelfth embodiment's* ink tank [201 according to the twelfth embodiment] *212*. The other [configuration] *relationships* of the thirteenth embodiment [is] *are* the same as [that] *those* of the twelfth embodiment and the detailed description will be omitted.

As shown in FIG. 23, the ink tank 213 has *the two further groups of inner walls with each comprising* the [eleventh] inner wall 511, the [twelfth] inner wall 512 and the [thirteenth] inner wall 513.

When the ink tank 213 takes the usage attitude *and for each of the two further groups of inner walls*, the [eleventh] inner wall 511 is arranged below the [tenth] *respective inner* wall 510, and extends rightward from the left outer wall 56. [The eleventh] *For each of the two further groups of the inner walls, the* inner wall 511 partitions the [twenty-ninth]

space 129 into a [thirty-fourth] space 134 on the upper side of the [eleventh] inner wall 511 and a [thirty-fifth] space 135 on the lower side of the [eleventh] inner wall 511. [The eleventh] *For each of the two further groups of inner walls, the* inner wall 511 has [an eleventh] *a* communication hole 611 through which the [thirty-fourth] space 134 and the [thirty-fifth] space 135 communicate with each other.

When the ink tank 213 takes the usage attitude *and for each of the two further groups of inner walls*, the [twelfth] inner wall 512 extends downward from the [eleventh] inner wall 511 at a position on the left side with respect to the [eleventh] communication hole 611. [The twelfth] *For each of the two further groups of inner walls, the* inner wall 512 partitions the [thirty-fifth] space 135 into a [thirty-sixth] space 136 on the right side of the [twelfth] inner wall 512 and a [thirty-seventh] space 137 on the left side of the [twelfth] inner wall 512. [The twelfth] *For each of the two further groups of inner walls, the* inner wall 512 has a [twelfth] communication hole 612 through which the [thirty-sixth] space 136 and the [thirty-seventh] space 137 communicate with each other.

When the ink tank 213 takes the usage attitude *and for each of the two further groups of inner walls*, the [thirteenth] inner wall 513 extends leftward from the [twelfth] inner wall 512 [at a position above] *adjacent to* the communication hole 612 [of the twelfth inner wall]. [The thirteenth] *For each of the two further groups of inner walls, the* inner wall 513 partitions the [thirty-seventh] space 137 into a [thirty-eighth] space 138 on the upside of the [thirteenth] inner wall 513 and a [thirty-ninth] space 139 below the [thirteenth] inner wall 513. [The thirteenth] *For each of the two further groups of inner walls, the* inner wall 513 has a [thirteenth] communication hole 613 through which the [thirty-eighth] space 138 and the [thirty-ninth] space 139 communicate with each other.

The ink tank 213 according to the thirteenth embodiment is configured such that two groups of inner walls 511-513, and one group of inner walls 508-510 are added in *a modified configuration of* the [twenty-ninth] space [120] *129* of the ink tank 212 [according to] *of* the twelfth embodiment *while reconfiguring the sizes and locations of the inner walls 509 and 510 from their sizes and locations described above in relation to the twelfth embodiment*. Therefore, when the attitude of the ink tank 213 is changed from the usage attitude, through the first *non-usage* attitude and second *non-usage* attitude, to the third *non-usage* attitude as shown in FIGS. 24A-24D, and further changed to return *to* the usage attitude, the ink 60 stored in the [thirty-second] space 132 of the ink tank [231] *213* taking the usage attitude is reserved in the [thirty-second] space 132 without being spilt from the inlet 58. Similarly, as shown in FIGS. 25A-25D, when attitude of the ink tank 213 is changed from the usage attitude to the sixth *non-usage* attitude through the fourth *non-usage* attitude and the fifth *non-usage* attitude, and further changed to the usage attitude, the ink 60 stored in the [thirty-second] space 132 of the ink tank [231] *213* taking the usage attitude is reserved in the [thirty-second] space 132 without being spilt from the inlet 58.

[Modifications]

According to the above-described embodiments, the ink tanks are described to have a rectangular parallelepiped shape. Such a shape is only an example, and [the] should not be limited to a particular shape but other [shape] *shapes* could be employed. For example, the ink tank may have a cylindrical shape. For another example, the ink tank may have an inclined wall at an upper part thereof.

According to the above-described embodiments, the inlet 58 is provided to the upper outer wall 53. This configuration can be modified such that the inlet may be provided to an upper portion of one of the front outer wall 51, the rear outer wall 52, the right outer wall 55 and the left outer wall 56.

According to the above-described embodiments, the first communication hole 71 is located between the right end of the first inner wall 61 which extends rightward from the left outer wall 56 and the right outer wall 55, and the first communication hole 71 is located on the right side with respect to the first inner wall 61. The other inner walls 62-65 and 506-513, and other communication holes 72-75 and 606-613 have the similar relationship, respectively. It is noted that the first inner wall 61 may be configured to connect the left outer wall 56 and the right outer wall [57] *55*, and the first communication hole 71 may be formed at an intermediate position of the first inner wall 61. In such a case, a width of the first communication hole 71 in the front-rear direction 8 may be the same as a width of the first inner wall 61 so that the first inner wall 61 is divided into right and left portions. Alternatively, the width of the first communication hole 71 may be smaller than the width of the first inner wall 61 and the first communication hole [61] *71* is formed as an opening formed on the first inner wall 61. The other inner walls 62-65 and 506-513 and the other communication holes 72-75 and 606-613 may be configured similarly.

According to the above-described embodiment, the first inner wall 61 has a rectangular shape when viewed from the up-down direction 7, and the first communication [hold] *hole* 71 also has a rectangular shape. The other communication holes 72-75 and 606-613 also have rectangular shapes. However, the shapes of the communication holes 72-75 and 606-613 need not be limited to the rectangular shapes, but can be formed to have another polygonal [shapes] *shape* or circular shape. When the first communication hole 71 has a rectangular shape, surfaces that partition the first communication hole 71 are outer surfaces of a rectangular column having four planar surfaces, and one of the four planar surfaces is located at the lowermost position L1 of the surfaces partitioning the first communication hole 71. When the first communication hole 71 has a different shape, for example, a circular shape, the surface partitioning the first communication hole 71 is a circumferential surface of a cylinder, and a generating line of the cylinder is located at the lowermost position L1 of the surface partitioning the first communication hole 71.

In the above-described embodiments, each ink tank is formed with the full level line L0 on an outer wall. It is noted that the fourth space 104 need not be limited to a space defined by the full level line L0. That is, when the full level line L0 is not provided to an ink tank, the fourth space 104 may be defined as a space having half the capacity of the second space 102. In such a case, when the ink 60 corresponding to half the capacity of the second space 102 is stored in the ink tank, the ink 60 is prevented from spilling out from the inlet 58. If, for example, graduations in the up-down direction in the usage attitude are provided on the outer wall of the ink tank, a space below the uppermost graduation or the lowermost graduation may be defined as the fourth space 104.

When the inlet 58 is configured such that an air passage and an ink passage communicating with the second space 102 are formed in parallel, and a bottle filled with the ink 60 is connected to the inlet 58, and the ink 60 is supplied to the second space 102 in accordance with a so-called chicken-feed method, if a liquid level of the ink 60 in the second space 102 rises up to a lower end of the air passage, supplying of the ink 60 from the bottle to the second space 102 is ceased. When such a configuration is employed, the space below the lower end of the air passage is defined to be the fourth space 104.

The ink tank 208 according to the eighth embodiment described above has the first inner wall 61, the second inner wall 62, the third inner wall 63 and four fourth inner walls 64. It is noted that the ink tank 208 may be configured not to have the third inner wall *63*.

What is claimed is:

1. A liquid consumption device, comprising:

a tank having an inner space[partitioned, by an outer wall], [from outside,] *the inner space defined by a plurality of outer walls including a lower outer wall and an upper outer wall opposite to the lower outer wall, the inner space being externally accessible via* an inlet[through which the inner space communicates with the outside of the tank,], *in the upper outer wall,* and *via* an outlet[through which the inner space communicates with the outside of the tank]; *and* a liquid consumption part connected to the outlet, *wherein, in a usage attitude, the upper outer wall is a top wall of the tank,* wherein the tank has a first inner wall which extends, in a state where the tank takes [a] *the* usage attitude, from [the] *a first* outer wall *of the plurality of outer walls* in [one direction corresponding to] a first direction perpendicular to [an up-down direction] *a vertical direction*, wherein the first inner wall partitions the inner space into a first space in which the inlet is located and a second space in which the outlet is located, the first inner wall unobstructedly facing the inlet[and having], *the first inner wall defining in part* a first communication hole through which the first space and *the* second space communicate with each other, [and]

*wherein an entirety of the second space is, in the usage attitude, below an entirety of the first space,* wherein, *the second space comprises* a third space, which is [partitioned] *defined in part* by the first inner wall and the *first* outer wall and is located below a lowermost [position of a surface partitioning] *portion of* the first communication hole when the tank [takes] *is positioned in* a first *non-usage* attitude, which is defined as [an attitude] *a first counterclockwise orientation* of the tank [when the tank taking the usage attitude is rotated in another direction opposite to the one direction corresponding to the first direction by an angle ranging from] *having been rotated counterclockwise about a horizontal axis by an angle from larger than* 0 degree to 90 degrees [about a rotation axis extending in a second direction which] *from the usage attitude, wherein the horizontal axis* is perpendicular to both the [up-down direction] *vertical direction* and the first direction, [is configured to store a particular amount of liquid, which is stored in a fourth space in a state where the tank takes the usage attitude, the fourth space being a part of the second space]

*wherein the second space further comprises, when in the usage attitude, a fourth space partially overlapping the third space and extending between the lower outer wall and the first inner wall,*

*wherein, when in the first counterclockwise orientation rotated counterclockwise from the usage attitude, the third space is configured to store a particular amount of liquid,*

*wherein, when in the usage attitude, the fourth space is configured to store the particular amount of liquid,*

*wherein the tank comprises a second inner wall connected to the first inner wall and extending downward, in a state where the tank takes the usage attitude, from the first inner wall adjacent to the first communication hole,*

*wherein the second inner wall partitions, in a state where the tank takes the first counterclockwise orientation, the second space into a fifth space on an upper side of the second inner wall and a sixth space on a lower side of the second inner wall, the second inner wall defining in part a second communication hole through which the fifth space and the sixth space communicate with each other,*

*wherein, where the tank takes a second non-usage attitude, which is defined as a second counterclockwise orientation of the tank when the tank is further rotated counterclockwise, from the usage attitude by an angle ranging from larger than 90 degrees to 180 degrees about the horizontal axis, a seventh space is defined in part by the first inner wall, the second inner wall, and the first outer wall, and is located below a lowermost portion of the second communication hole,*

*wherein, where the tank takes the second non-usage attitude, the seventh space is configured to store the particular amount of liquid,*

*wherein the tank comprises a third inner wall attached to the second inner wall and extending toward the first outer wall,*

*wherein the third inner wall is attached to the second inner wall and is adjacent the second communication hole,*

*wherein the third inner wall partitions the sixth space into an eighth space and a ninth space, the eighth space being on a first side of the third inner wall and the ninth space being defined in part by a second side of the third inner wall, the second inner wall, the first inner wall, and the first outer wall,*

*wherein the third inner wall defines in part a third communication hole through which the eighth space and the ninth space communicate with each other,*

*wherein, when in a third non-usage attitude, which is a third counterclockwise orientation of the tank when further rotated counterclockwise, from the usage attitude, by an angle ranging from larger than 180 degrees to 270 degrees about the horizontal axis, the ninth space includes a tenth space, which is defined in part by the first inner wall, the second inner wall, and the third inner wall, and is located below a lowermost portion of the third communication hole, and*

*wherein, when in the third non-usage attitude, the tenth space is configured to store the particular amount of liquid.*

[2. The liquid consumption device according to claim 1, wherein the tank comprises a second inner wall which extends downward, in a state where the tank takes the usage attitude, from the first inner wall at a position on a side, in the other direction, with respect to the first communication hole, wherein the second inner wall partitions, in a state where the tank takes the first attitude, the second space into a fifth space on an upper side of the second inner wall and a sixth space on a lower side of the second inner wall, the second inner wall having a second communication hole through which the fifth space and the sixth space communicate with each other, and wherein, a seventh space which is partitioned by the first inner wall, the second inner wall and the outer wall and located below the lowermost position of a surface, of the second inner wall, partitioning the second communication hole in a state where the tank takes a second attitude which is defined as an attitude of the tank when the tank is further rotated in the other direction by an angle ranging from 90 degrees to 180 degrees about the rotation axis is configured to store the liquid which is stored in the fourth space in a state where the tank takes the usage attitude.]

[3. The liquid consumption device according to claim 2, wherein the tank comprises a third inner wall which extends in the other direction from the second inner wall at a position above the second communication hole, wherein the third inner wall partitions the sixth space into an eighth space and a ninth space, the eighth space being on the upper side and the ninth space being the lower side of the third inner wall in a state where the tank takes the usage attitude, the third inner wall having a third communication hole through which the eighth space and the ninth space communicate with each other, and wherein a tenth space, which is partitioned by the first inner wall, the second inner wall, the third inner wall and the outer wall and located below a lowermost position of the surface, of the third inner wall, and partitions the third communication hole in a state where the tank takes a third attitude which is an attitude of the tank when rotated in the second direction by an angle ranging from 180 degrees to 270 degrees, is configured to store the liquid which is stored in the fourth space in a state where the tank takes the usage attitude.]

4. [The liquid consumption device according to claim 1,] *A liquid consumption device, comprising:*

*a tank having an inner space, the inner space defined by a plurality of outer walls including a lower outer wall and an upper outer wall opposite to the lower outer wall, the inner space being externally accessible via an inlet, in the upper outer wall of the plurality of outer walls, and via an outlet; and*

*a liquid consumption part connected to the outlet,*

*wherein, in a usage attitude, the upper outer wall is a top wall of the tank,*

*wherein the tank has a first inner wall which extends, in a first direction, in a state where the tank takes the usage attitude, from a first outer wall of the plurality of outer walls toward a second outer wall,* wherein, in a state where the [liquid consumption device] *tank* takes the usage attitude, the first inner wall has an upper surface [tilted downward toward the one direction from the outer wall] *that is inclined away from the upper outer wall as distance from the first outer wall increases,*

*wherein the first inner wall partitions the inner space into a first space in which the inlet is located and a second space in which the outlet is located, the first inner wall unobstructedly facing the inlet and spaced from the upper outer wall via the first space, the first inner wall at least partially defining a first communication hole through which the first space and the second space communicate with each other,*

*wherein, the second space comprises a third space, which is defined in part by the first inner wall and the first outer wall and is located below a lowermost portion of the first communication hole when the tank is positioned in a first non-usage attitude, which is defined as a first counterclockwise orientation of the tank having been rotated counterclockwise about a horizontal axis by an angle from larger than 0 degree to 90 degrees from the usage attitude, wherein the horizontal axis is perpendicular to a vertical direction,*

*wherein the second space further comprises, when in the usage attitude, a fourth space partially overlapping the third space and extending between the lower outer wall and the first inner wall,*

*wherein, when in the first counterclockwise orientation rotated counterclockwise from the usage attitude, the third space is configured to store a particular amount of liquid, and*

*wherein, when in the usage attitude, the fourth space is configured to store the particular amount of liquid.*

5. The liquid consumption device according to claim [2] *4*,

*wherein the tank comprises a second inner wall connected to the first inner wall and extending downward, in a state where the tank takes the usage attitude, from the first inner wall adjacent to the first communication hole,*

*wherein the second inner wall partitions, in a state where the tank takes the first counterclockwise orientation, the second space into a fifth space on an upper side of the second inner wall and a sixth space on a lower side of the second inner wall, the second inner wall defining in part a second communication hole through which the fifth space and the sixth space communicate with each other, and*

*wherein, where the tank takes a second non-usage attitude, which is defined as a second counterclockwise orientation of the tank when the tank is further rotated counterclockwise, from the usage attitude by an angle ranging from larger than 90 degrees to 180 degrees about the horizontal axis, a seventh space is defined in part by the first inner wall, the second inner wall, and the first outer wall, and is located below a lowermost portion of the second communication hole,*

*wherein, where the tank takes the second non-usage attitude, the seventh space is configured to store the particular amount of liquid,* wherein, in a state where the [liquid consumption device] *tank* takes the usage attitude, the second inner wall has a side surface facing the [one direction, the side surface tilted in the other direction toward a lower direction which is a lower direction in a state where the liquid consumption device takes the usage attitude] *first outer wall, and*

*wherein, in extending away from the first inner wall, the second inner wall is inclined toward the first outer wall.*

6. The liquid consumption device according to claim [3] *5*,

*wherein the tank comprises a third inner wall attached to the second inner wall and extending toward the first outer wall,*

*wherein the third inner wall is attached to the second inner wall and is adjacent the second communication hole, and* wherein the third inner wall has a lower surface [which is tilted upward toward the other direction, the upward direction being an upward direction in a state where the liquid consumption device takes the usage attitude] *that faces the lower outer wall and that is increasingly distant from the lower outer wall as the third inner wall extends away from the second inner wall.*

7. The liquid consumption device according to claim [3] *6*, wherein the third inner wall has an upper surface, [which is an upper surface of the third inner wall in a state where the liquid consumption device takes the usage attitude, tilted downward toward the other direction] *that extends downward, when the liquid consumption device takes the usage attitude, as the third inner wall extends away from the second inner wall.*

[8. The liquid consumption device according to claim 1, wherein, in a state where the tank takes a fourth attitude which is defined as an attitude of the tank when the tank taking the usage attitude is rotated by an angle ranging from 0 degree to 90 degrees in the one direction about the rotation axis, the liquid stored in the fourth space in a state where the tank takes the usage attitude can be stored in an eleventh space which is a part of the inner space partitioned by the outer wall and defined as a space on the lower side with respect to the inlet in a state where the tank takes a fourth attitude.]

9. The liquid consumption device according to claim [3] *1*, wherein the tank further comprises a fourth inner wall extending, from the second inner wall, [in the other direction] *toward the first outer wall*, the fourth inner wall being arranged, when the tank takes the usage attitude, on a lower side with respect to the first inner wall and on an upper side with respect to the third inner wall, and wherein the fourth inner wall partitions the ninth space into a space [on an upper side] *above the fourth inner wall*, in a state where the tank takes the usage attitude, [with respect to the fourth inner wall] and a space [on a lower side with respect to] *below* the fourth inner wall, *and defines in part* a fourth communication hole [being formed on the fourth inner wall] through which the space [on the upper side and the space on the lower side with respect to] *above the fourth inner wall and the space below* the fourth inner wall [communicating] *communicate* with each other.

10. [The] *A* liquid consumption device [according to claim 3,] *comprising:*

*a tank having an inner space, the inner space defined by a plurality of outer walls including a lower outer wall and an upper outer wall opposite to the lower outer wall, the inner space being externally accessible, via an inlet, in the upper outer wall, and via an outlet; and*

*a liquid consumption part connected to the outlet,*

*wherein, in a usage attitude, the upper outer wall is a top wall of the tank,*

*wherein the tank has a first inner wall connected to the upper outer wall and which extends away from the upper outer wall and away from a first outer wall of the plurality of outer walls,*

*wherein the first inner wall partitions the inner space into a first space in which the inlet is located and a second space in which the outlet is located, the first inner wall unobstructedly facing and spaced from the inlet and spaced from the upper outer wall via the first space, the first inner wall at least partially defining a first communication hole through which the first space and the second space communicate with each other,*

*wherein the tank comprises a second inner wall connected to the first inner wall adjacent to the first communication hole and extending toward the lower outer wall,*

*wherein the second inner wall partitions the second space into a third space communicating with the first space via the first communication hole and a fourth space,*

*wherein the second inner wall at least partially defining a second communication hole through which the third space and the fourth space communicate with each other,*

*wherein, when the tank takes a first non-usage attitude, which is defined as a first clockwise orientation of the tank having been rotated clockwise about a horizontal axis by an angle from larger than 0 degrees to 90 degrees from the usage attitude, a particular amount of liquid is storable in a combination of the third space and fourth space, wherein the particular amount comprises a first amount storable in the third space and a second amount storable in the fourth space,*

[further having] *wherein the tank comprises* a [fifth] *third* inner wall extending [in a lower direction, which is a lower direction in a state] *downward,* where the tank takes the usage attitude, *away* from the *upper* outer wall *and away from the first outer wall*, wherein the [fifth] *third* inner wall partitions the first space into a [twelfth] *fifth* space in which the inlet is located and a [thirteenth] *sixth* space located [on the one direction side, in the state where the tank takes the usage attitude, with respect to the twelfth space,] *further from the first outer wall than the fifth space,* the [fifth] *third* inner wall [having] *defining in part* a [fifth] *third* communication hole through which the [twelfth] *fifth* space and the [thirteenth] *sixth* space communicate with each other, [and]

wherein[,] a [fourteenth] *seventh* space[, which is partitioned by fifth] *is defined in part by the third* inner wall, *a second outer wall,* and the *upper* outer wall[,] and *is* located [below] *above* a lowermost position of a surface of the [fifth] *third* inner wall defining *in part* the [fifth] *third* communication hole in a state where the tank takes [a fifth] *the usage* attitude[which is an attitude when the tank taking the usage attitude is rotated in the one direction by an angle ranging from 90 degrees to 180 degrees about the rotation axis],

*wherein the seventh space* is configured to store[all the amount of liquid flows from the fourth space to the fourteenth space via the fifth space], when the tank is rotated [in the one direction] *clockwise*, about the [rotation] *horizontal* axis, from the [usage] *first non-usage* attitude to [the fifth attitude] *a second non-usage attitude, the first amount of the particular amount of liquid, and*

*wherein the second non-usage attitude is defined as a second clockwise orientation of the tank having been rotated clockwise about the horizontal axis by an angle from larger than 90 degrees to 180 degrees from the usage attitude.*

11. The liquid consumption device according to claim 10, wherein *the third inner wall comprises a first portion attached to the upper outer wall and a second portion attached to the first portion, wherein the second portion is inclined away from the upper outer wall while extending away from the first portion*, [in a state where the tank takes the usage attitude, at least a lower part of the fifth inner wall is tilted in the one direction toward a lower end thereof,]

wherein, in a state where the tank takes a [sixth] *third non-usage* attitude, which is [an attitude] *a third clockwise orientation* of the tank when the tank taking the usage attitude is rotated *clockwise* by an angle ranging from *larger than* 180 degrees to 270 degrees [in the second direction, a fifteenth] *the upper outer wall and the third inner wall defined in part an eighth* space *within the seventh space*, [which is partitioned by the fifth inner wall and the outer wall and defined below a lowermost position of a surface of the fifth inner wall partitioning the fifth communication hole, can store the liquid which is stored in the fourteenth space in a state where tank takes the fifth attitude] *and*

*wherein the eight space is configured to store, when the tank is rotated from the second non-usage attitude to the third non-usage attitude, the liquid previously stored in the seventh space.*

12. The liquid consumption device according to claim 1, wherein a full level line is indicated on the *first* outer wall, the full level line [being indicated on a lower side with respect to] *located below* the first inner wall and representing a maximum amount of the liquid storable in the second space in the state where the tank takes the usage attitude[, the amount of the liquid being the liquid stored in the second space below the full level line].

13. A liquid consumption device, comprising:

a tank having an inner space [partitioned, by] *defined by a plurality of* outer [wall, from outside,] *walls including a lower outer wall, an upper outer wall opposite to the lower outer wall, a first outer wall, and a second outer wall, the inner space being accessible, via* an inlet [through which the inner space communicates with the outside of the tank,] *in the upper outer wall* and *via an* outlet [through which the inner space communicates with the outside of the tank]; *and* a liquid consumption part connected to the outlet,

*wherein, in a usage attitude, the upper outer wall is a top wall of the tank,* wherein the tank comprises, in a state where the tank takes [a] *the* usage attitude:

a [sixth] *first* inner wall extending[,] from the *upper* outer wall *and toward the second outer wall*, [in one direction corresponding to a first direction perpendicular to an up-down direction,] the [sixth] *first* inner wall partitioning the inner space into a [twentieth] *first* space [in which] *adjacent to* the inlet [is included] and a [twenty-first] *second* space [in which] *adjacent to* the outlet[is included], the [sixth] *first* inner wall [being formed with a sixth] *defining in part a first* communication hole through which the [twentieth] *first* space and the [twenty-first] *second* space communicate with each other;

a [seventh] *second* inner wall *attached to and* extending [in another direction opposite to the one direction corresponding to the first direction from a portion which is a part of the sixth inner wall and on the other direction side with respect to the sixth communication hole,] *away from the first inner wall toward the first outer wall,* the [seventh] *second* inner wall partitioning the [twenty-first] *second* space into a [twenty-second] *third* space [on an upper side] *above the second inner wall* and a [twenty-third] *fourth* space [on a lower side with respect to] *below* the [seventh] *second* inner wall, the [seventh] *second* inner wall [being formed with a seventh] *defining in part a second* communication hole through which the [twenty-second] *third* space and the [twenty-third] *fourth* space communicate with each other;

[an eighth] *a third* inner wall arranged [on a lower side of] *below* the [seventh] *second* inner wall and extending [from] *toward* the *first* outer wall [in the other direction] *from the second outer wall*, the [eighth] *third* inner wall partitioning the [twenty-third] *fourth* space into a [twenty-fourth] *fifth* space [on an upper side] *above the third inner wall* and a [twenty-fifth] *sixth* space [on a lower side with respect to] *below* the [eighth] *third* inner wall, the [eighth] *third* inner wall [being formed with an eighth] *defining in part a third* communication hole through which the [twenty-fourth] *fifth* space and the [twenty-fifth] *sixth* space communicate with each other;

a [ninth] *fourth* inner wall extending downward from the [eighth] *third* inner wall [at a position on the one direction side with respect to the eighth] *adjacent to the third* communication hole, the [ninth] *fourth* inner wall partitioning the [twenty-fifth] *sixth* space into a [twenty-sixth] *seventh* space [on the other direction side] *closer to the first outer wall* and [a twenty-seventh] *an eighth* space [on the one direction side with respect to the ninth inner wall] *closer to the second outer wall*, the [ninth] *fourth* inner wall [being formed with a ninth] *defining in part a fourth* communication hole through which the [twenty-sixth] *seventh* space and the [twenty-seventh] *eighth* space communicate with each other; and a [tenth] *fifth* inner wall extending [in the one direction] *toward the second outer wall* from the [ninth] *fourth* inner wall [at a position on an upper side with respect to the ninth] *adjacent to the fourth* communication hole, the [tenth] *fifth* inner wall partitioning the [twenty-seventh] *eighth* space into [an twenty-eighth] *a ninth* space [on an upper side] *above the fifth inner wall* and a [twenty-ninth] *tenth* space [on a lower side with respect to the tenth inner wall, the tenth] *below the fifth inner wall, the fifth* inner wall [being formed with a tenth] *defining in part a fifth* communication hole through which the [twenty-eighth] *ninth* space and the [twenty-ninth] *tenth* space communicate with each other, wherein *the first and second outer walls include*, in a state where the tank takes the usage attitude, a full level [line is indicated on the outer wall,] *line,* the full level line representing a maximum amount of [the] liquid storable in the [twenty-fifth space and below the eighth inner wall] *sixth space*, wherein, in a state where the tank takes a first *non-usage* attitude which is [an attitude] *a first counterclockwise orientation* of the tank when the tank taking the usage attitude is rotated by an angle ranging from *larger than* 0 degrees to 90 degrees [in the other direction] about [an axis extending in a second direction, a thirtieth] *a horizontal axis, an eleventh* space and a [thirty-first] *twelfth* space are capable of storing [the] liquid which is stored in a [thirty-second] *thirteenth* space below the full level line in the state where the tank takes the usage attitude, the [thirtieth] *eleventh* space being [a space partitioned] *defined in part* by the [eighth] *third* inner wall, the [ninth] *fourth* inner wall, *and* the [tenth] *fifth* inner wall and [the outer wall and] *being* located [on a lower side with respect to a lowermost position of a surface of the tenth inner wall defining the tenth communication hole,] *below, with the tank in the first counterclockwise orientation, the fifth communication hole,* and

[a thirty-first] *the twelfth* space being [a space partitioned] *defined in part* by the [seventh inner] *upper*

*outer* wall[and], the *first* outer wall, and a [part lower than a lowermost position of a surface of the seventh inner wall defining the seventh communication hole] *portion of the second inner wall forming the second communication hole*, wherein, in a state where the tank takes a second *non-usage* attitude which is [an attitude] *a second counterclockwise orientation* of the tank when the tank taking the usage attitude is rotated [in the other direction by] *counterclockwise* 180 degrees about the [axis extending in the second direction, the twenty-eighth] *horizontal axis, the ninth* space and the [twenty-second] *third* space are capable of storing the liquid which is stored in the [thirty-second] *thirteenth* space in the state where the tank takes the usage attitude, [and]

wherein, in a state where the tank takes a third *non-usage* attitude which is [an attitude] *a third counterclockwise orientation* of the tank when the tank taking the usage attitude is rotated [in the other direction] *counterclockwise* by an angle ranging from *larger than* 180 degrees to 270 degrees about the [axis extending in the second direction, the twenty-seventh] *horizontal axis, the eight* space and a [thirty-third] *fourteenth* space are capable of storing the liquid stored in the [thirty-second] *thirteenth* space in a state where the tank takes the usage attitude, *and*

*wherein* the [thirty-third space being a space] *fourteenth space is* defined *in part* by the [sixth] *first* inner wall, *and* the [seventh] *second* inner wall, and [the outer wall and located on the lower side with respect to a lowermost position of a surface of the seventh inner wall defining the seventh] *extends to the portion of the second inner wall forming the second* communication hole.

14. [The liquid consumption device according to claim 13.] *A liquid consumption device, comprising:*

*a tank having an inner space defined by a plurality of outer walls including a lower outer wall, an upper outer wall opposite to the lower outer wall, a first outer wall, and a second outer wall, the inner space being accessible, via an inlet in the upper outer wall and via an outlet; and*

*a liquid consumption part connected to the outlet,*

*wherein, in a usage attitude, the upper outer wall is a top wall of the tank,*

*wherein the tank comprises, in a state where the tank takes the usage attitude:*

*a first inner wall extending from the upper outer wall and toward the second outer wall, the first inner wall partitioning the inner space into a first space adjacent to the inlet and a second space adjacent to the outlet, the first inner wall defining in part a first communication hole through which the first space and the second space communicate with each other;*

*a second inner wall attached to and extending away from the first inner wall toward the first outer wall, the second inner wall partitioning the second space into a third space above the second inner wall and a fourth space below the second inner wall, the second inner wall defining in part a second communication hole through which the third space and the fourth space communicate with each other;*

*a third inner wall arranged below the second inner wall and extending toward the first outer wall from the second outer wall, the third inner wall partitioning the fourth space into a fifth space above the third inner wall and a sixth space below the third inner wall, the third inner wall defining in part a third communication hole through which the fifth space and the sixth space communicate with each other;*

*a fourth inner wall extending downward from the third inner wall adjacent to the third communication hole, the fourth inner wall partitioning the sixth space into a seventh space closer to the first outer wall and an eighth space closer to the second outer wall, the fourth inner wall defining in part a fourth communication hole through which the seventh space and the eighth space communicate with each other; and*

*a fifth inner wall extending toward the second outer wall from the fourth inner wall adjacent to the fourth communication hole, the fifth inner wall partitioning the eighth space into a ninth space above the fifth inner wall and a tenth space below the fifth inner wall, the fifth inner wall defining in part a fifth communication hole through which the ninth space and the tenth space communicate with each other,*

*wherein the first and second outer walls include, in a state where the tank takes the usage attitude, a full level line, the full level line representing a maximum amount of liquid storable in the sixth space,*

*wherein a first non-usage attitude is a first counterclockwise orientation of the tank when the tank taking the usage attitude is rotated by an angle ranging from larger than 0 degrees to 90 degrees about a horizontal axis,*

*wherein an eleventh space is defined in part by the third inner wall, the fourth inner wall, and the fifth inner wall and located below, with the tank in the first counterclockwise orientation, the fifth communication hole, and*

*wherein a twelfth space is defined in part by the upper outer wall, the first outer wall, and a portion of the second inner wall forming the second communication hole,*

*wherein a second non-usage attitude is a second counterclockwise orientation of the tank when the tank taking the usage attitude is rotated counterclockwise 180 degrees about the horizontal axis,*

*wherein a third non-usage attitude is a third counterclockwise orientation of the tank when the tank taking the usage attitude is rotated counterclockwise by an angle ranging from larger than 180 degrees to 270 degrees about the horizontal axis,*

*wherein a thirteenth space is defined in part by the first inner wall, and the second inner wall, and extends to the portion of the second inner wall forming the second communication hole,* wherein the tank further comprises [an eleventh] *a sixth* inner wall, a [twelfth] *seventh* inner wall and [a thirteenth] *an eighth* inner wall, the [eleventh] *sixth* inner wall [being a wall located on a lower side with respect to the tenth] *located below the fifth* inner wall and extending [in the one direction from the outer wall, the eleventh] *toward the second outer wall from the first outer wall, the sixth* inner wall partitioning the [twenty-ninth] *tenth* space into a [thirty-fourth] *fourteenth* space [on an upper side and a thirty-fifth] *above the sixth inner wall and a fifteenth* space [on a lower side with respect to the eleventh] *below the sixth* inner wall, the [eleventh] *sixth* inner wall [being formed with an eleventh] *defining in part a sixth* communication hole through which the [thirty-fourth] *fourteenth* space and the [thirty-fifth] *fifteenth* space communicate with each other;

the [twelfth] *seventh* inner wall [being a wall] extending downward from the [eleventh] *sixth* inner wall [at a position on the other direction side with respect to the eleventh] *adjacent to the sixth* communication hole, the [twelfth] *seventh* inner wall partitioning the [thirty-fifth] *fifteenth* space into a [thirty-sixth] *sixteenth* space [on the one direction side and a thirty-seventh] *closer to the second outer wall and a seventeenth* space [on the other direction side with respect to the twelfth inner wall, the twelfth] *closer to the first outer wall, the seventh* inner wall [being formed with a twelfth] *defining in part a seventh* communication hole through which the [thirty-sixth] *sixteenth* space and the [thirty-seventh] *seventeenth* space communicate with each other; and the [thirteenth] *eighth* inner wall [being a wall] extending [in the other direction from the twelfth inner wall at a position on an upper side with respect to the twelfth communication hole, the thirteenth] *from the seventh inner wall adjacent to the seventh communication hole and extending toward the first outer wall, the eighth* inner wall partitioning the [thirty-seventh] *seventeenth* space into [a thirty-eighth] *an eighteenth* space [on an upper side] *above the eighth inner wall* and a [thirty-ninth] *nineteenth* space [on a lower side with respect to the thirteenth inner wall, the thirteenth] *below the eighth inner wall, the eighth* inner wall [being formed with a thirteenth] *defining in part an eighth* communication hole through which the [thirty-eighth] *eighteenth* space and the [thirty-ninth] nineteenth space communicate with each other.

15. The liquid consumption device according to claim 14, [wherein the eighth] *further comprising:*

*a ninth* inner wall[,] *extending from the second outer wall;*

[the ninth] *a tenth* inner wall *extending from the ninth inner wall;* and

[the tenth] *an eleventh* inner wall *extending from the tenth inner wall,*

*wherein the ninth inner wall, the tenth inner wall, and the eleventh inner wall* are arranged [on an upper side with respect to the eleventh inner wall and on a lower side with respect to] *below* the [thirteenth] *eighth* inner wall in the state where the tank takes the usage attitude.

[16. A liquid tank for a liquid consumption device, comprising:

an outer wall defining an inner space of the tank, the inner space being partitioned from an outside by the outer wall;

an inlet through which the inner space communicates with the outside of the tank; and an outlet to which the liquid consumption device is connectable such that the inner space of the tank can communicate with the liquid consumption device;

a first inner wall which extends, in a state where the tank takes a usage attitude, from the outer wall in one direction in-corresponding to a first direction perpendicular to an up-down direction, wherein the first inner wall partitions the inner space into a first space in which the inlet is located and a second space in which the outlet is located, the first inner wall unobstructedly facing the inlet and having a first communication hole through which the first space and second space communicate with each other, and wherein, a third space, which is partitioned by the first inner wall and the outer wall and is located below a lowermost position of a surface partitioning the first communication hole in a state where the tank takes a first attitude which is defined as an attitude in a state the tank taking the usage attitude is rotated in another direction opposite to the one direction corresponding to the first direction by an angle ranging from 0 degree to 90 degrees about a rotation axis extending in a second direction which is perpendicular to both the up-down direction and the first direction, is configured to store a particular amount of liquid, which is stored in a fourth space in a state where the tank takes the usage attitude, the fourth space being a part of the second space.]

[17. A liquid consumption device, comprising:

a tank having an inner space partitioned, by an outer wall, from outside, an inlet through which the inner space communicates with the outside of the tank, and an outlet through which the inner space communicates with the outside of the tank;

a liquid consumption part connected to the outlet, wherein the tank has a first inner wall which extends, in a state where the tank takes a usage attitude, from the outer wall on one side in a first direction perpendicular to an up-down direction, wherein the first inner wall partitions the inner space into a first space in which the inlet is located and a second space in which the outlet is located, the first inner wall having a first communication hole through which the first space and second space communicate with each other, and wherein, a third space, which is partitioned by the first inner wall and the outer wall and is located below a lowermost position of a surface partitioning the first communication hole when the tank takes a first attitude which is defined as an attitude of the tank when the tank taking the usage attitude is rotated on another side in the first direction by an angle ranging from 0 degree to 90 degrees about a rotation axis extending in a second direction which is perpendicular to both the up-down direction and the first direction, is configured to store a particular amount of liquid, which is stored in a fourth space in a state where the tank takes the usage attitude, the fourth space being a part of the second space, wherein the tank comprises a second inner wall which extends downward, in a state where the tank takes the usage attitude, from the first inner wall at a position on the other side of the first direction with respect to the first communication hole, wherein the second inner wall partitions, in a state where the tank takes the first attitude, the second space into a fifth space on an upper side of the second inner wall and a sixth space on the lower side of the second inner wall, the second inner wall having a second communication hole through which the fifth space and the sixth space communicate with each other, and wherein, a seventh space which is partitioned by the first inner wall, the second inner wall and the outer wall and located below the lowermost position of a surface, of the second inner wall, partitioning the second communication hole in a state where the tank takes a second attitude which is defined as an attitude of the tank when the tank is further rotated in the other direction by an angle ranging from 90 degrees to 180 degrees about the rotation axis is configured to store the liquid which is stored in the fourth space in a state where the tank takes the usage attitude.]

[18. A liquid tank for a liquid consumption device, comprising:

an outer wall defining an inner space of the tank, the inner space being partitioned from an outside by the outer wall;

an inlet through which the inner space communicates with the outside of the tank; and an outlet to which the liquid consumption device is connectable such that the inner space of the tank can communicate with the liquid consumption device;

a first inner wall which extends, in a state where the tank takes a usage attitude, from the outer wall on a one side in a first direction perpendicular to an up-down direction, wherein the first inner wall partitions the inner space into a first space in which the inlet is located and a second space in which the outlet is located, the first inner wall having a first communication hole through which the first space and second space communicate with each other, and wherein, a third space, which is partitioned by the first inner wall and the outer wall and is located below a lowermost position of a surface partitioning the first communication hole in a state where the tank takes a first attitude which is defined as an attitude in a state the tank taking the usage attitude is rotated on another side in the first direction by an angle ranging from 0 degree to 90 degrees about a rotation axis extending in a second direction which is perpendicular to both the up-down direction and the first direction, is configured to store a particular amount of liquid, which is stored in a fourth space in a state where the tank takes the usage attitude, the fourth space being a part of the second space, wherein the tank comprises a second inner wall which extends downward, in a state where the tank takes the usage attitude, from the first inner wall at a position on the other side of the first direction with respect to the first communication hole, wherein the second inner wall partitions, in a state where the tank takes the first attitude, the second space into a fifth space on an upper side of the second inner wall and a sixth space on the lower side of the second inner wall, the second wall having a second communication hole through which the fifth space and the sixth space communicate with each other, and wherein, a seventh space which is partitioned by the first inner wall, the second inner wall and the outer wall and located below the lowermost position of a surface, of the second inner wall, partitioning the second communication hole in a state where the tank takes a second attitude which is defined as an attitude of the tank when the tank is further rotated in the other direction by an angle ranging from 90 degrees to 180 degrees about the rotation axis is configured to store the liquid which is stored in the fourth space in a state where the tank takes the usage attitude.]

* * * * *